(12) United States Patent
Brouwer et al.

(10) Patent No.: US 9,710,673 B2
(45) Date of Patent: *Jul. 18, 2017

(54) CONFLICT RESOLUTION FOR KEYCHAIN SYNCING

(71) Applicant: Apple Inc., Cupertino, CA (US)

(72) Inventors: Michael Brouwer, Los Gatos, CA (US); Dallas B. De Atley, San Francisco, CA (US); Mitchell D. Adler, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,733

(22) Filed: Sep. 23, 2016

(65) Prior Publication Data

US 2017/0011234 A1 Jan. 12, 2017

Related U.S. Application Data

(63) Continuation of application No. 14/746,793, filed on Jun. 22, 2015, now Pat. No. 9,479,583, which is a
(Continued)

(51) Int. Cl.
*G06F 21/00* (2013.01)
*G06F 21/62* (2013.01)
(Continued)

(52) U.S. Cl.
CPC .... *G06F 21/6263* (2013.01); *G06F 17/30581* (2013.01); *G06F 21/606* (2013.01);
(Continued)

(58) Field of Classification Search
CPC ................................................ G06F 17/30194
See application file for complete search history.

(56) References Cited

U.S. PATENT DOCUMENTS 5,748,736 A 5/1998 Mittra
6,240,512 B1 5/2001 Fang et al.
(Continued)

FOREIGN PATENT DOCUMENTS

EP 1111527 6/2001
EP 1229443 8/2002
(Continued)

OTHER PUBLICATIONS

International Search Report and Written Opinion of commonly owned International Patent Application PCT/U82013/077724, Jun. 12, 2014 (mailing date), Apple Inc.
(Continued)

*Primary Examiner* — Ali Shayanfar
(74) *Attorney, Agent, or Firm* — Adeli LLP

(57) ABSTRACT

Some embodiments provide a program that synchronizes a keychain stored on a device with a set of other devices. The keychain includes a set of keychain items. The program receives (1) a list of keychain items for updating the keychain stored on the device and (2) data representing the keychain items specified in the list of keychain items. For each keychain item in the list of keychain items, the program updates the keychain stored on the device with the data that represents the keychain item.

20 Claims, 28 Drawing Sheets

Related U.S. Application Data continuation of application No. 13/839,084, filed on Mar. 15, 2013, now Pat. No. 9,077,759.

(60) Provisional application No. 61/754,524, filed on Jan. 18, 2013.

(51) Int. Cl.
*H04L 29/06* (2006.01)
*G06F 21/60* (2013.01)
*H04L 29/08* (2006.01)
*H04L 9/08* (2006.01)
*G06F 17/30* (2006.01)

(52) U.S. Cl.
CPC ............ *G06F 21/62* (2013.01); *H04L 9/0816* (2013.01); *H04L 63/0428* (2013.01); *H04L 63/062* (2013.01); *H04L 63/10* (2013.01); *H04L 63/166* (2013.01); *H04L 63/20* (2013.01); *H04L 67/104* (2013.01); *H04L 67/1095* (2013.01); *H04L 67/1097* (2013.01); *H04L 2209/24* (2013.01)

(56) References Cited

U.S. PATENT DOCUMENTS

| | | |
|---|---|---|
| 6,738,907 B1 | 5/2004 | Carter |
| 7,143,117 B2 | 11/2006 | Wolfgang et al. |
| 7,167,920 B2 | 1/2007 | Traversat et al. |
| 7,401,218 B2 | 7/2008 | Park |
| 7,500,020 B1 | 3/2009 | Kabra et al. |
| 7,503,480 B2 * | 3/2009 | Barnes ................ G06K 9/00 235/377 |
| 8,069,488 B2 | 11/2011 | Go |
| 8,243,312 B2 | 8/2012 | Kasatani |
| 8,250,397 B2 | 8/2012 | Marcy et al. |
| 8,370,423 B2 * | 2/2013 | Ozzie ............... G06F 17/30578 709/203 |
| 8,375,458 B2 * | 2/2013 | Kiehtreiber ............ G06F 21/51 726/22 |
| 8,410,898 B1 * | 4/2013 | Vasquez ............ G07C 9/00571 340/5.1 |
| 8,510,810 B2 * | 8/2013 | Solin ..................... H04L 9/006 726/18 |
| 8,539,567 B1 | 9/2013 | Logue et al. |
| 8,868,500 B2 * | 10/2014 | Giampaolo ......... H04L 67/1095 707/612 |
| 9,077,759 B2 | 7/2015 | Brouwer et al. |
| 9,124,637 B2 | 9/2015 | Brouwer et al. |
| 9,197,700 B2 | 11/2015 | Brouwer et al. |
| 2002/0013898 A1 | 1/2002 | Sudia et al. |
| 2002/0099772 A1 | 7/2002 | Deshpande et al. |
| 2002/0143944 A1 | 10/2002 | Traversat et al. |
| 2003/0055892 A1 | 3/2003 | Huitema et al. |
| 2003/0084311 A1 | 5/2003 | Merrien et al. |
| 2003/0163684 A1 | 8/2003 | Fransdonk |
| 2003/0177361 A1 | 9/2003 | Wheeler et al. |
| 2004/0034773 A1 | 2/2004 | Balabine et al. |
| 2004/0062400 A1 | 4/2004 | Sovio et al. |
| 2004/0133640 A1 | 7/2004 | Yeager et al. |
| 2004/0179511 A1 | 9/2004 | Kizu et al. |
| 2005/0004875 A1 | 1/2005 | Kontio et al. |
| 2005/0027755 A1 * | 2/2005 | Shah ..................... G06F 3/0605 |
| 2005/0081029 A1 | 4/2005 | Thornton et al. |
| 2005/0114591 A1 | 5/2005 | Coronado et al. |
| 2005/0195975 A1 * | 9/2005 | Kawakita ............ H04L 9/0822 380/30 |
| 2005/0289644 A1 | 12/2005 | Wray |
| 2006/0031587 A1 | 2/2006 | Paterson et al. |
| 2006/0041603 A1 | 2/2006 | Paterson et al. |
| 2006/0069809 A1 | 3/2006 | Serlet |
| 2006/0193474 A1 | 8/2006 | Fransdonk |
| 2006/0242405 A1 | 10/2006 | Gupta et al. |
| 2006/0250958 A1 | 11/2006 | Hur et al. |
| 2007/0019616 A1 | 1/2007 | Rantapuska et al. |
| 2007/0022301 A1 | 1/2007 | Nicholson et al. |
| 2007/0033271 A1 | 2/2007 | Hullot et al. |
| 2007/0039039 A1 | 2/2007 | Gilbert et al. |
| 2007/0143357 A1 | 6/2007 | Chaudhri |
| 2007/0150558 A1 | 6/2007 | Teodosiu et al. |
| 2008/0005188 A1 | 1/2008 | Li et al. |
| 2008/0028450 A1 | 1/2008 | Zhao et al. |
| 2008/0103977 A1 | 5/2008 | Khosravy et al. |
| 2008/0148350 A1 | 6/2008 | Hawkins et al. |
| 2008/0165807 A1 * | 7/2008 | Nilo .................... H04L 67/1095 370/503 |
| 2008/0168183 A1 | 7/2008 | Marcy et al. |
| 2008/0168553 A1 * | 7/2008 | Kiehtreiber ............ G06F 21/51 726/17 |
| 2008/0183853 A1 | 7/2008 | Manion et al. |
| 2008/0244706 A1 | 10/2008 | Lenoir et al. |
| 2009/0030974 A1 | 1/2009 | Boudreau et al. |
| 2009/0077638 A1 | 3/2009 | Norman et al. |
| 2009/0205036 A1 | 8/2009 | Slaton et al. |
| 2009/0228509 A1 * | 9/2009 | McCarthy ......... G06F 17/30165 |
| 2009/0259971 A1 | 10/2009 | Rankine et al. |
| 2009/0268906 A1 | 10/2009 | Krempl |
| 2010/0082534 A1 | 4/2010 | Sagar et al. |
| 2010/0161965 A1 * | 6/2010 | Solin ..................... H04L 9/006 713/155 |
| 2010/0306827 A1 | 12/2010 | Esteve Balducci et al. |
| 2011/0055593 A1 | 3/2011 | Lurey et al. |
| 2011/0093327 A1 * | 4/2011 | Fordyce, III ........... G06Q 20/10 705/14.39 |
| 2011/0179270 A1 * | 7/2011 | Tewari ............ G06F 17/30194 713/165 |
| 2011/0225293 A1 | 9/2011 | Rathod |
| 2011/0225417 A1 | 9/2011 | Maharajh et al. |
| 2011/0283113 A1 * | 11/2011 | Moffat ................. G06F 21/602 713/189 |
| 2012/0054625 A1 * | 3/2012 | Pugh ..................... G06F 21/41 715/736 |
| 2012/0079095 A1 | 3/2012 | Evans et al. |
| 2012/0096368 A1 | 4/2012 | McDowell |
| 2012/0131656 A1 | 5/2012 | Slaton et al. |
| 2012/0155643 A1 | 6/2012 | Hassan et al. |
| 2012/0173356 A1 | 7/2012 | Fan et al. |
| 2012/0204032 A1 | 8/2012 | Wilkins et al. |
| 2012/0278464 A1 | 11/2012 | Lehane et al. |
| 2013/0018859 A1 | 1/2013 | Wilkins |
| 2013/0067243 A1 | 3/2013 | Tamayo-Rios et al. |
| 2013/0073464 A1 * | 3/2013 | Magpayo ........... G06Q 30/0256 705/44 |
| 2013/0073859 A1 * | 3/2013 | Carlson ................. H04L 63/123 713/176 |
| 2013/0145447 A1 | 6/2013 | Maron |
| 2013/0173473 A1 * | 7/2013 | Birtwhistle ........... G06F 19/322 705/50 |
| 2013/0268357 A1 | 10/2013 | Heath |
| 2013/0332607 A1 | 12/2013 | Santamaria et al. |
| 2014/0049366 A1 * | 2/2014 | Vasquez ............ G07C 9/00857 340/5.54 |
| 2014/0053227 A1 | 2/2014 | Ruppin et al. |
| 2014/0082717 A1 | 3/2014 | Kang et al. |
| 2014/0122718 A1 | 5/2014 | Thoppai et al. |
| 2014/0164764 A1 | 6/2014 | Pushkin et al. |
| 2015/0350106 A1 | 12/2015 | Whalley et al. |
| 2016/0044101 A1 | 2/2016 | Brouwer et al. |

FOREIGN PATENT DOCUMENTS

| | | |
|---|---|---|
| JP | 2003-114821 | 4/2003 |
| JP | 2004-318881 | 11/2004 |
| JP | 2007-115023 | 5/2007 |
| JP | 2007-122736 | 5/2007 |
| JP | 2008-504782 | 2/2008 |
| JP | 2009-260915 | 11/2009 |

(56) References Cited

FOREIGN PATENT DOCUMENTS

| WO | WO 01/82086 | 11/2001 |
| WO | WO 2014/113196 | 7/2014 |

OTHER PUBLICATIONS

Delac, G., et al., "Emerging Security Threats for Mobile Platforms," MIPRO, 2011 Proceedings of the 34$^{th}$ International Convention, May 23-27, 2011, 6 pages, IEEE, Opatija, Croatia.

Klingelhuber, Paul, et al., "Private Notes: Encrypted XML Notes Synchronization and Sharing with Untrusted Web Services," iiWAS2011, Dec. 5-7, 2011, Ho Chi Minh city, Vietnam, pp. 254-261, ACM, New York, USA.

Menezes, Alfred J., et al., "Handbook of Applied Cryptography," Month Unknown, 1997, 4 pages, CRC Press, LLC, Boca Raton, Florida, USA.

Ram, Sudha, et al., "Semantic Conflict Resolution Ontology (SCROL): An Ontology for Detecting and Resolving Data and Schema-Level Sematic Conflicts," IEEE Transactions on Knowledge and Data Engineering, vol. 16, No. 2, Feb. 2004, pp. 189-202, IEEE Computer Society.

\* cited by examiner

CONFLICT RESOLUTION FOR KEYCHAIN SYNCING

CLAIM OF BENEFIT TO PRIOR APPLICATIONS

This Application is a continuation application of U.S. patent application Ser. No. 14/746,793, filed Jun. 22, 2015, now published as U.S. Patent Publication 2016/0044101. U.S. patent application Ser. No. 14/746,793 is a continuation application of U.S. patent application Ser. No. 13/839,084, filed Mar. 15, 2013, now issued as U.S. Pat. No. 9,077,759. U.S. patent application Ser. No. 13/839,084 claims the benefit of U.S. Provisional Patent Application 61/754,524, filed Jan. 18, 2013. U.S. patent application Ser. No. 14/746,793, now published as U.S. Patent Publication 2016/0044101, and Ser. No. 13/839,084, now issued as U.S. Pat. No. 9,077,759, are incorporated herein by reference.

BACKGROUND

Sharing data among multiple devices is an increasingly popular feature for users of multiple devices. The data-sharing feature is implemented by updating entire files and, in some cases, entire sets of files specified for syncing among the multiple devices. Many applications that provide a data-sharing feature send and receive the data among the multiple devices in an unprotected manner.

BRIEF SUMMARY

Some embodiments of the invention provide a novel method for facilitating the synchronization (also referred to as "syncing") of keychains between several devices that are specified as members of a synchronization group (also referred to as a sync group or sync circle). A keychain, in some embodiments, is a defined collection of data that may include passwords, private keys, certificates, secure notes, etc. In some embodiments, the method syncs the keychains between the devices through a peer-to-peer (P2P) network. The method of some embodiments employs a communication security feature for preventing unauthorized access of communications between the devices.

Different embodiments use different techniques to implement the P2P network through which the devices communicate with each other. For instance, some embodiments employ an overlay network with a fully connected mesh topology while other embodiments use an overlay network with a star topology. Still, some embodiments utilize any number of additional and/or different overly networks to implement the P2P network.

In some embodiments, the method provides a secure transport layer for protecting the data that the devices communicate with each other. The method of some embodiments implements the secure transport layer by providing a secure communication channel between each of the devices using a message-based communication protocol (e.g., off-the-record (OTR) messaging) while the method of other embodiments implements the secure transport layer by providing a secure communication channel between each pair of devices using a stream-based communication protocol (e.g., secure sockets layer (SSL)).

The method of some embodiment synchronizes a keychain between devices by synchronizing the individual items (also referred to as keychain items) of the keychain (as opposed to syncing the entire keychain). In some instances when syncing keychain items, the method of some embodiments detects conflicts between multiple versions of the same keychain item. The method of different embodiments resolves such conflicts in different ways. For example, in some embodiments, the method uses the most recent version of the keychain item as the keychain item to be synced between the devices. Additional and/or different approaches may be used in some embodiments.

In some embodiments, the method provides a data protection feature for limiting access to keychain data (e.g., keychain items) on a device according to defined set of conditions and/or requirements. For example, each keychain item on a device is specified, in some embodiments, as belonging to a particular protection domain. The method of some embodiments allows a device to access a particular keychain item only when a set of conditions and/or requirements defined for the particular protection domain to which the particular keychain item belongs is met. Examples of conditions and/or requirements include the device being in an unlocked state, the device being in a locked state, a user of the device entering a particular password, etc. Under this approach, access to the keychain items on a device may be controlled in a granular fashion.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
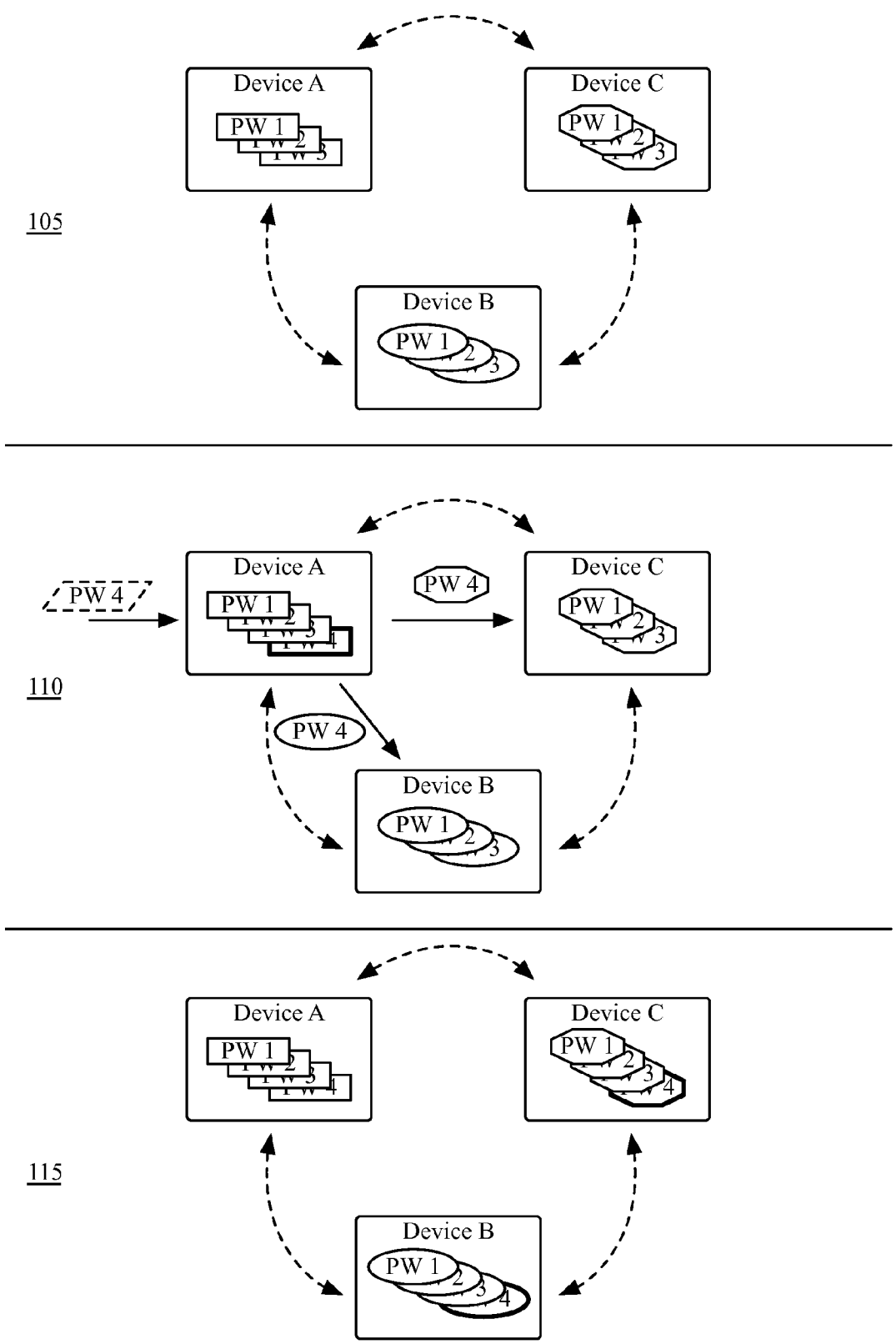
FIG. 1 conceptually illustrates synchronizing passwords between several devices according to some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed. For instance, many of the figures in this application are described with respect to a particular number of devices for the purposes of simplicity and/or explanation. One of ordinary skill in the art will realize the invention is not limited to the number of devices illustrated in these figures and that the invention may be practiced with any number of different devices.

Some embodiments of the invention provide a novel method for facilitating the syncing of keychains between several devices that are specified as members of a synchronization group (also referred to as a sync group or sync circle). A keychain, in some embodiments, is a defined collection of data that may include passwords, private keys, certificates, secure notes, etc. In some embodiments, the method syncs the keychains between the devices through a P2P network. The method of some embodiments employs a communication security feature for preventing unauthorized access of communications between the devices.

Different embodiments use different techniques to implement the P2P network through which the devices communicate with each other. For instance, some embodiments employ an overlay network with a fully connected mesh topology while other embodiments use an overlay network with a star topology. Still, some embodiments utilize any number of additional and/or different overly networks to implement the P2P network.

In some embodiments, the method provides a secure transport layer for protecting the data that the devices communicate with each other. The method of some embodiments implements the secure transport layer by providing a secure communication channel between each pair of devices using a message-based communication protocol (e.g., OTR messaging) while the method of other embodiments implements the secure transport layer by providing a secure communication channel between each pair of devices using a stream-based communication protocol (e.g., SSL).

The method of some embodiment synchronizes a keychain between devices by synchronizing the individual items (also referred to as keychain items) of the keychain (as opposed to syncing the entire keychain). In some instances when syncing keychain items, the method of some embodiments detects conflicts between multiple versions of the same keychain item. The method of different embodiments resolves such conflicts in different ways. For example, in some embodiments, the method uses the most recent version of the keychain item as the keychain item to be synced between the devices. Additional and/or different approaches may be used in some embodiments.

In some embodiments, the method provides a data protection feature for limiting access to keychain data (e.g., keychain items) on a device according to defined set of conditions and/or requirements. For example, each keychain item on a device is specified, in some embodiments, as belonging to a particular protection domain. The method of some embodiments allows a device to access a particular keychain item only when a set of conditions and/or requirements defined for the particular protection domain to which the particular keychain item belongs is met. Examples of conditions and/or requirements include the device being in an unlocked state, the device being in a locked state, a user of the device entering a particular password, etc. Under this approach, access to the keychain items on a device may be controlled in a granular fashion.

FIG. 1 conceptually illustrates synchronizing passwords between several devices A-C according to some embodiments of the invention. Specifically, FIG. 1 illustrates devices A-C at three different stages 105-115 of an example synchronization of passwords between devices A-C. In this example, devices A-C are specified as members of a sync circle that synchronize passwords with each other. Each of the devices A-C may be a desktop computer, a laptop, a smartphone, a tablet, or any other type of computing device.

The first stage 105 illustrates that the passwords 1-3 are synchronized between devices A-C as indicated by each of the devices A-C having copies of the same passwords 1-3. For this example, the passwords 1-3 on each of the devices A-C are stored on the device in an encrypted format that only the device can decrypt and access. This security feature is conceptualized in FIG. 1 by depicting the set of passwords 1-3 in each of the devices A-C as a particular shape. In particular, the passwords 1-3 stored on device A are shown as rectangles, the passwords 1-3 stored on device B are shown as ovals, and the passwords 1-3 stored on device C are shown as irregular convex octagons. As such, in this example device A can only decrypt and access rectangular passwords, device B can only decrypt and access oval passwords, and device C can only decrypt and access irregular convex octagon passwords.

The second stage 110 of FIG. 1 shows that a password 4 is added to device A (e.g., a user of device A using device A to create the password 4). As shown, the password 4 is encrypted and stored on device A in a rectangular shape. In the second stage 110, device A is sending device B and C a copy of the password 4 in order to sync the password 4 with device B and C. in some embodiments, when device A receives the password 4, device A sends to device B a copy of the password 4 that is encrypted in a format that only device B can decrypt and sends to device C another copy of the password 4 that is encrypted in a format that only device C can decrypt. This is indicated by device A sending the password 4 to device B as an oval shape and sending the password 4 to device C as an irregular convex octagon shape.

As mentioned above, some embodiments provide a communication security feature for preventing unauthorized access of communications between the devices. To protect the communication with device B, device A in this example encrypts and sends a copy of the password 4 to device B through a secure channel using a secure communication protocol (e.g., SSL, OTR, etc.). A secure communication channel of some embodiments is an authenticated and encrypted communication channel. In some embodiments, device B stores the password 4 in the encrypted format that was used to transmit the password 4 over the secure channel. Similarly, device C in some embodiments stores the password 4 in the encrypted format that was used to transmit the password over the secure channel.

The third stage 115 shows the passwords 1-4 synchronized between devices A-C. As shown, device B is storing an encrypted copy of the password 4 that device B received from device A and, thus, is in sync with device A. Likewise, device C is storing an encrypted copy of the password 4 that device C received from device A and, therefore, is synchronized with device A. As discussed above, in this example, the password 4 stored on device B is encrypted in a format that only device B can decrypt, and the password 4 stored on device C is encrypted in a format that only device C can decrypt.

Numerous details, examples, and embodiments are described in this application that refer to devices storing passwords for synchronizing among devices that are members of a sync circle. However, one of ordinary skill in the art will understand that in some embodiments one or more of the devices in the sync circle also stores passwords that are not shared (i.e., synchronized) with some or all of the other devices in the sync circle.

Moreover, although the majority of the details, examples, and embodiments explained in this application are directed at syncing passwords that are stored as part of a keychain, one of ordinary skill in the art will realize that the invention is not limited to syncing passwords and that the invention may be practiced to synchronize other types of data (e.g., private keys, certificates, secured notes, etc.) in a keychain among devices in a sync circle. In addition, one of ordinary skill in the art will recognize that the invention can be practiced to synchronize more than one keychain among devices in a sync circle.

Several more detailed embodiments of the invention are described in the sections below. Section I conceptually describes details of example P2P network architectures according to some embodiments of the invention. Next, Section II conceptually describes creating a sync circle and registering devices into the sync circle according to some embodiments of the invention. Section III describes details of synchronizing keychains between devices in a sync circle according to some embodiments of the invention. Next, Section IV describes a data protection feature for keychains according to some embodiments of the invention. Section V describes a software architecture for a keychain manager of some embodiments. Finally, Section VI describes an electronic system that implements some embodiments of the invention.

I. Peer-to-Peer Network Architectures

As mentioned above, some embodiments sync keychains between devices that are members of a sync circle through a P2P network. The P2P network of different embodiments are implemented using different network architectures in order to facilitate communication between the devices in the sync circle. The following figures illustrate several examples of different implementations of P2P network architectures.

Figure 2:
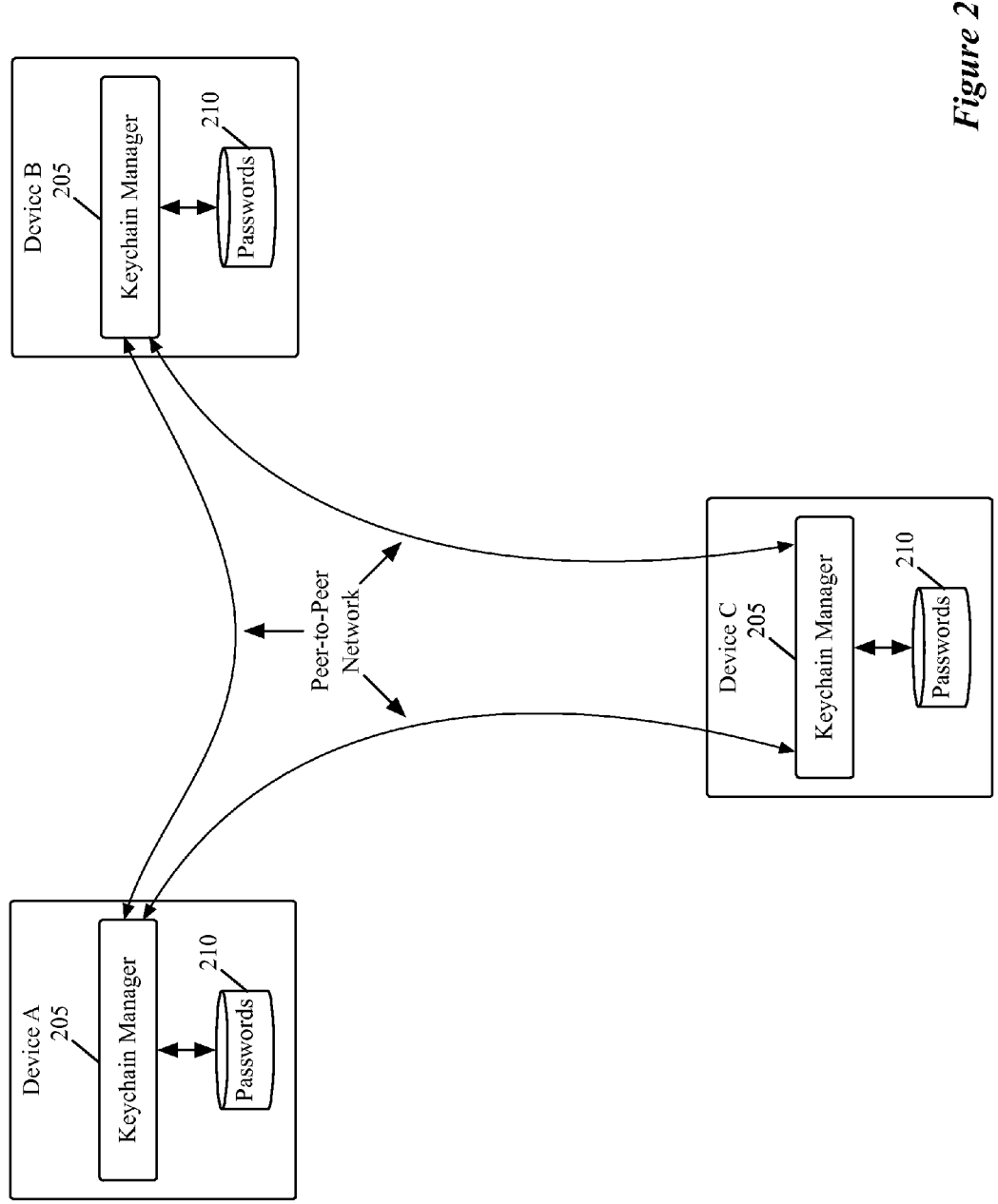
FIG. 2 conceptually illustrates a network architecture for a direct P2P network according to some embodiments of the invention.

FIG. 2 conceptually illustrates a network architecture for a direct P2P network according to some embodiments of the invention. In this example, devices A-C are members of a sync circle. As shown, each of the devices A-C includes a storage 210 for storing passwords and a keychain manager 205. The keychain manager 205 of some embodiments is responsible for performing the functions for facilitating the synchronization of passwords between devices A-C. For instance. In some embodiments, the keychain manager 205 handles the registration of the device into sync circles, syncing passwords between devices A-C, resolving conflicts between conflicting passwords, generating different types of manifests of keychains, providing a secure communication channel for transporting data between devices A-C, etc.

As illustrated in FIG. 2, devices A-C communicate with each other through an overlay network with a fully connected mesh topology. As such, each of the devices A-C can directly communicate with each of the other devices. That is, device A can directly communicate with devices B and C, device B can directly communicate with devices A and C, and device C can directly communicate with devices A and B.

As noted above, some embodiments provide a secure transport layer to protect the data that devices communicate with each other. For this example, devices A-C communicate with each other through secure communication channels established between each pair of devices A-C. The secure communication channels may be implemented using any number of different protocols, such as message-based communication protocols (e.g., OTR messaging), stream-based communication protocols (e.g., SSL), etc.

Figure 3:
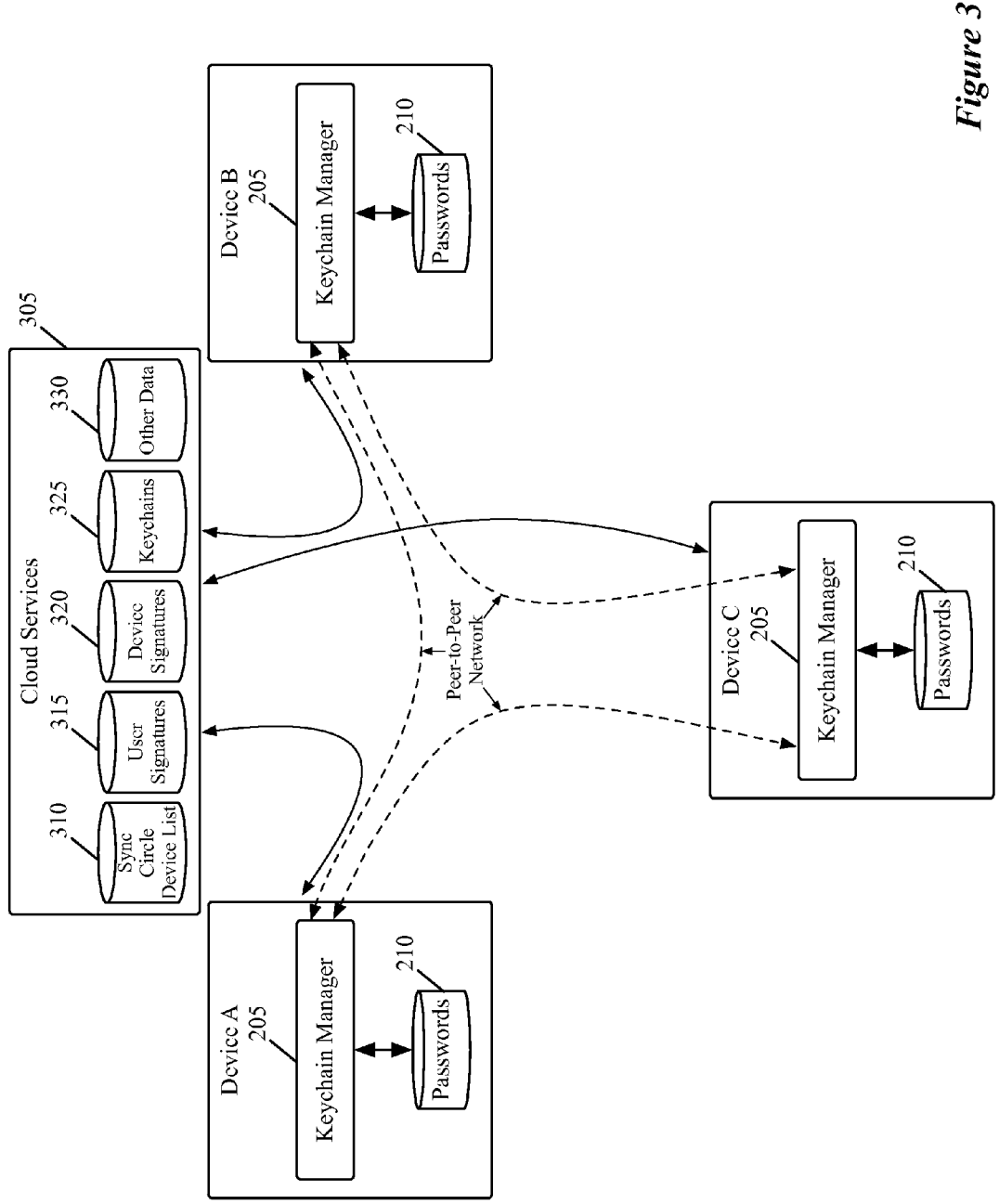
FIG. 3 conceptually illustrates a network architecture for an indirect P2P network according to some embodiments of the invention.

FIG. 3 conceptually illustrates a network architecture for an indirect P2P network according to some embodiments of the invention. Similar to FIG. 2, for this example, devices A-C are members of a sync circle and each of the devices A-C includes the storage 210 and the keychain manager 205.

As shown in FIG. 3, devices A-C communicate with each other through an overlay network with a star topology. In particular, devices A-C communicate with each other through cloud services 305, which serves as the center of the star topology and provides a cloud storage service for storing data as well as other cloud services (e.g., cloud computing services). For instance, when device A wishes to communicate data to device B, device A stores the data in the cloud services 305, the cloud services 305 notifies (e.g., via a push notification service) device B about the data, and device B retrieves the data from the cloud services 305.

As illustrated, the cloud services 305 stores a name for a sync circle and a sync circle device list in storage 310 that specifies the devices that are members of the sync circle. In some embodiments, the devices are specified by data uniquely identifying the devices. Examples of such data include a public key of a device signing public/private key pair for authenticating the identity of a device, a device type of the device (e.g., a desktop computer, a tablet, a smartphone, etc.), a name of the device, etc., or a combination of any number of such data.

The cloud services 305 also stores user signatures in storage 315. A user signature in some embodiments is a digital signature for authenticating the identity of a user as the signer of a message, document, or any other type of data. In some embodiments, the sync circle is linked to a cloud services account and devices associated with the cloud services account (e.g., devices that have an application or program for accessing the cloud services associated with the account) are candidates for registering into the sync circle. The storage 315 in some such embodiments includes signatures signed with a private key of a user signing public/private key pair generated based on a password of the cloud services account to indicate that the user of the cloud services 305 account is the signer. Examples of user signatures that are stored in the storage 315 include a signature of the sync circle device list signed with a private key of a user signing public/private key pair, signatures of registration requests signed with the private key of the user signing key pair, and/or any other signatures for authenticating the identity of the user of the cloud services account.

FIG. 3 also shows that the cloud services 305 stores device signatures in storage 320. In some embodiments, a device signature is a digital signature for authenticating the identity of a device in the sync circle as the signer of a message, document, or any other type of data. For example, in some embodiments, the storage 320 includes signatures of the sync circle device list signed with a private key of a device signing public/private key pair that belongs to a device that is a member of the sync circle. Such a signature indicates that the signing device affirms the list of devices in the sync circle device list as the members of the sync circle. In some embodiments, when the sync circle is in a steady state (e.g., no registration requests are pending nor unapproved), the device signatures in the storage 320 includes for each device that is a member of the sync circle a signature of the sync circle device list signed with a private key of the device's device signing public/private key pair. That is, the signatures in such instances collectively indicate that every device listed in the sync circle device list agrees that the devices listed in the sync circle device list are the members of the sync circle.

In addition, the cloud services 305 stores keychain data in storage 325 for syncing keychains between the devices in the sync circle, and other data in storage 330 that may include a public key of a user signing public/private key pair, a random string (e.g., a 256-bit string) shared between the devices in the sync circle for generating the user signing key pair, and a list of pending registration requests. In some embodiments, the cloud services 305 implements the storages 310-330 as key-value stores.

While the storages 310-330 are illustrated in FIG. 3 as separate storages, in some embodiments, the storages 310-330 are implemented as a single storage, while, in other embodiments, the storages 310-330 are implemented across several storages.

In some embodiments, the secure transport layer described above by reference to FIG. 2 is utilized to protect the data that devices communicate with each other through the cloud services 305. That is, while devices A-C communicate with each other through secure communication channels established between each pair of devices A-C, the devices A-C use the cloud services 305 as a mechanism for transporting the communications. The secure communication channels of some embodiments may be implemented in some embodiments using any number of different protocols (e.g., message-based communication protocols (e.g., OTR messaging), stream-based communication protocols (e.g., SSL), etc.).

II. Sync Circles

As described above, devices that are members of a circle sync circle synchronize keychains among the devices. Such devices are also referred to as peer devices or simply peers in this application. The following section describes examples of creating a sync circle for syncing keychains between devices of the sync circle and adding devices to the sync circle.

Figure 4:
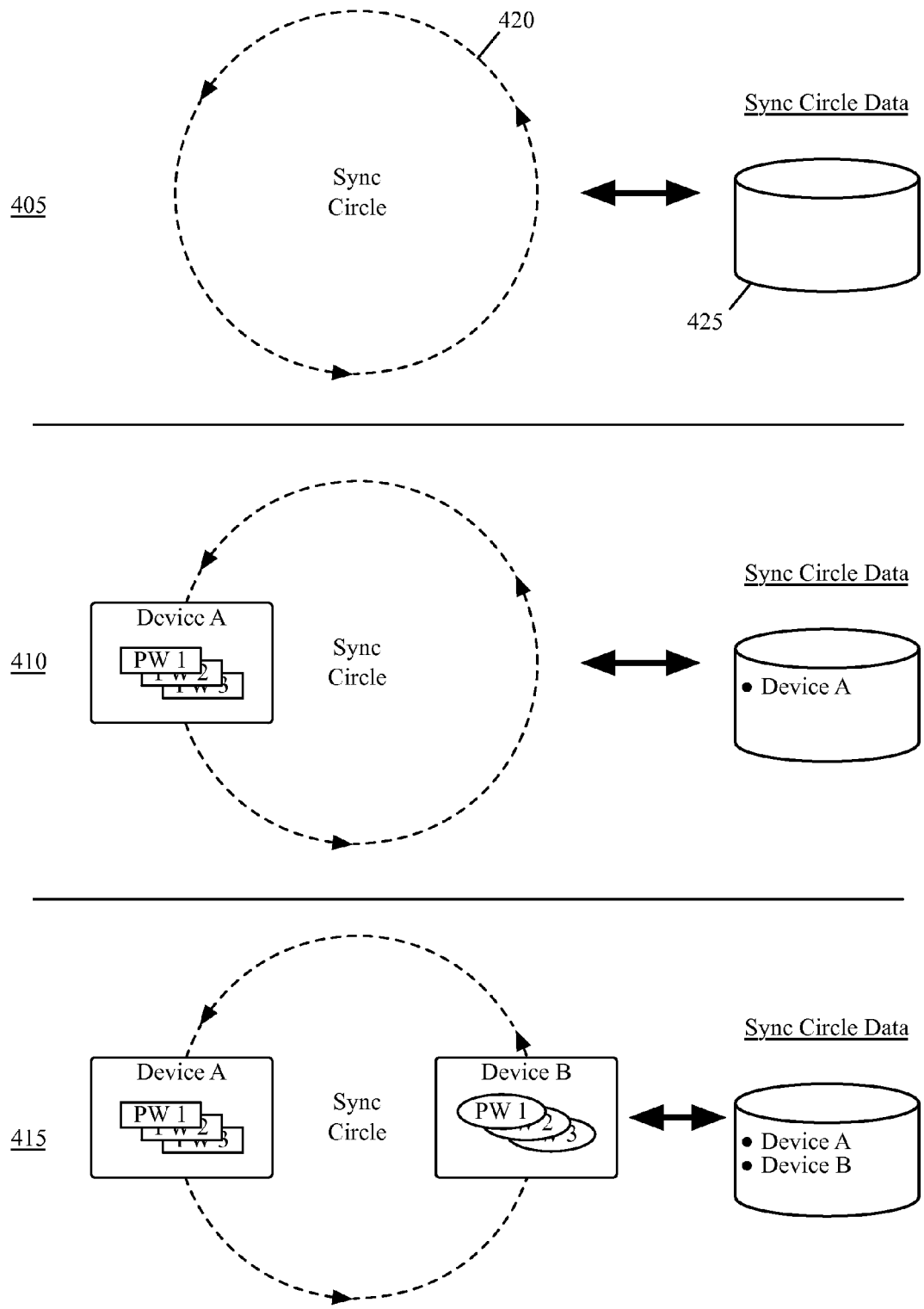
FIG. 4 conceptually illustrates an example of starting a sync circle and adding devices to the sync circle according to some embodiments of the invention.

FIG. 4 conceptually illustrates an example of starting a sync circle 420 and adding devices to the sync circle 420 according to some embodiments of the invention. In particular, FIG. 4 illustrates three stages 405-415 of registering devices A and B into the sync circle 420. Each of the stages 405-410 shows a conceptual depiction of the sync circle 420 and a storage 425 that stores data for the sync circle 420. In some embodiments, the storage 425 is implemented in the cloud storage service 305 and includes the data in storages 310-330, which is described above by reference to FIG. 3. In conjunction with implementing the storage 425 in a cloud storage service, each device that is a member of the sync circle 420 stores a copy of the data in the storage 425 locally on the device, in some embodiments.

The first stage 405 illustrates the sync circle 420 with no devices registered into the sync circle 420. As shown, the sync circle 420 is empty and the storage 425 contains no data regarding members of the sync circle 420. The sync circle 420 of some embodiments is linked to a cloud storage service account and devices associated with the cloud storage service account (e.g., devices that have an application or program for accessing the cloud storage associated with the account) are candidates for registering into the sync circle 420. The storage 425 in some such embodiments stores metadata describing the devices associated with the account.

The second stage 410 shows the sync circle 420 with a device registered into the sync circle 420. As shown in the second stage 410, device A is registered into the sync circle 420 and the storage 425 is storing data identifying device A as a member of the sync circle 420. In some embodiments, the sync circle 420 does not actually exist when the sync circle 420 is empty. The sync circle 420 is created in some such embodiments when a first device registers into the sync circle 420. When a user of one of the devices associated with the cloud storage service account enables a keychain syncing feature on the device, the device creates the sync circle 420 and registers itself into the sync circle 420.

To register into the sync circle 420, the device A stores data in the storage 425 that uniquely identifies device A as a member of the sync circle 420. Examples of such data include a public key of a device signing public/private key pair for authenticating device A, a device type of device A (e.g., a desktop computer, a tablet, a smartphone, etc.), a name of device A, etc., or a combination of any number of such data.

In some embodiments, each device that is in the sync circle 420 or may potentially join the sync circle 420 uses the same public-key cryptography algorithm (e.g., an RSA algorithm, an elliptic curve cryptography (ECC) algorithm, etc.) to generate the device signing key pair so that the devices may encrypt and decrypt each others' messages. Additionally, each device generates in some embodiments a device signing public/private key pair randomly. This way, each device generates a unique device signing public/private key pair that is different from the device signing public/private key pairs generated by any other device.

In some embodiments, device A (1) generates a signature of the data identifying the members of the sync circle 420 (the data uniquely identifying device A in this example) by encrypting the data with a private key of a user signing public/private key pair for authenticating the user of the cloud storage service account and (2) stores the signed data in the storage 425. The user signing public/private key pair of some embodiments is generated based on (1) a password associated with the cloud storage service account and (2) a random string (e.g., a 256-bit string) that is shared among the devices in the sync circle 420.

Each device that is in the sync circle 420 or may potentially join the sync circle 420 uses in some embodiments the same public-key cryptography algorithm (e.g., an RSA algorithm, an ECC algorithm, etc.) to generate the user signing key pair. In some embodiments, such devices utilizes the public-key cryptography algorithm that is used to generate a device signing key pair to also generate a user signing key pair. The devices all generate the same public/private key pair since the devices each uses the password associated with the cloud storage service account and the random string as input for the same public-key cryptography algorithm. As such, the signature of the data identifying the members of the sync circle 420 in this example is for authenticating that the user of the cloud storage service account is registering device A into the sync circle 420. Since device A is the first device registered into the sync circle 420, device A stores the public key of the user signing key pair and the random string in the storage 425.

The third stage 415 illustrates another device registered into the sync circle 420. As shown, device B is registered into the sync circle 420, and the storage 425 is storing data identifying device B as also a member of the sync circle 420. In addition, since device A and device B are members of the sync circle 420, the passwords on devices A and B are synchronized.

In order for device B to register into the sync circle 420, some embodiments require (1) that device B submit a request to join the sync circle 420 by storing the request in the storage 425 and (2) that device A approve of the request. Different embodiments define different requirements to approve a request to join a sync circle. For instance, some embodiments require only one device that is a member of the sync circle to approve of the request while other embodiments require every device that is a member of the sync circle to approve of the request.

Figure 5:
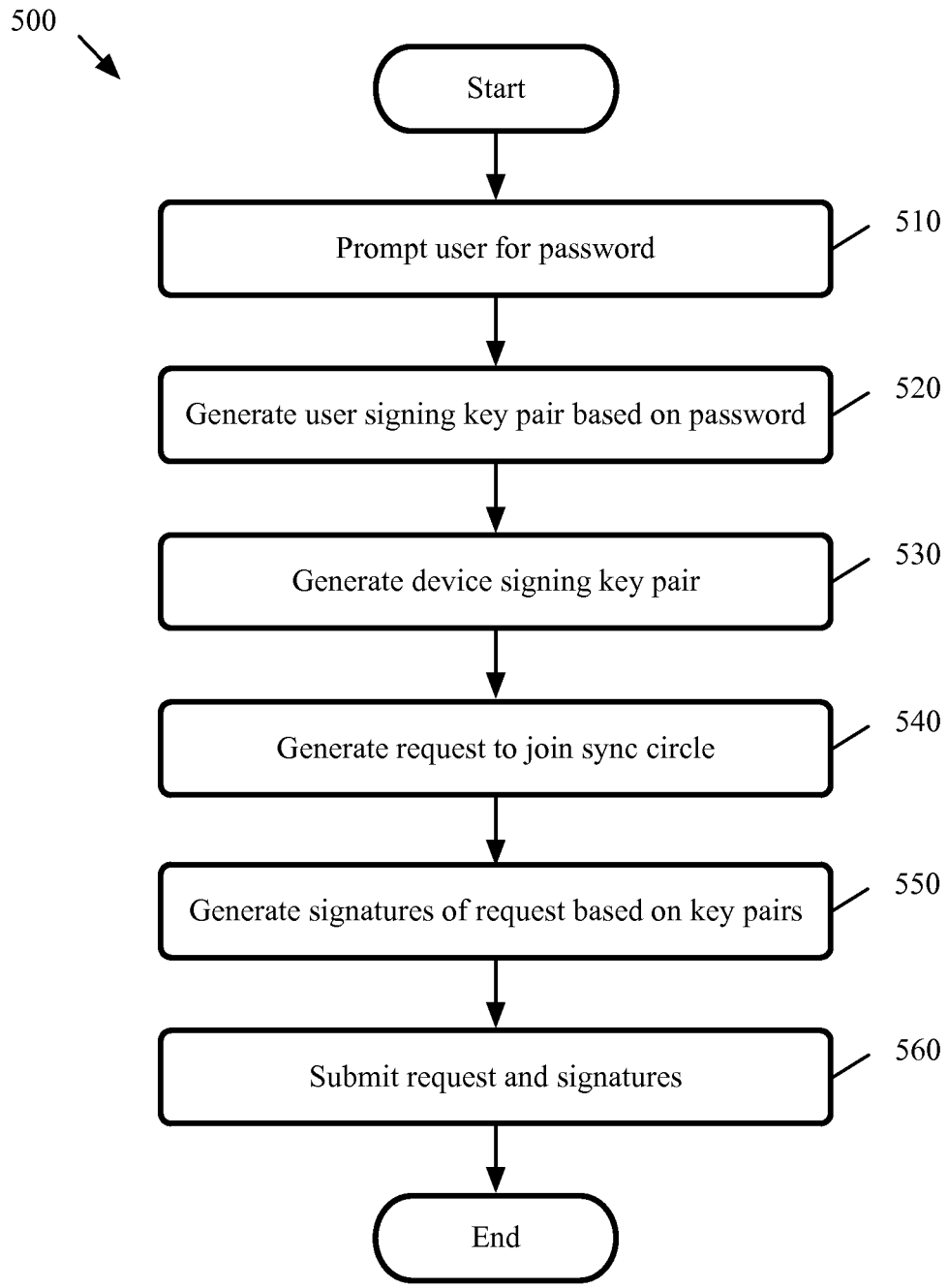
FIG. 5 conceptually illustrates a process of some embodiments for requesting to join a sync circle.

FIG. 5 conceptually illustrates a process 500 of some embodiments for requesting to join a sync circle. In some embodiments, a device requesting to join a sync circle performs the process 500 (e.g., upon a user of the device enabling a keychain syncing feature on the device). The process 500 will be described by reference to device B of FIG. 4 performing the process 500.

The process 500 starts by prompting (at 510) a user of device B for a password. In some embodiments, the process 500 prompts the user for the password by displaying a pop-up window on the display screen of device B requesting the user to enter the password to the cloud storage service account.

Next, the process 500 generates (at 520) a user signing public/private key pair based on the password provided by the user. In some embodiments, the process 500 generates the user signing key pair based on the password and the random string for sharing between members of the sync circle 420. The process 500 of some such embodiments retrieves the random string from the storage 425 in order to generate the user signing key pair. In different embodiments, the process 500 of uses different techniques to generate a user signing key pair. For instance, in some embodiments, the process 500 may use an RSA algorithm, an ECC algorithm, or any other type of public-key cryptography, to generate the device signing key pair.

The process 500 then generates (at 530) a device signing public/private key pair for authenticating device B. The process 500 of different embodiments uses different techniques to generate a device signing key pair. In some embodiments, the process 500 generates the device signing key pair using the same type of public-key cryptography used to generate the user signing key pair at 520. In other embodiments, the process 500 uses a different type of public-key cryptography to generate the device signing key pair.

Once the device signing key pair is generated, the process 500 generates (at 540) a request to join the sync circle 420. In some embodiments, the request includes the public key of device B's device signing key pair for uniquely identifying device B and the list of devices in the sync circle 420 that the process 500 retrieves from the storage 425.

Next, the process 500 generates (at 550) signatures of the request based on the generated key pairs. Specifically, the process 500 generates (1) a signature of the request with the private key of the user signing key pair and (2) a signature of the request with the private key of device B's device signing key pair.

Finally, the process 500 submits (at 560) the request and the generated signatures. In some embodiments, the process 500 submits the request by adding the request to a registration request list stored in the storage 425. The process 500 of some embodiments submits the signatures by storing in the storage 425 the signature of the request signed with the private key of the user signing key pair and the signature of the request with the private key of device B's device signing key pair.

Figure 6:
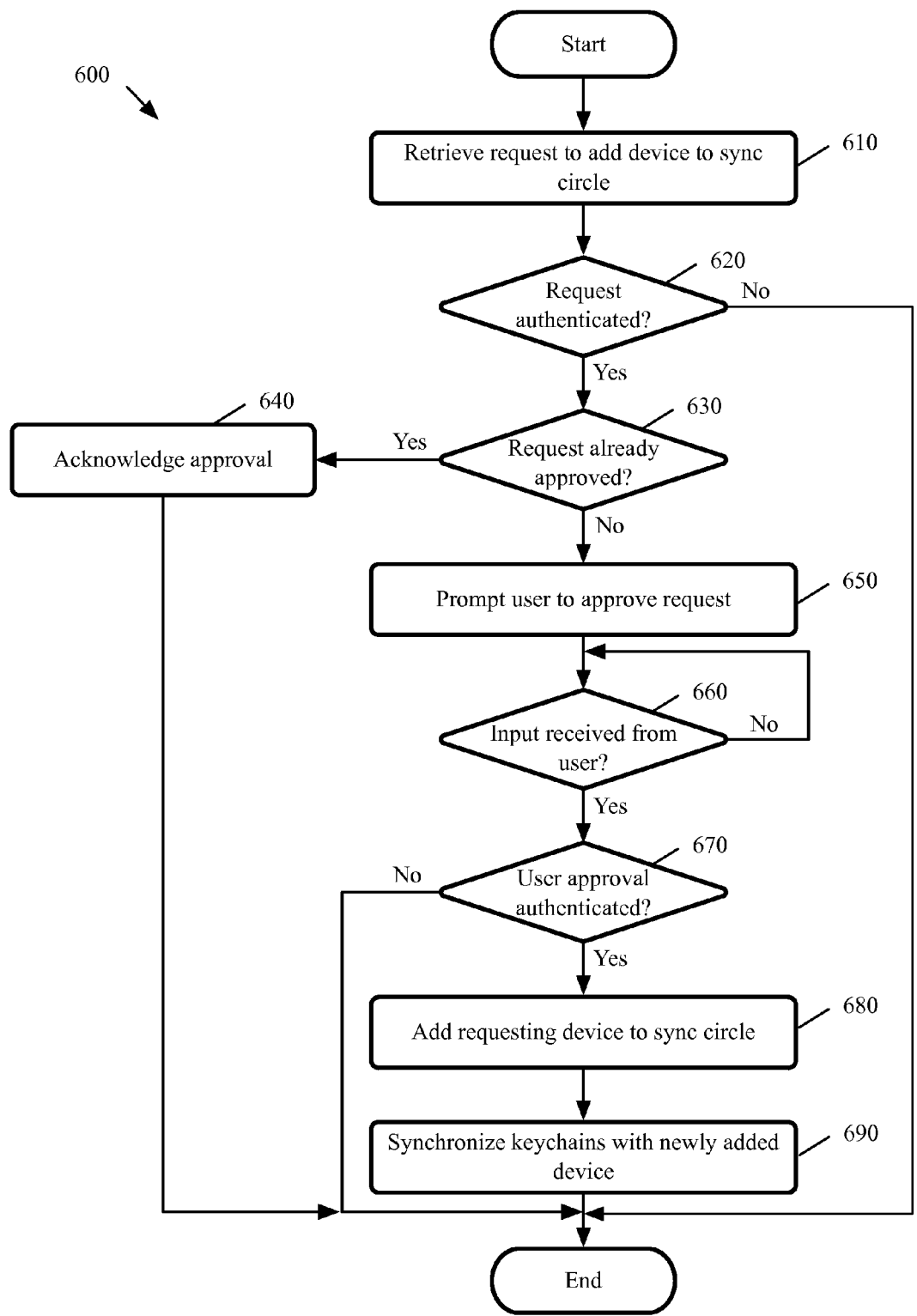
FIG. 6 conceptually illustrates a process of some embodiments for processing a request to join a sync circle.

FIG. 6 conceptually illustrates a process of some embodiments for processing a request to join a sync circle. In some embodiments, a device that is a member of the sync circle performs the process 600 when the device receives a notification (e.g., via a push notification service) that a request to join the sync circle has been submitted and is pending. The process 600 will be described by reference to device A of FIG. 4 performing the process 600.

The process 600 begins by retrieving (at 610) the request to add device B to the sync circle 420. In some embodiments, the process 600 retrieves the request by accessing the storage 425 and retrieving the request from the registration request list, the signature of the request signed with the private key of device B's device signing key pair, and the signature of the request signed with the private key of the user signing key pair.

Next, the process 600 determines (at 620) whether the request is authenticated. In some embodiments, the process 600 authenticates the request when the process 600 verifies (1) that the user of the cloud storage service account submitted the request to register device B into the sync circle 420 and (2) that the request to register a device into the sync circle 420 is actually for registering device B. To verify that the user of the cloud storage service account submitted the request to register device B, the process 600 of some embodiments (1) decrypts the signature of the request that was signed with the private key of the user signing key pair with the public key of the user signing key pair and (2) checks that the request data retrieved from the registration request list matches the decrypted signature. In other words, the process 600 checks that the decrypted signature of the request signed with the private key of the user signing key pair includes the public key of device B's device signing key pair and the list of devices in the sync circle 420.

In some embodiments, the process 600 verifies that the request to register a device into the sync circle 420 is for registering device B by (1) decrypting the signature of the request that was signed with the private key of device B's device signing key pair with the public key of device B's device signing key pair and (2) checking that the request data retrieved from the registration request list matches the decrypted signature. Alternatively or in addition to decrypting the signature of the request that was signed with the private key of device B's device signing key pair, the process 600 of some embodiments uses other techniques to verify that the request to register a device into the sync circle 420 is for registering device B. For instances, the process 600 may prompt the user to enter a password, passcode, personal identification number (PIN) code, etc., that was randomly generated and displayed on device B when device B requested to register into the sync circle, select an image displayed on device A that matches an image displayed on device B when device B was requesting to register into the sync circle 420, etc.

At 630, the process 600 determines whether the request is already approved by a device in the sync circle. In some embodiments, the process 600 determines that the request is already approved by a device in the sync circle when the storage 425 includes a signature of (1) the list of devices in the sync circle 420 and (2) the requesting device that is signed with the private key of a device signing public/private key pair that belongs to a device in the sync circle.

When the process 600 determines that the request is already approved, the process 600 acknowledges (at 640) the approval of the request and then the process 600 ends. The process 600 of some embodiments acknowledges the approval of the request by (1) generating a signature of the sync circle device list (which now includes the newly approved device) with the private key of the device signing key pair of the device on which the process 600 is running and (2) storing the generated signature with device signatures in the storage 425.

When the process 600 determines that the request is not already approved, the process 600 prompts (at 650) the user to approve the request. Different embodiments approve requests in different ways. For example, the process 600 of some embodiments approves the request when the user provides the password to the cloud storage service account. Since the device of some embodiments does not store the password to the cloud storage service account when the user enters it into the device, the process 600 of some embodiments prompts the user for the password by displaying a pop-up window on the display screen of device A that (1) indicates the device name of device B (e.g., "John Doe's smartphone") has requested to join the sync circle 420 and (2) requests the user to enter the password associated with the cloud storage service account.

Next, the process 600 determines (at 660) whether input to approve the request is received from the user. When the process 600 determines that input for approving the request is not received, the process returns to 660 to continue checking for input from the user. When the process 600 determines that input for approving the request is received, the process 600 proceeds to 670

At 670, the process determines whether the user approval is authenticated. In instances where the password to the cloud storage service account is used to verify that the user of the cloud storage service account approved the request, the process 600 of some embodiments authenticates the user approval by generating a user signing public/private key pair based on the password provided by the user at 650 and the random string stored in the storage 425 and verifies that the public key that the process 600 generated matches the public key of the user signing key pair stored in the storage 425. As explained above, each device that is in the sync circle 420 or may potentially join the sync circle 420 uses the same algorithm to generate the user signing key pair in some embodiments. Thus, the public key generated by the process 600 matching the public key of the user signing key pair stored in the storage 425 verifies that the user of the cloud storage service account approved the request.

When the process 600 determines that the user approval is not authenticated, the process 600 ends. When the process 600 determines that the user approval is authenticated, the process 600 adds (at 680) the requesting device to the sync circle. In some embodiments, the process 600 adds device B to the sync circle 420 by adding data uniquely identifying device B to the sync circle device list for the sync circle 420, generating a signature of the sync circle device list with the private key of device A's device signing key pair, and storing the generated signature with the device signatures in the storage 425.

Finally, the process 600 synchronizes (at 690) with device B the keychains that are specified to be synchronized between devices in the sync circle 420. In some embodiments, the process 600 synchronizes keychains using the techniques described below by reference to FIGS. 7-15.

While FIG. 6 illustrates adding a requesting device to a sync circle upon one device in the sync circle approving of the request, one of ordinary skill will understand that any number of different approval requirements may be used in different embodiments. For instance, some embodiments may require all the devices, a defined number of devices, a defined percentage of devices, etc., in the sync circle to approve the device before the requesting device may be added to the sync circle.

Some embodiments allow a device to be removed from a sync circle. For instance, if a user of a device in the sync circle suspects that another device in the sync circle was not authorized to join the sync circle, the user lost a device in the sync circle, a device in the sync circle was stolen, etc., the user may remove the unwanted device from the sync circle. Different embodiments handle the removal of a device from a sync circle differently. For example, in some embodiments, when a device is removed from a sync circle, the remaining devices in the sync circle continue synchronizing passwords between the remaining devices. The removed device in some such embodiments is required to go through the registration process (e.g., the ones described above by reference to FIGS. 4-6) again in order for the device to be added back into the sync circle. Under another approach, the sync circle is destroyed (e.g., the sync circle device list is deleted) when a device is removed from a sync circle. In such cases, the sync circle must be reestablished and devices added to the newly established sync circle (e.g., using the examples and processes described above by reference to FIGS. 4-6).

III. Synchronizing Passwords

Once a sync circle is established and at least two devices are registered into the sync circle, the method of some embodiments is used to facilitate the syncing of keychains between the devices that are specified as members of the sync circle. As noted above, in some embodiments, the method utilized a P2P network to communicate data between the devices in order to sync the keychains between the devices.

Figure 7:
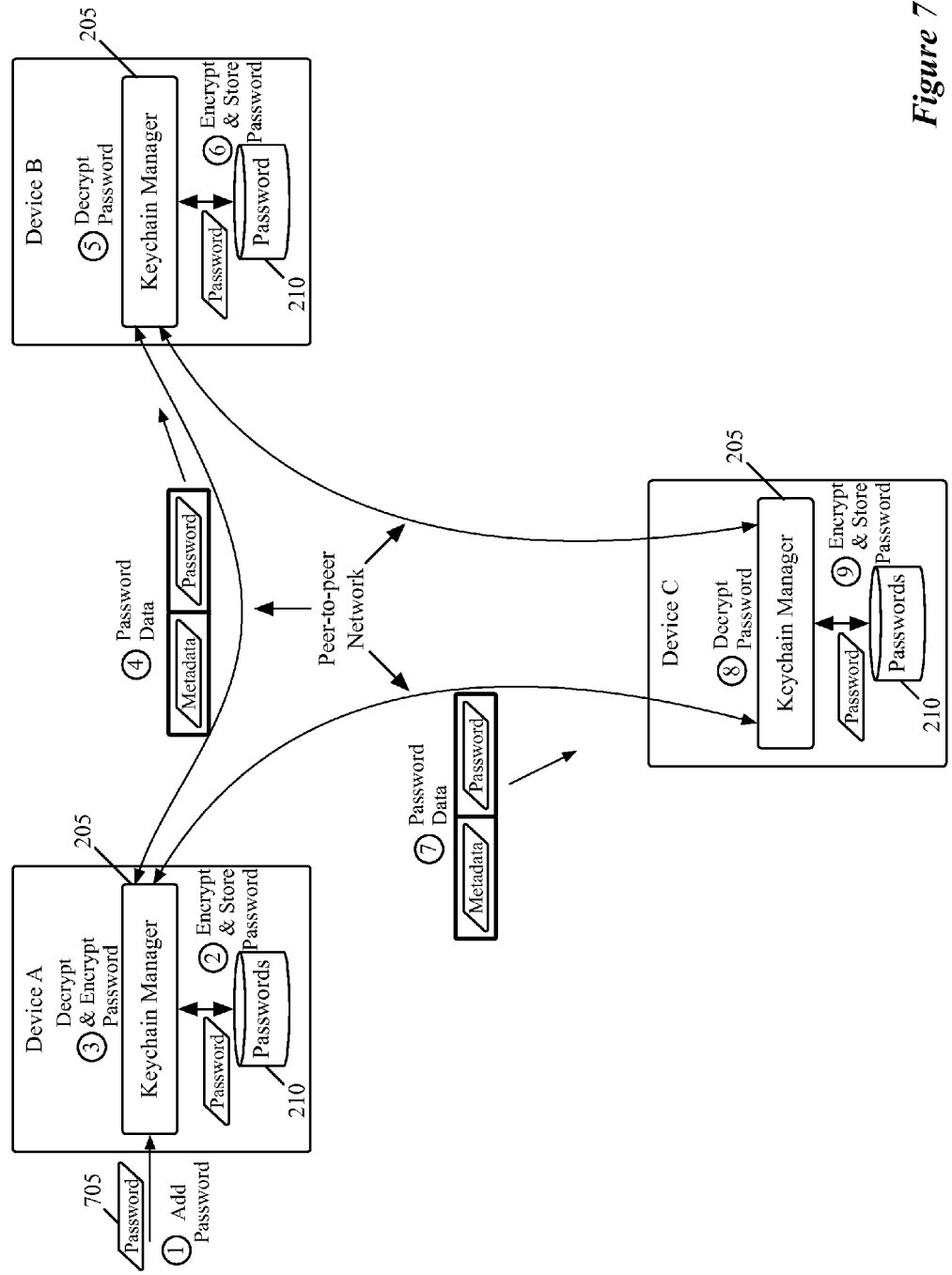
FIG. 7 conceptually illustrates an example data flow through the network architecture illustrated in FIG. 2 for syncing passwords.

FIG. 7 conceptually illustrates an example data flow through the network architecture illustrated in FIG. 2 for syncing passwords. Specifically, FIG. 7 conceptually illustrates data flow operations 1-9 for synchronizing passwords between devices that are members of a sync circle when a new password is created on one of the devices in the sync circle. In this example, the establishment of the sync circle and the registration of devices A-C into the sync circle are implemented using techniques similar to the ones described above by reference to FIGS. 4-6.

As mentioned, the network architecture illustrated in FIG. 7 is similar to the one described above by reference to FIG. 2. That is, each of the devices A-C includes the keychain manager 205 for facilitating the synchronization of passwords and the storage 210 for storing passwords. In addition, devices A-C communicate with each other through an overlay network with a fully connected mesh topology that allows each of the devices A-C to directly communicate with each of the other devices. In some embodiments, for every pair of the devices A-C (i.e., devices A and B, devices A and C, and devices B and C), the keychain managers 205 on the devices facilitate the provisioning of a secure communication channel (e.g., using OTR messaging, SSL, etc.) between the pair of devices for transporting data between the devices.

Before the start of the data flow operations 1-9 in FIG. 7, the passwords on devices A-C are synchronized. In other words, devices A-C each have the same passwords stored in the storage 210. The data flow starts by adding (at encircled 1) a password 705 to device A. For example, a user of device A might have installed a social networking application (e.g., a Facebook® application, a Twitter® application, a Google+® application, a LinkedIn® application, etc.) that requires the user to enter a username and password associated with the user's social networking account.

When device A receives the new password 705, device A encrypts and stores (at encircled 2) the password 705 in device A's storage 210. In some embodiments, the passwords stored in the storages 210 of devices A-C are protected using a symmetric-key algorithm (a data encryption standard (DES) algorithm, a triple data encryption algorithm (TDEA), an advanced encryption standard (AES) using 256-bit block sizes and a Galois/Counter Mode (GCM), etc.) and a key (e.g., a password or passcode for logging into the device, a random key generated by the device or assigned, etc., or a combination of any number of such keys). When device A stores the password 705 in the storage 210, the keychain manager 205 encrypts the password using the symmetric-key algorithm and the key.

After storing the password 705, device A decrypts and encrypts (at encircled 3) the password 705 for each of the devices B and C. To decrypt the encrypted password 705 stored in the storage 210, the keychain manager 205 uses the symmetric-key algorithm and the key described above that is used to encrypt the password 705 when device A stores the password 705 in the storage 210.

As mentioned above, a secure communication channel is used between every pair of devices A-C to protect data that is transported between the devices. Since the pair of devices A and B and the pair of devices A and C each uses separate secure communication channels, the keychain manager 205 of device A encrypts a copy of the password 705 to send to device B using a first key or set of keys based on the secure communication channel device A has established with device B. The keychain manager 205 of device A also encrypts another copy of the password 705 to send to device C using a second, different key or set of keys based on the secure communication channel device A has established with device C.

As an example, a secure communication channel between devices A and B and a secure communication channel between devices A and C are each implemented in some embodiments using OTR messaging. In some such embodiments, an OTR session is established between devices A and B based on public/private key pairs of devices A and B. In addition, another, separate OTR session is established between devices A and C based on public/private key pairs of devices A and B. In some embodiments, the device signing key pairs are the same ones generated for registering devices A-C into a sync circle, as described above by reference to FIGS. 4-6.

Once the keychain manager 205 of device A encrypts a copy of the password 705 for device B, device A sends (at encircled 4) the encrypted copy of the password 705 and metadata describing the password 705 to device B through the secure communication channel established between devices A and B. Examples of metadata for describing the password 705 includes a type of the password (an Internet password, an application password, a network password, etc.), a name of an application or website to which the password is associated or for which the password is used, a path of the application or website, etc.

When device B receives the encrypted copy of the password 705, device B decrypts (at encircled 5) the copy of the password 705 by using a key or set of keys generated for the secure communication channel established with device A. Upon decrypting the copy of the password 705, device B encrypts and stores (at encircled 6) the copy of the password 705 in the storage 210 of device B. Device B is now updated with the password 705 and, therefore, the passwords stored on device B are synchronized with the passwords stored on device A.

Turning to the data flow operations for syncing passwords between devices A and C, after the keychain manager 205 of device A encrypts a copy of the password 705 for device C, device A sends (at encircled 7) the encrypted copy of the password 705 and metadata describing the password 705 to device C through the secure communication channel established between devices A and C. In some embodiments, the metadata that device A sent along with the encrypted copy of the password 705 to device B is the same metadata that device A sends to device C.

Upon receiving the encrypted copy of the password 705, device C decrypts (at encircled 8) the copy of the password 705 by using a key or set of keys generated for the secure communication channel established with device A. When device C has decrypted the copy of the password 705, device C then encrypts and stores (at encircled 9) the copy of the password 705 in the storage 210 of device C. Device C is now updated with the password 705 and, thus, the passwords stored on device C are synchronized with the passwords stored on device A.

Figure 8:
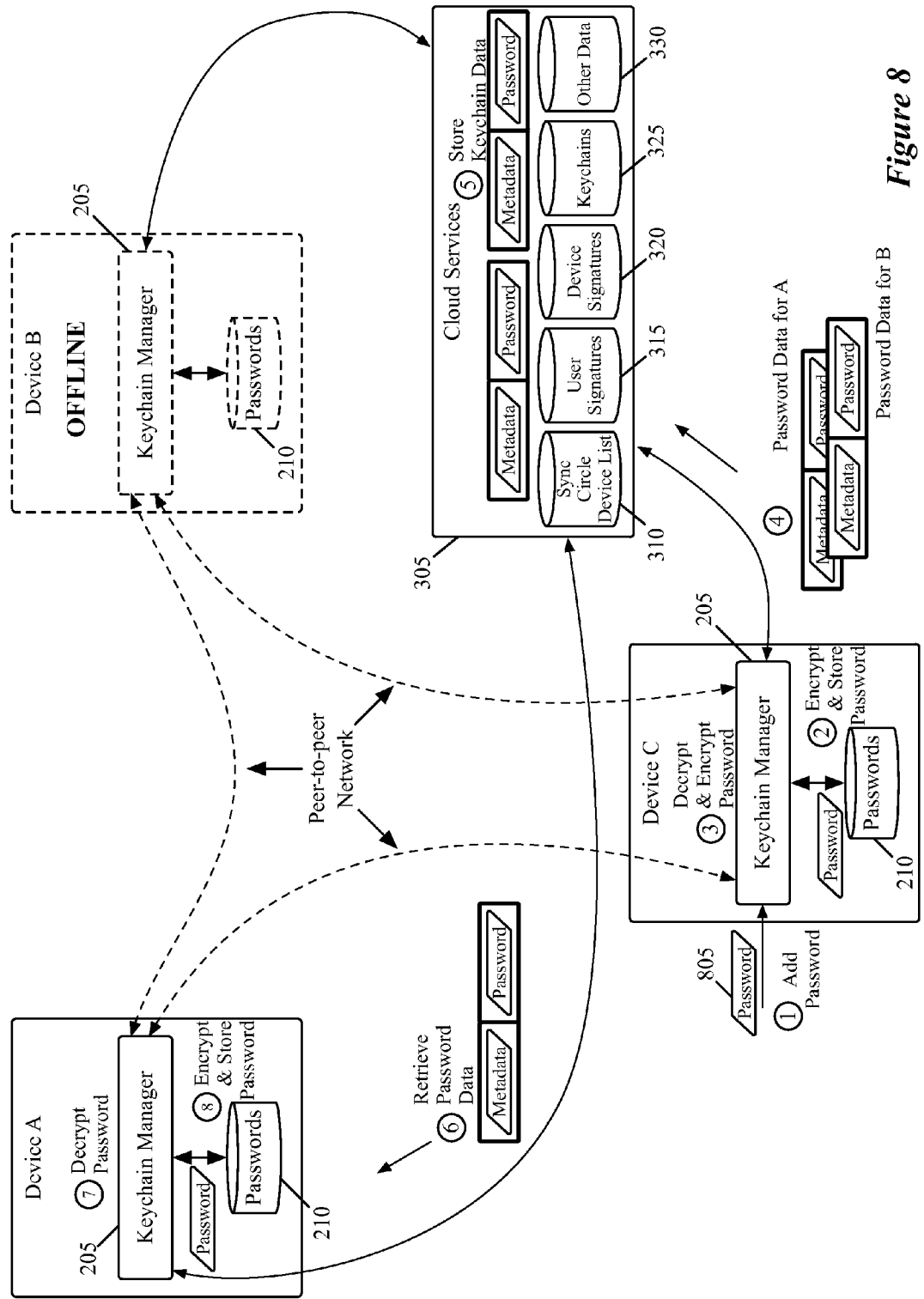
FIGS. 8 and 9 conceptually illustrate an example data flow through the network architecture illustrated in FIG. 3 for syncing passwords.
Figure 9:
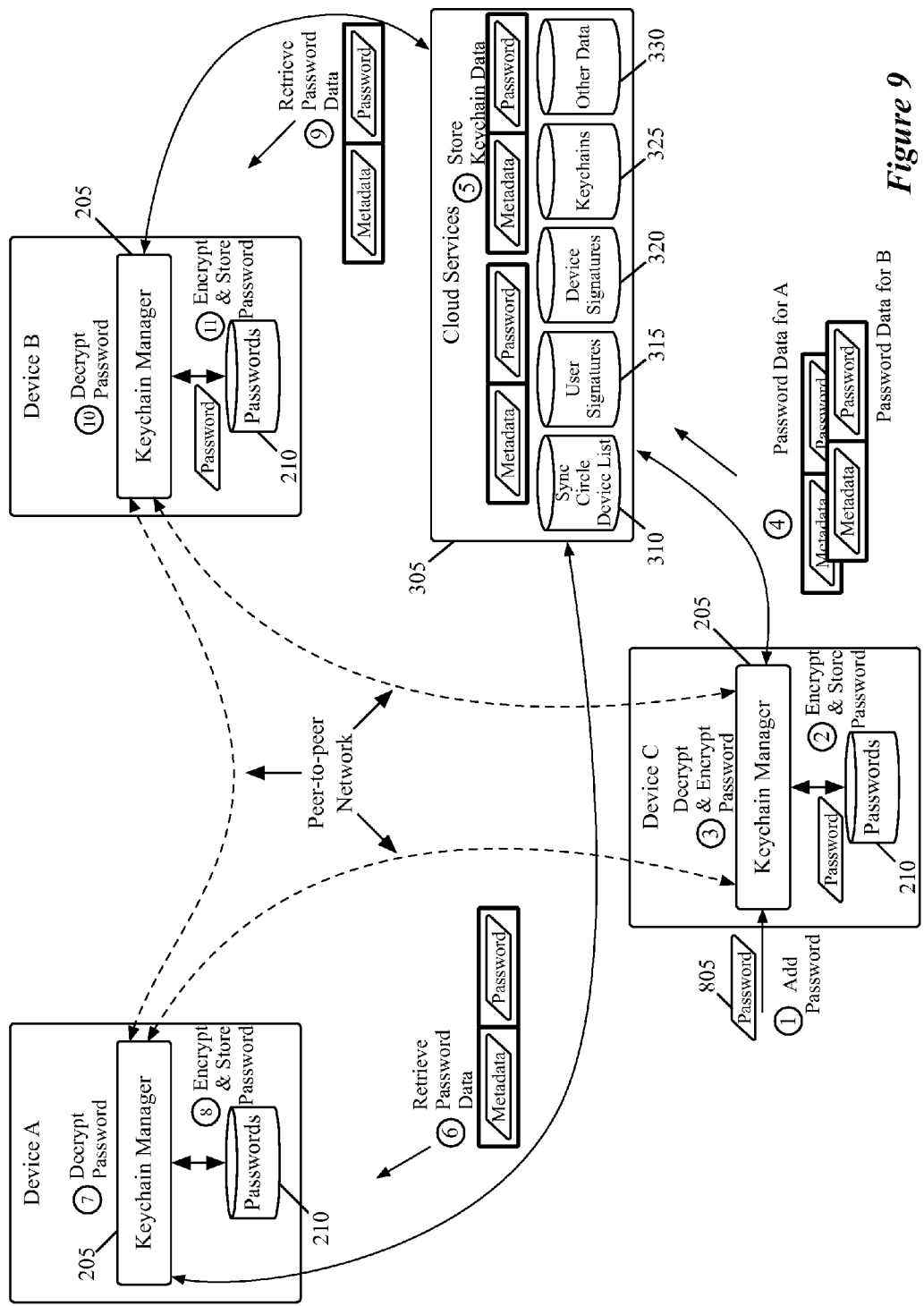

FIGS. 8 and 9 conceptually illustrate an example data flow through the network architecture illustrated in FIG. 3 for syncing passwords. In particular, FIGS. 8 and 9 conceptually illustrate data flow operations 1-11 for synchronizing passwords between devices that are members of a sync circle when a new password is created on one of the devices in the sync circle. FIG. 8 conceptually illustrates data flow operations 1-8, which are performed in response to a new password created on device C, for synchronizing passwords between devices C and A while device B is offline. FIG. 9 conceptually illustrates device B coming online and syncing device B's passwords with devices C and A. In this example, the establishment of the sync circle and the registration of devices A-C into the sync circle are implemented using techniques similar to the ones described above by reference to FIGS. 4-6.

As mentioned, the network architecture illustrated in FIGS. 8 and 9 are similar to the one described above by reference to FIG. 3. That is, each of the devices A-C includes the keychain manager 205 for facilitating the synchronization of passwords and the storage 210 for storing passwords. Also, devices A-C communicate with each other through an overlay network with a star topology that allows with each of the devices A-C to indirectly communicate with each of the other devices through cloud services 305, which serves as the center of the star topology and provides a cloud storage service for storing data. The cloud services 305 of some embodiments stores a name for a sync circle and a sync circle device list in the storage 310, user signatures in the storage 315 for authenticating a user of the devices, device signatures in the storage 320 for authenticating devices in the sync circle, keychain data in the storage 325 for syncing keychains between the devices in the sync circle, and other data in the storage 330. Additionally, in some embodiments, for every pair of the devices A-C (i.e., devices A and B, devices A and C, and devices B and C), the keychain managers 205 on the devices establish a secure communication channel (e.g., using OTR messaging, SSL, etc.) between the pair of devices through which the pair of devices communicate. The devices A-C in this example data use the cloud services 305 as the means for transporting the communications.

Prior to the start of the data flow operations 1-11 in FIGS. 8 and 9, the passwords on devices A-C are synchronized. That is, devices A-C each have the same passwords stored in the storage 210. Additionally, the data flow begins by adding (at encircled 1) a password 805 to device C. For instance, a user of device C might have installed a social networking application (e.g., a Facebook® application, a Twitter® application, a Google+® application, a LinkedIn® application, etc.) that requires the user to enter a username and password associated with the user's social networking account.

When device C receives the new password 805, device C encrypts and stores (at encircled 2) the password 805 in device C's storage 210. In some embodiments, the passwords stored in storages 210 of devices A-C are protected using a symmetric-key algorithm (a data encryption standard (DES) algorithm, a triple data encryption algorithm (TDEA), etc.) and a key (e.g., a password or passcode for logging into the device, a random key generated by the device or assigned, etc., or a combination of any number of such keys). When device A stores the password 805 in the storage 210, the keychain manager 205 encrypts the password 805 using the symmetric-key algorithm and the key.

After storing the password 805, device C decrypts and encrypts (at encircled 3) the password 805 for each of the devices A and C. To decrypt the encrypted password 805 stored in the storage 210, the keychain manager 205 uses the symmetric-key algorithm and the key described above that is used to encrypt the password 805 when device C stores the password 805 in the storage 210.

As noted above, a secure communication channel is used between every pair of devices A-C to protect data that is transported between the devices. Since the pair of devices A and B and the pair of devices A and C each uses separate secure communication channels, the keychain manager 205 of device A encrypts a copy of the password 805 to send to device B using a first key or set of keys based on the secure communication channel device A has established with device B. The keychain manager 205 of device A also encrypts another copy of the password 805 to send to device C using a second, different key or set of keys based on the secure communication channel device A has established with device C.

For instance, a secure communication channel between devices C and A and a secure communication channel between devices C and B are each implemented in some embodiments using OTR messaging. An OTR session is established in some such embodiments between devices C and A based on device signing public/private key pairs of devices C and A. Additionally, another, separate OTR session is established between devices C and B based on device signing public/private key pairs of devices C and B. The device signing key pairs of some embodiments are the same ones generated for registering devices A-C into a sync circle, as described above by reference to FIGS. 4-6.

Once the keychain manager 205 of device C encrypts a copy of the password 805 for device A and another copy of the password 805 for device B, device C stores (at encircled 4) the encrypted copies of the password 805 and metadata describing the password 805 in the storage 325 of the cloud services 305. Examples of metadata for describing the password 805 includes a type of the password (an Internet password, an application password, a network password, etc.), a name of an application or website to which the password is associated or for which the password is used, a path of the application or website, etc.

As explained above, the storages 310-330 are implemented as key-value stores in some embodiments. The key of some embodiments for data stored in the cloud services 305 (e.g., the storage 325) by a sending device that is intended for a receiving device is a concatenation of the name of the sync circle to which the first and second devices belong, an identifier of the sending device, and an identifier of the receiving device. In some embodiments, the receiving device registers with this key-value pair so that when the value of the key-value pair changes (e.g., a value is added, modified, deleted, etc.) by the sending device, the cloud services 305 notifies the receiving device (e.g., via a push notification service).

Under such an approach, when the cloud services 305 receives from device C the copy of the password 805 and its corresponding metadata for device A, the cloud services 305 stores (at encircled 5) the data in the storage 325 as the value of the key formed in the manner described above. The cloud services 305 then notifies (e.g., via a push notification service) device A that the value associated with the key changed (e.g., data is added in this example). Similarly, when the cloud services 305 receives from device C the copy of the password 805 and its corresponding metadata for device B, the cloud services 305 stores (at encircled 5) the data in the storage 325 as the value of the key formed in the manner described above. The cloud services 305 then notifies (e.g., via a push notification service) device B that the value associated with the key changed (e.g., data is added in this example). Since device B is shown as offline in FIG. 8, device B does not receive the notification yet in this example.

Continuing with FIG. 8, when device A receives the notification from the cloud services 305, device A retrieves (at encircled 6) the copy of the encrypted password 805 and the associated metadata using the same key that device C used to store the copy of the encrypted password 805 and the metadata in the cloud services 305. Once device A retrieves the password data, device A decrypts (at encircled 7) the copy of the password 805 by using a key or set of keys generated for the secure communication channel established with device C. Upon decrypting the copy of the password 805, device A encrypts and stores (at encircled 8) the copy of the password 805 in the storage 210 of device A. At this point, device A is updated with the password 805 and, thus, the passwords stored on device A are synchronized with the passwords stored on device C.

As illustrated in FIG. 9, device B is now online. When the cloud services 305 detects that device B is online, the cloud services 305 sends the notification to device B indicating that the value associated with the key-value pair for receiving data from device C changed (e.g., data is added in this example).

When device B receives the notification from the cloud services 305, device B retrieves (at encircled 9) the copy of the encrypted password 805 and the associated metadata using the same key that device C used to store the copy of the encrypted password 805 and the metadata in the cloud services 305. After device B retrieves the password data, device B decrypts (at encircled 10) the copy of the password 805 by using a key or set of keys generated for the secure communication channel established with device C.

After device B decrypts the copy of the password 805, device B encrypts and stores (at encircled 11) the copy of the password 805 in the storage 210 of device B. At this point, device B is updated with the password 805 and, therefore, the passwords stored on device B are synchronized with the passwords stored on device C.

While the data flow operations in FIGS. 7-9 are described in a particular order based on the numerical order of the encircled numbers shown in FIGS. 7-9, one of ordinary skill in the art will recognize that the encircled numbers do not necessarily represent the order of the data flow operations and that the data flow operations may occur in numerous different orders. For instance, the set of sequential data flow operations 4-6 and the set of sequential data flow operations 7-9 illustrated in FIG. 7 occur independent from each other in some embodiments. Similarly, the set of sequential data flow operations 6-8 and the set of sequential data flow operations 9-11 shown in FIGS. 8 and 9 occur independent from each other.

A. Keychain Data Structure

Figure 10:
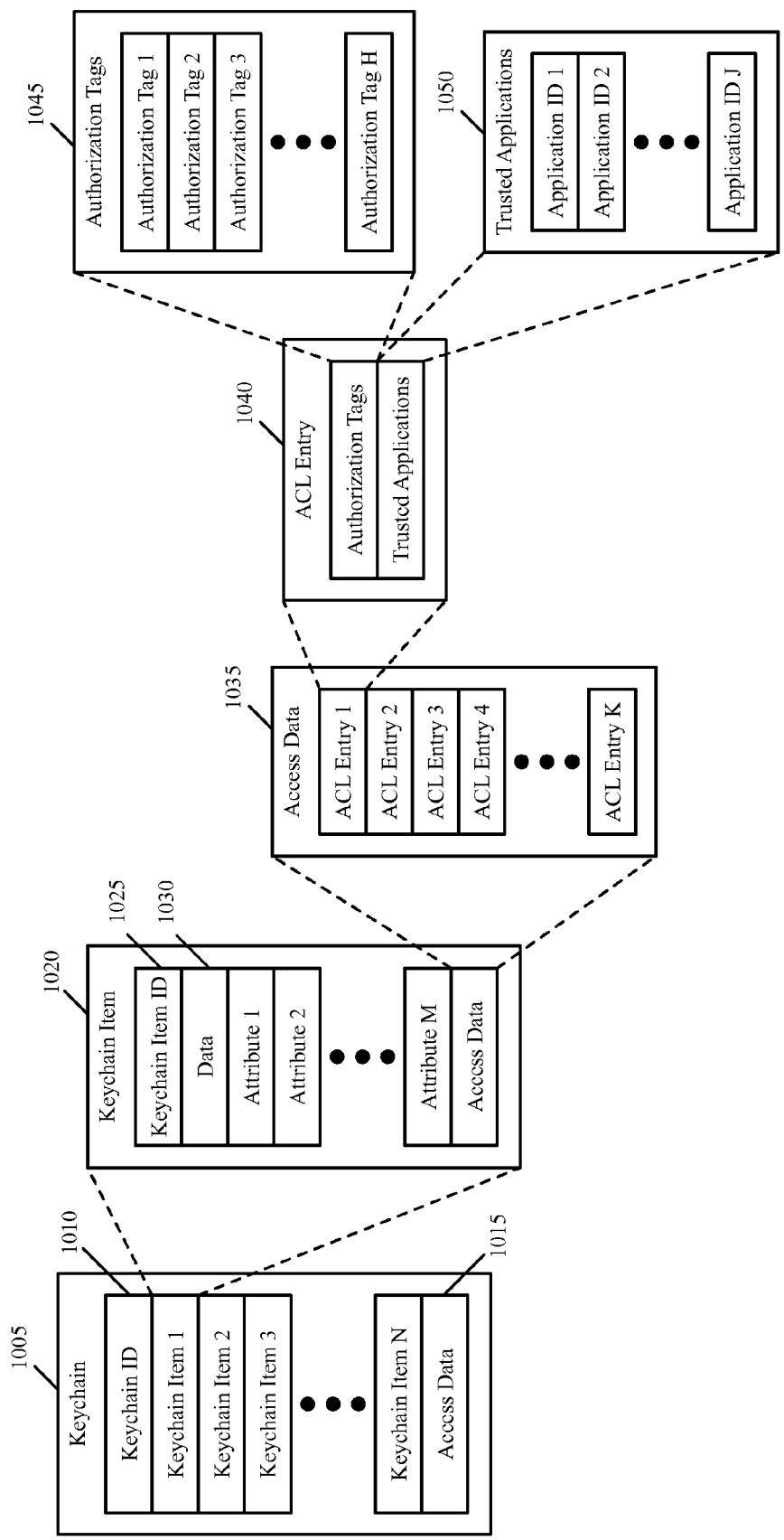
FIG. 10 conceptually illustrates a data structure for a keychain according to some embodiments of the invention.

As mentioned above, a keychain, in some embodiments, is a defined collection of data that may include passwords, private keys, certificates, secure notes, etc. In some embodiments, the keychain manager generates and stores a data structure to represent a keychain. FIG. 10 conceptually illustrates a data structure 1005 for a keychain as stored by the keychain manager of some embodiments. As shown, the data structure 1005 includes a keychain ID 1010, keychain items 1-N, and access data 1015. The keychain ID 1010 is a unique identifier for identifying the keychain 1005. The access data 1015 is for controlling access (e.g., what applications may access the keychain 1005 and/or what operations (e.g., read, write, delete, etc.) may be performed on the keychain 1005, etc.) to the keychain 1005 itself and is similar in structure to the access data 1035 described below.

A keychain item of some embodiments represents an individual piece of data (e.g., a password, a key, a certificate, etc.). As shown in FIG. 10, keychain item 1020 represents keychain item 1 of the keychain 1005. Keychain item 1020 includes a keychain item ID 1025, data 1030, attributes 1-M, an access data 1035 (also referred to as an access object). The keychain item ID 1025 is a unique identifier for identifying the keychain item 1020.

Data 1030 is the actual data value and/or values of the keychain item 1020. For instance, if the keychain 1020 represents a password, the data 1030 stores the value of the password (e.g., a string of alphanumeric characters). In some embodiments, the keychain manager encrypts the data of certain types of a keychain items (e.g., passwords, private keys, etc.) when the keychain manager stores the data. For the data of other types of keychain items (e.g., certificates), the keychain manager simply stores the data without encrypting the data.

Attributes 1-M of the keychain item 1020 are for storing metadata describing the keychain item 1020. Different types of keychain items have different sets of attributes. For example, Internet passwords have attributes that include attributes such as security domain, protocol type (e.g., hypertext transfer protocol (HTTP), hypertext transfer protocol secure (HTTPS), file transfer protocol (FTP), etc.), path (e.g., a uniform resource locator (URL) of an Internet resource), etc.

Each keychain item in some embodiments includes a date field attribute that indicates the time and date (also referred to as a timestamp) of the most recent modification to the keychain item. In some embodiments, each keychain item also includes an attribute for specifying that the keychain item is a keychain item that has been deleted (also referred to as a tombstone). When the attribute specifies that the keychain item is a tombstone, the keychain manager maintains the date field of the keychain item, but the keychain manager sets the value of the keychain items' data 1030 to null or empty. In some embodiments, a keychain item that resulted from a resolution of conflicting keychain items includes a set of attributes that includes (1) a flag indicating that the keychain item is the result of a conflict resolution, (2) a version number of the conflict resolver used to resolve the conflict, and (3) the conflicting keychain items from which the keychain item was resolved (also referred to as the parent keychain items). The set of attributes is referred to as the keychain item's conflict resolution metadata in some embodiments.

In some embodiments, the attributes or a subset of the attributes of a keychain item is used as a primary key for uniquely identifying the keychain item. That is, two keychain items with the same primary key are considered the same keychain item (regardless of whether the values of the data of the keychain items are the same).

The access data 1035 is for controlling access to the keychain item 1020. As illustrated, the access data 1035 includes access control list (ACL) entries 1-K for controlling access to the keychain item 1020. FIG. 10 illustrates an ACL entry 1040 that represents the ACL entry 1 of the access data 1035. The ACL entry 1040 includes authorization tags 1045 that specify operations (e.g., read, write, delete, decrypt, authenticate, etc.) that can be performed on the keychain item 1020. In this example, the authorization tags 1045 includes authorization tags 1-H.

Additionally, the ACL entry 1040 includes a list of trusted applications 1050. As shown, the list of trusted application 1050 includes application ID 1-J. Each application ID is a unique identifier for identifying a particular application that may perform the operations specified by the authorization tags 1045 without user authorization.

One of ordinary skill in the art will recognize that the keychain data structure 1050 is only one possible data structure that the keychain manager might use to store the required information for a keychain. For example, different embodiments might store additional or less information, store the information in a different order, etc.

B. Syncing Keychain Items

Figure 11:
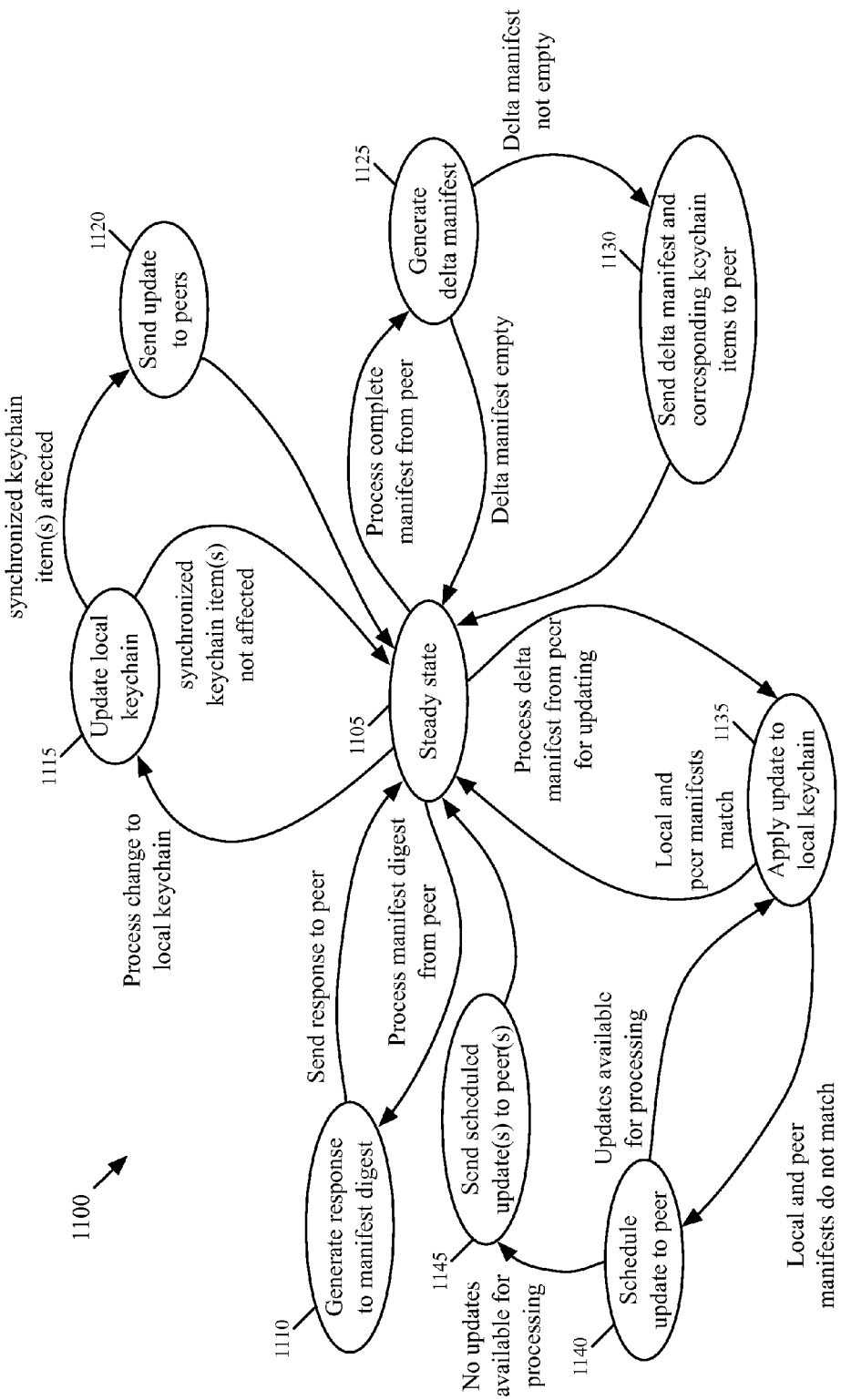
FIG. 11 conceptually illustrates a state diagram that describes different states and transitions between these states of the keychain manager of some embodiments.

As explained above, the devices in a sync circle of some embodiment synchronize a keychain between the devices by synchronizing the individual keychain items of the keychain. FIG. 11 conceptually illustrates a state diagram 1100 that describes different states and transitions between these states of the keychain manager of some embodiments. One of ordinary skill in the art will recognize that in some embodiments the keychain manager will have many different states relating to all different types of input events, and that the state diagram 1100 is specifically focused on a subset of these events. In particular, the state diagram 1100 describes the input events and related states for synchronization passwords with devices that are members of a sync circle. In describing FIG. 11, the device on which the keychain manager is running will be referred to as the local device.

When the keychain manager is not processing any events for syncing keychains, the keychain manager is in a steady state 1105. In the state 1105, the keychain manager may perform other operations that are not related to synching keychains. For instance, the keychain manager may perform registration operations to accept, deny, and/or acknowledge requests to join a sync circle.

Upon receiving a manifest digest from a peer device in the sync circle, the keychain manager transitions to state 1110 to process the manifest digest request. In some embodiments, a manifest digest is a list of the peer device's current keychain items. The keychain manager of some embodiments stores a history of manifests for each peer device in the sync circle.

At state 1110, the keychain manager generates a response to the manifest digest by comparing the most recent manifest in the local device's history for the peer device with the manifest digest received from the peer device. If the manifests match and the local device has the same keychain items as the keychain items in the peer device's manifest digest, the keychain manager generates a message indicating that the local device is synchronized with the peer device.

If the most recent manifest in the local device's history for the peer device matches the manifest digest received from the peer device manifests, but the local device has a different set of keychain items compared to the keychain items in the peer device's manifest digest, the keychain manager generates a message that includes a delta manifest. In some embodiments, a delta manifest includes is (1) a list of differences between the local device's keychain items and keychain items listed in the peer device's manifest and (2) the data for the corresponding keychain items in the list. The delta manifest may include keychain items that are not included in the peer device's manifest digest and/or keychain items that are the same (e.g., have the same primary key), but have different data values.

When the most recent manifest in the local device's history for the peer device and the manifest digest received from the peer device do not match, the keychain manager generates a message that includes the local device's complete manifest. A complete manifest in some embodiments includes (1) a list of all of the local device's keychain items (2) the data for the corresponding keychain items in the list. Upon processing the manifest digest from the peer device, the keychain manager sends the generate response to the peer device and transitions back to the steady state 1105.

While in the steady state 1105, if the keychain manager receives a change to the local keychain, the keychain manager proceeds to state 1115 to process the change to the local keychain. At state 1115, the keychain manager updates the local keychain with the change. In some embodiments, the keychain may include keychain items that are specified for syncing with peer devices in the sync circle and keychain items that are not for syncing with peer devices in the sync circle. If the change to the local keychain does not affect any keychain items that are specified for syncing with the peer devices in the sync circle, the keychain manager returns to the steady state 1105. Otherwise, the keychain manager transitions to state 1120 to synchronize the keychain items that are (1) specified for syncing with the peer devices in the sync circle and (2) that are affected by the change to the local keychain.

At state 1120, the keychain manager sends the update to the local device's keychain to each of the peer devices in the sync circle. In some embodiments, the keychain manager performs the process 1200 described below by reference to FIG. 12 to send the updates to the peer devices. After the keychain manager sends the updates to the peer devices, the keychain manager returns to the steady state 1105.

When the keychain manager is in the steady state 1105 and receives a complete manifest from a peer device in the sync circle, the keychain manager transitions to state 1125 to process the complete manifest. In some embodiments, the keychain manager process the complete manifest by generating a delta manifest the includes (1) a list of differences between the local device's keychain items and keychain items listed in the peer device's complete manifest and (2) the data for the corresponding keychain items in the list. If the delta manifest is empty (i.e., the local device has the same keychain items as the keychain items listed in the peer device's complete manifest), the keychain manager send a message to the peer device indicating so and then returns to the steady state 1105. If the delta manifest is not empty, the keychain manager sends the delta manifest to the peer device and then returns to the steady state 1105.

At the steady state 1105, if the keychain manager receives a delta manifest from a peer device for updating the local device's keychain, the keychain manager transitions to state 1135 to apply the updates from the peer device to the local device's keychain. In some embodiments, the keychain manager performs the process 1300 described below by reference to FIG. 13 to apply the updates from the peer device to the local device's keychain. Once the keychain manager applies the peer device's updates to the local keychain, the keychain manager applies the peer device's updates to the most recent manifest in the local device's history for the peer device stores the modified manifest in the local device's history for the peer device's manifests. The keychain manager then compares the most recent manifest in the local device's history for the peer device, which is the manifest that the keychain manager just stored, to the local device's current manifest of keychain items.

If the manifests match, but the local device has a different set of keychain items compared to the keychain items in the peer device's manifest digest, the keychain manager transitions to state 1140 and schedules updates to send to the peer devices in the sync circle. Otherwise, the keychain manager returns to the steady state 1105.

In state 1140, the keychain manager checks whether any updates from peer devices are left to process. If so, the keychain manager transitions to state 1135 to continue processing any delta manifests from peer devices for updating the local keychain. If there are no updates from peer devices to process, the keychain manager transitions from state 1140 to state 1145 to send the scheduled updates to the peer devices in the sync circle. In some embodiments, the keychain manager performs the process 1200 described below by reference to FIG. 12 to send the updates to the peer devices. Once the keychain manager sends all the scheduled updates to the peer devices, the keychain manager returns to the steady state 1105.

Figure 12:
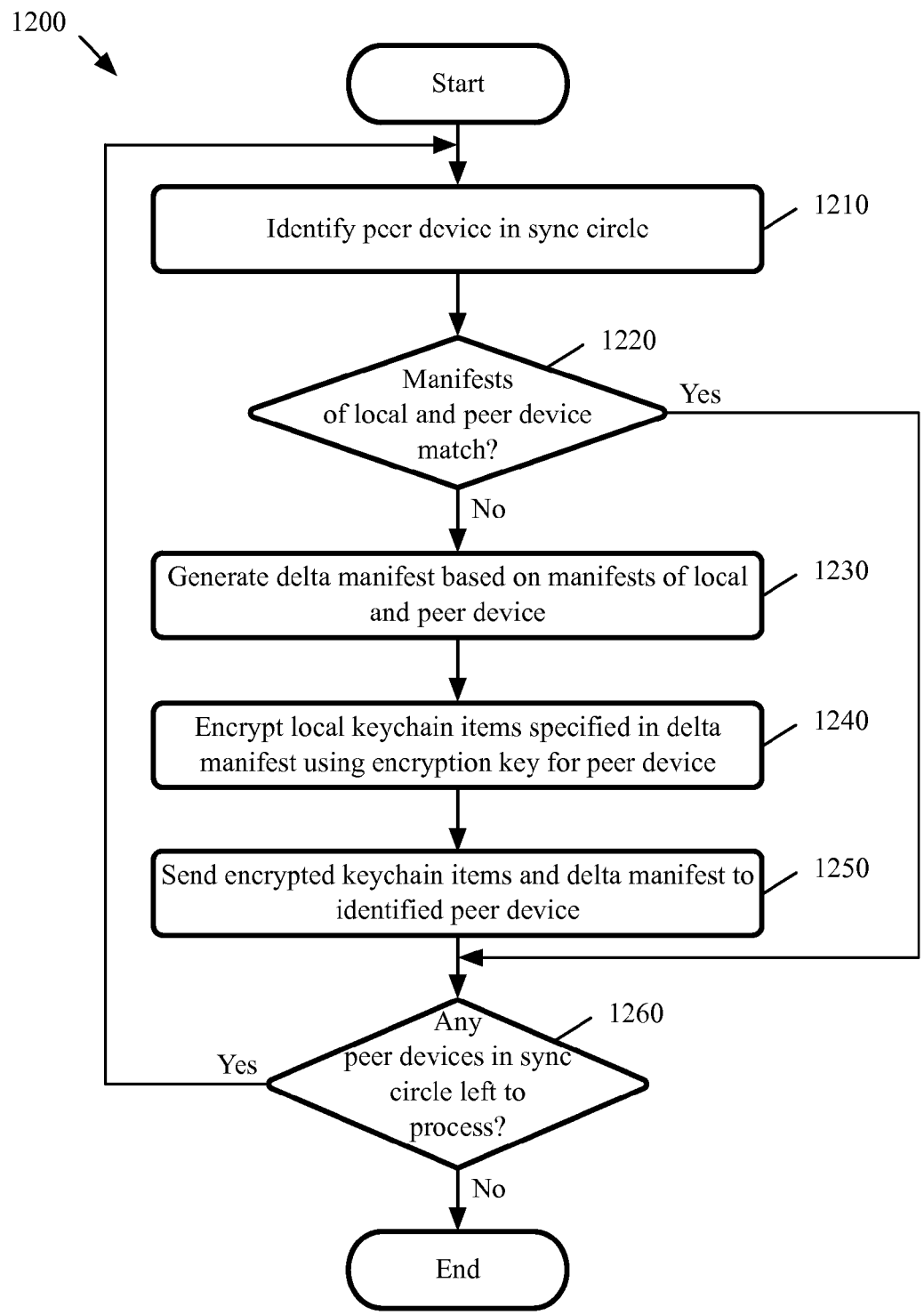
FIG. 12 conceptually illustrates a process of some embodiments for pushing updates to peer devices.

FIG. 12 conceptually illustrates a process 1200 of some embodiments for pushing updates to peer devices. In some embodiments, the keychain manager described in this application performs the process 1200 to send updates that were applied to the local keychain of the local device to the peer devices in the sync circle. For instance, the keychain manager performs the process 1200 when the keychain manager is in states 1120 and 1145 described above by reference to FIG. 11.

The process 1200 starts by identifying (at 1210) a peer device in the sync circle. In some embodiments, the process 1200 identifies a peer device by accessing a local copy of the sync device list while, in other embodiments, the process 1200 identifies a peer device by accessing the sync device list stored in the cloud services 305 (e.g., in storage 310).

Next, the process 1200 determines (at 1220) whether the manifest of the local device matches the manifest of the peer device. In some embodiments, the process 1200 uses the most recent manifest in the local device's history for the peer device as the manifest of the peer device. When the process 1200 determines that the manifests match, the process 1200 proceeds to 1260. Otherwise, the process 1200 continues to 1230.

At 1230, the process 1200 generates a delta manifest based on the manifests of the local device and the peer device. As described above, a delta manifest in some embodiments includes is (1) a list of differences between the local device's keychain items and keychain items listed in the peer device's manifest and (2) the data for the corresponding keychain items in the list. In some embodiments, the process 1200 generates the delta manifest by (1) comparing to keychain items in the local device's keychain against the keychain items listed n the peer device's manifest and (2) identifying the differences.

The process 1200 then encrypts (at 1240) a copy of the local keychain items that are specified in the delta manifest using the encryption key or set of keys for the peer device. As explained above, a secure communication channel is used in some embodiments between every pair of devices in the sync circle. As such, the process 1210 identifies the key or set of keys established for the secure communication channel used to communicate with the peer device and uses the identified key or set of keys to encrypt the copies of the local keychain items.

Next, the process 1200 sends (at 1250) the encrypted keychain items and the delta manifest to the peer device through the secure communication channel. Once the process 1200 sends the information to the peer device, the process 1200 then determines (at 1260) whether any peer device in the sync circle is left to process. When the process 1200 determines that there is a peer device left to process, the process 1200 returns to 1210 to continue sending updates that were applied to the local keychain to the remaining peer devices in the sync circle. When the process 1200 determines that there is no peer device left to process, the process 1200 then ends.

Figure 13:
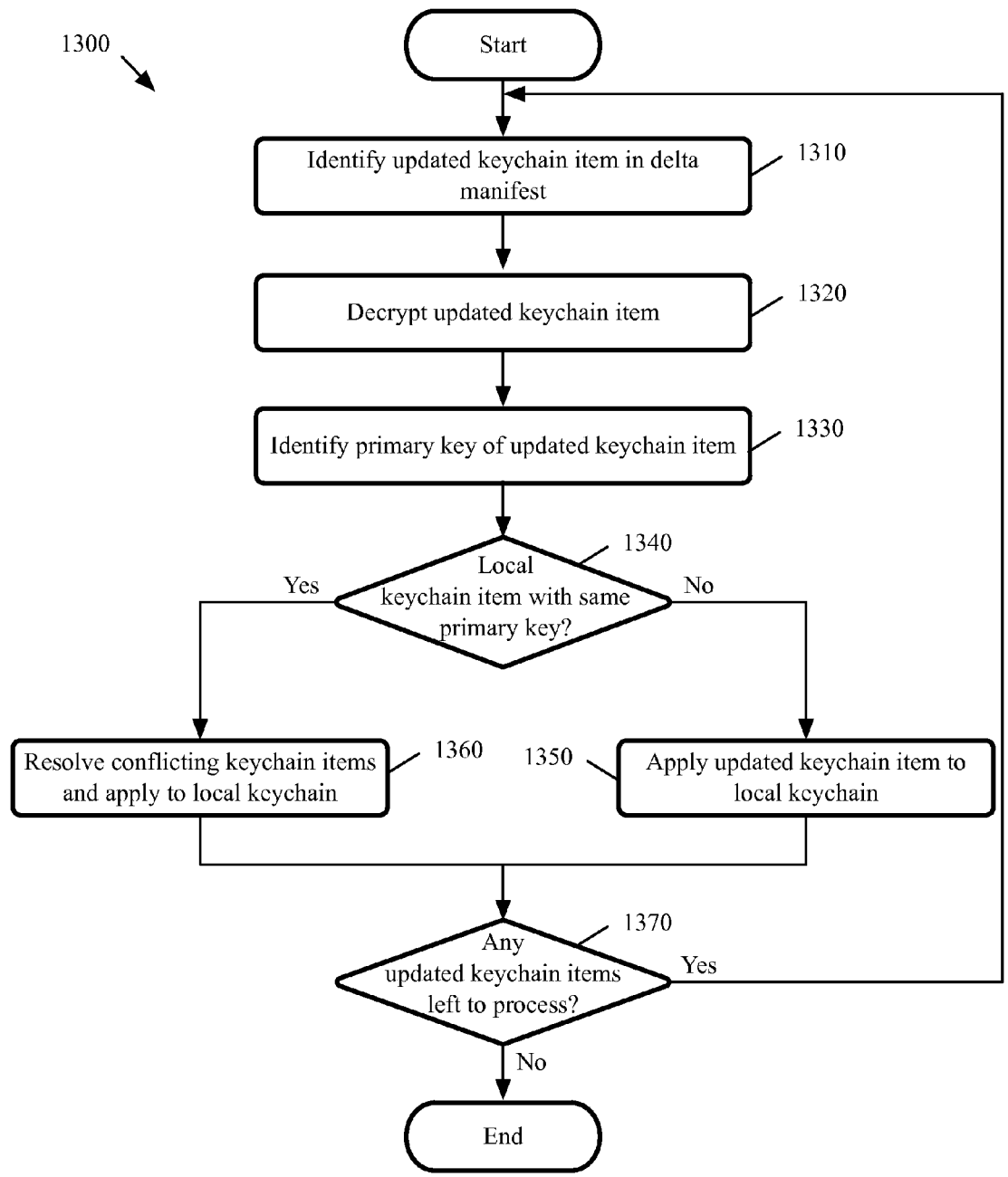
FIG. 13 conceptually illustrates a process of some embodiments for processing updates from peer devices.

FIG. 13 conceptually illustrates a process 1300 of some embodiments for processing updates from peer devices. In some embodiments, the keychain manager described in this application performs the process 1300 to apply updates from peer devices to the local keychain of the local device. For example, the keychain manager performs the process 1300 when the keychain manager is in state 1135 (e.g., when the keychain manager receives a delta manifest from a peer device to process) described above by reference to FIG. 11.

The process 1300 begins by identifying (at 1310) an updated keychain item specified in the delta manifest received from a peer device. Next, the process 1300 decrypts (at 1320) the updated keychain item. As noted above, a secure communication channel is used in some embodiments between every pair of devices in the sync circle. Therefore, the process 1310 identifies the key or set of keys established for the secure communication channel used to communicate with the peer device and uses the identified key or set of keys to decrypt the updated keychain item.

The process 1300 then identifies (at 1330) the primary key of the updated keychain item. As explained above, in some embodiments, the attributes or a subset of the attributes of a keychain item is used as a primary key for uniquely identifying the keychain item.

Next, the process 1320 determines (at 1340) whether a keychain item in the local keychain has a primary key that is the same as the primary key of the updated keychain item. When the process 1300 determines that no keychain item in the local keychain has a primary key that is the same as the primary key of the updated keychain item, the process 1300 applies (at 1350) the updated keychain item to the local keychain. In some embodiments, the process 1300 applies the updated keychain item to the local keychain by adding the updated keychain to the local keychain.

When the process 1300 determines that a keychain item in the local keychain has a primary key that is the same as the primary key of the updated keychain item, the process 1300 resolves (at 1360) the conflict between the updated keychain item and the local keychain item and applies the result of the conflict resolution to the local keychain. The process 1300 of different embodiments resolve conflicts between conflicting keychain items differently. One such approach is described below by reference to FIG. 15.

C. Resolving Keychain Item Conflicts

When syncing keychain items, the keychain manager of some embodiments might detect conflicts between multiple versions of the same keychain item. In different embodiments, the keychain manager resolves keychain item conflicts using different techniques. For example, in some embodiments, the method uses the most recent version of the keychain item as the keychain item to be synced between the devices. Additional and/or different approaches may be used in some embodiments.

Figure 14:
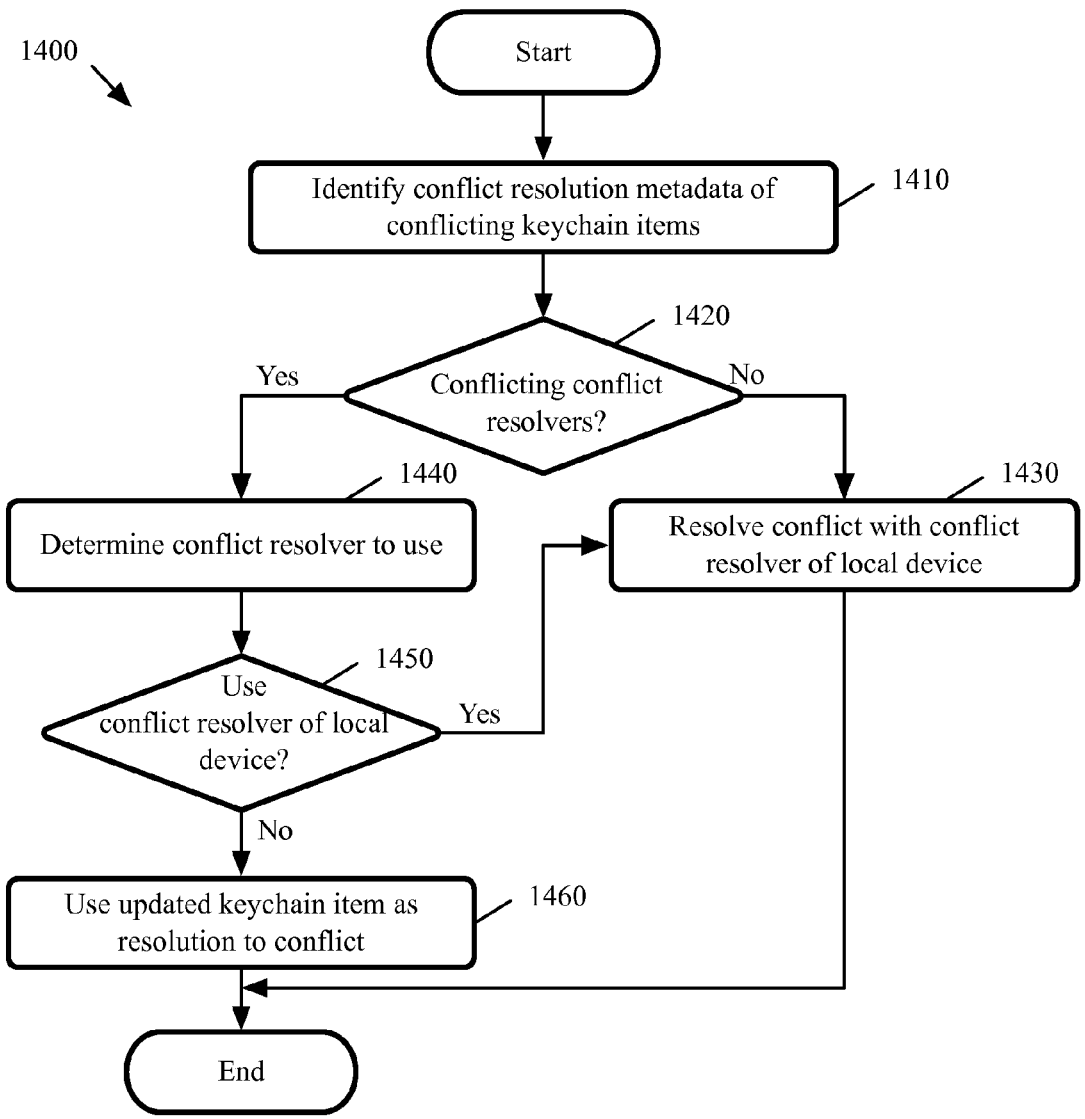
FIG. 14 conceptually illustrates a process of some embodiments for resolving conflicting conflict resolutions.

In some embodiments, the devices may update their conflict resolving processes (also referred to as "conflict resolvers"). The updated process and the earlier, non-updated process in some instances provide different results when determining which keychain item values should be used. In some embodiments, it is possible for one or more devices in a sync circle to be using an updated conflict resolution process while one or more other devices in the same sync circle are using a previous version of the conflict resolution process. FIG. 14 conceptually illustrates a process 1400 of some embodiments for resolving conflicting conflict resolvers. In some embodiments, the process 1300 described above by reference to FIG. 13 performs the process 1400 to implement operation 1360.

The process 1400 starts by identifying (at 1410) the conflict resolution metadata of the conflicting keychain items. As noted above, the conflict resolution metadata of some embodiments includes (1) a flag indicating that the keychain item is the result of a conflict resolution, (2) a version number of the conflict resolver used to resolve the conflict, and (3) the conflicting keychain items from which the keychain item was resolved (also referred to as the parent keychain items).

Next, the process 1400 determines (at 1420) whether the conflict resolver of the updated keychain item and the conflict resolver of the local keychain item conflict. In some embodiments, the conflict resolvers of the updated keychain item and the local keychain item conflict when (1) both of the keychain items includes a flag that indicates that the keychain item was the result of a conflict resolution, (2) the updated keychain item and the local keychain item are specified as the parent keychain items of the updated keychain item, and (3) the version number of the conflict resolver used to resolve the updated keychain item is not the same as the version number of the local device's conflict resolver.

When the process 1400 determines that the conflict resolvers do not conflict, the process 1400 resolves (at 1430) the keychain item conflict with the conflict resolver of the local device and then the process 1400 ends. When the process 1400 determines that the conflict resolvers conflict, the process 1400 determines (at 1440 and 1450) whether to use the conflict resolver of the local device. When the version number of the local conflict resolver is greater than the version number of the conflict resolver used to resolve the updated keychain item, the process 1400 resolves (at 1430) the keychain item conflict with the conflict resolver of the local device. Otherwise, the process 1400 uses (at 1460) the updated keychain item as the resolution to the keychain item conflict. The process 1400 then ends.

Figure 15:
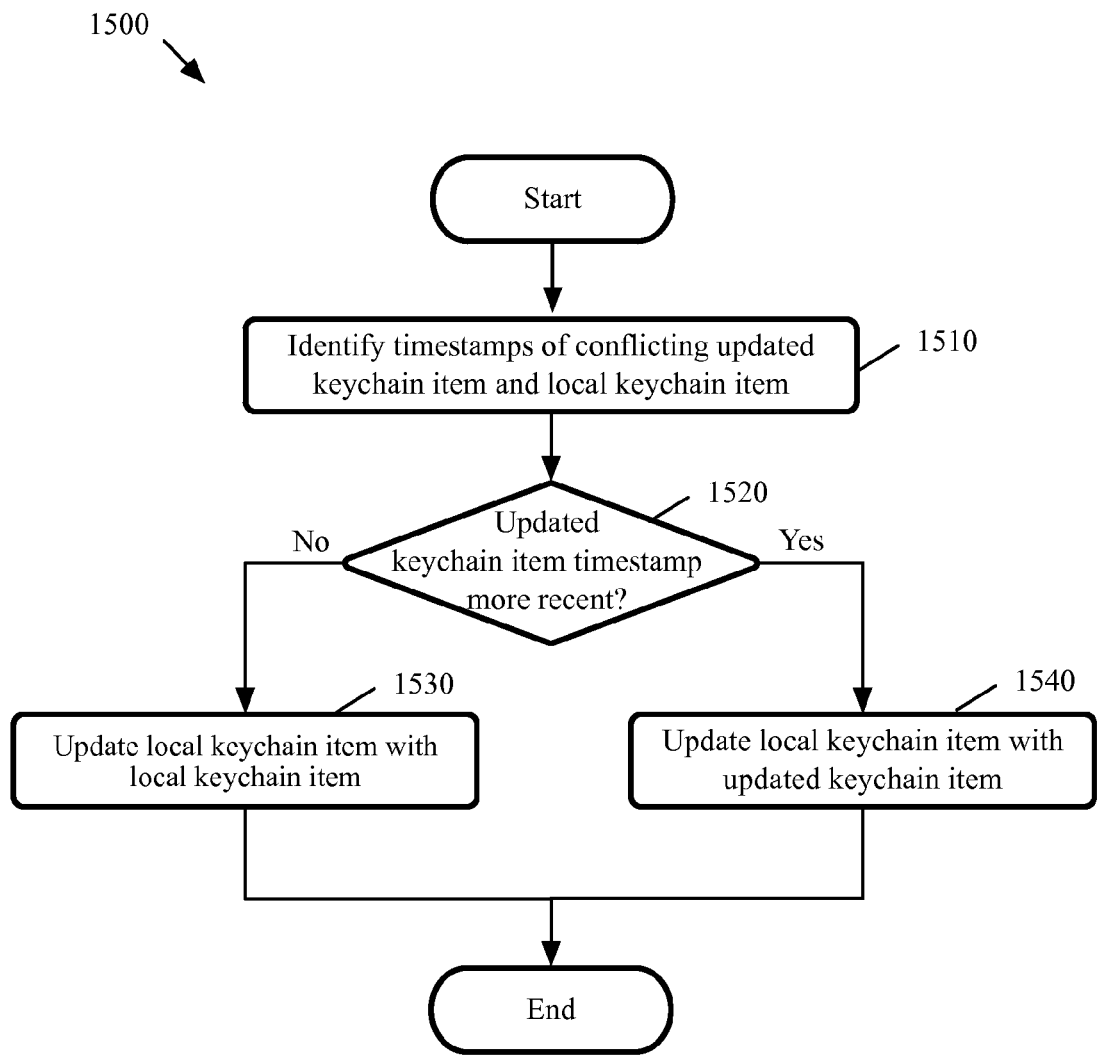
FIG. 15 conceptually illustrates a process of some embodiments for resolving keychain item conflicts.

FIG. 15 conceptually illustrates a process 1500 of some embodiments for resolving keychain item conflicts. In some embodiments, the process 1400 described above by reference to FIG. 14 performs the process 1500 to implement operation 1460.

The process 1500 begins by identifying (at 1510) the timestamps of the conflicting updated keychain item and local keychain item. As noted above, the data structure of a keychain item in some embodiments includes a date field that indicates the time and date of the most recent modification to the keychain item. In some embodiments, the process 1500 identifies the timestamps by accessing the date field attribute of each keychain item.

Next, the process 1500 determines (at 1520) whether the updated keychain item's timestamp is more recent. When the process 1500 determines that the updated keychain item's timestamp is more recent, the process 1500 updates (at 1540) the local keychain item with the updated keychain item and then the process 1500 ends. When the process 1500 determines that the updated keychain item's timestamp is not more recent, the process 1500 updates (at 1530) the local keychain item with the local keychain item and then the process 1500 ends.

IV. Using Data Protection Domains for Keychains

Some embodiments of the invention provide a data protection feature for limiting access to keychain data (e.g., keychain items) on devices according to defined sets of conditions and/or requirements. In some embodiments, several different protection domains (also referred to as data protection classes) are defined and each keychain item on a device belongs to one of the defined protection domains. Each protection domain is associated with a set of conditions. When a set of conditions are met for a particular data protection domain, the keychain items in the device that belong to the particular protection domain becomes available for use by the device.

A. Data Protection Domains

Figure 16:
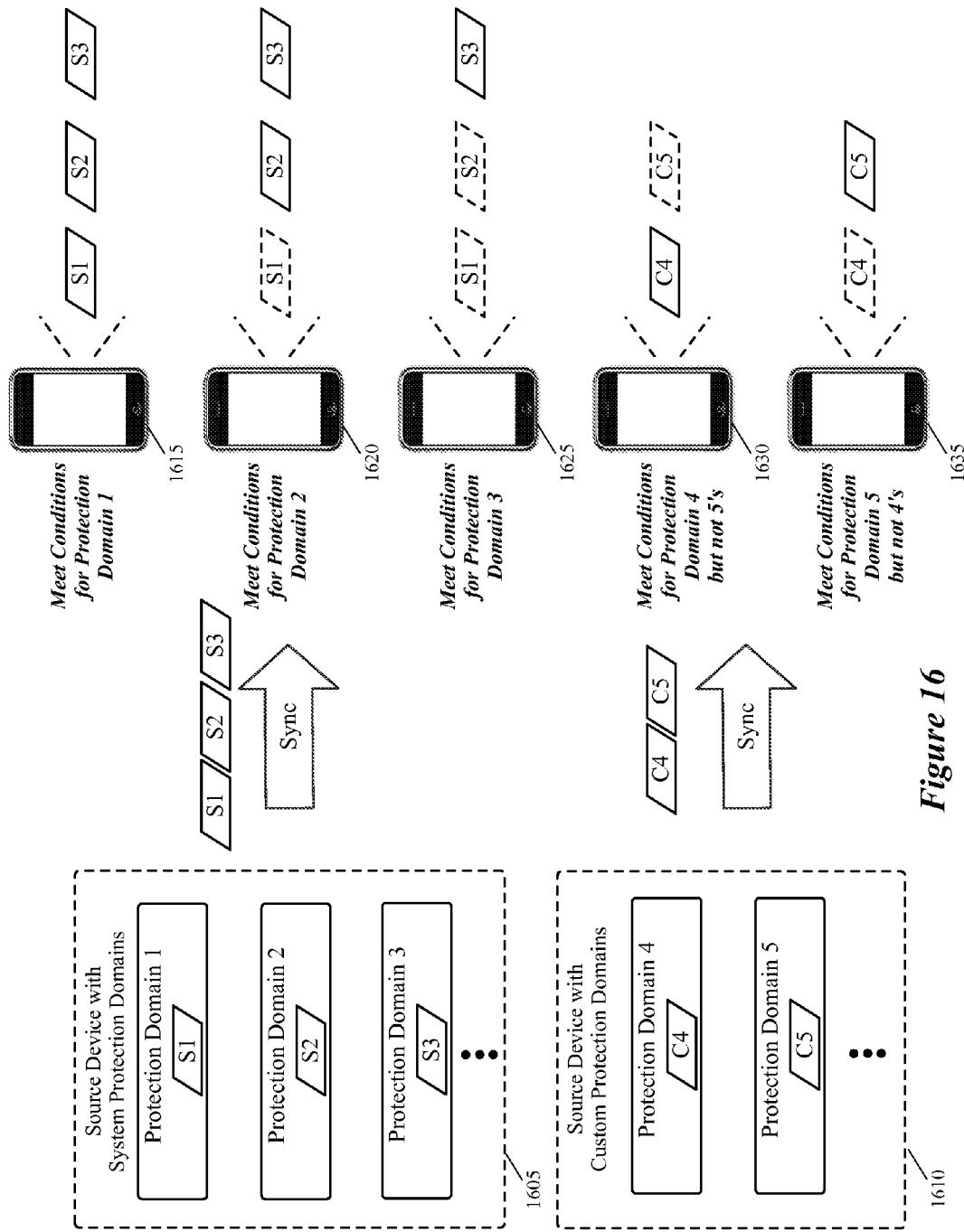
FIG. 16 conceptually illustrates different keychain items in different devices.

FIG. 16 conceptually illustrates different keychain items in different devices. Specifically, this figure illustrates that keychain items belonging to different protection domains become available according to the conditions that the devices meet for the different protection domains. This figure illustrates source devices 1605 and 1610, destination devices 1615-1635, and keychain items S1-S3 and C4-C5.

In some embodiments, protection domains are pre-defined and provided to the devices as part of the operating systems (e.g., iOS™, Windows™, etc.) for the devices. The devices that are managed by these operating systems can utilize the protection domains to protect keychain items by making the keychain items in the devices available only after the conditions associated with the protection domains are met. These pre-defined protection domains are referred to as system protection domains in this patent application.

In some embodiments, protection domains may be custom-defined by the user of the devices or the developers of the applications that run on the devices. In these embodiments, the manufacturers of the devices or the operating systems provide a user with a tool so that the user can define custom-defined protection domains by defining different sets of conditions for the protection domains. Also, the manufacturers of the devices or the operating systems provide developers with software development kits (SDKs) so that the developer can define custom-defined protection domains by defining different sets of conditions for the protection domains for the applications that the developers write to run on the devices.

As mentioned above, different protection domains are associated with different sets of conditions or requirements. In some embodiments, protection domains may be defined to provide additional levels of security for certain keychain items. That is, a first protection domain's conditions are a subset of a second protection domain's conditions such that keychain items that belong to the second protection domain become available to the devices only if the devices meet the additional conditions of the second protection domain on top of the first protection domain's conditions. For instance, the first protection domain's conditions include a device being booted and running and the second protection domain's conditions include the device being unlocked as well as being booted and running.

In some embodiments, protection domains may be defined to have different sets of conditions that may or may not overlap. For instance, a first protection domain's conditions may include additional authentication (e.g., an additional password) after the devices are unlocked. A second protection domain's conditions may include a particular application's presence in the devices. These conditions of the first and second protections do not overlap.

The source device 1605 in this example is a device that pushes updated keychain items S1-S3 to the destination devices 1615-1625. As shown, keychain items S1-S3 in the device 1605 belong to protection domains 1-3, respectively. The protection domains 1-3 in this example are system protection domains. The protection domains 1-3 provide different levels of security to the keychain items. In this example, the protection domain 3's conditions are a subset of the protection domain 2's conditions, and the protection domain 2's conditions are a subset of the protection domain 1's conditions.

The devices 1615-1625 in this example meet different sets of conditions. Specifically, the device 1625 meets all conditions of the protection domain 3. The device 1620 meets all conditions of the protection domain 2. The device 1615 meets all conditions of the protection domain 1. As a result, the keychain item S3 is available for the device 1625's use but the keychain items S1 and S2 are not. The keychain items are illustrated as dotted parallelograms to indicate the items' unavailability. The keychain items S2 and S3 are available for the device 1620's use but the keychain items S1 is not. All three of the keychain items S1-S3 are available for the device 1615's use.

Different embodiments employ different ways of leaving keychain items unavailable for the devices' use. For instance, a keychain manager in a device of some embodiments does not decrypt a keychain item and thereby makes the keychain item unusable when the device does not meet all the conditions for the protection domain to which the keychain item belongs. Alternatively or conjunctively, the keychain manager of some embodiments makes a keychain item inaccessible by the applications running in the device until the device meets the conditions for the protection domain to which the keychain item belongs. In some embodiments, the keychain manager of the destination device does not accept a keychain item that is pushed from a source device unless, at the time the keychain is pushed, the destination device meets the conditions of the protection domain to which the keychain item belongs.

The source device 1610 in this example is a device that pushes updated keychain items C4 and C5 to the destination devices 1630-1635. As shown, keychain items C4 and C5 in the device 1610 belong to protection domains 4 and 5, respectively. The protection domains 4 and 5 are custom-defined protection domains, which have different sets of conditions. In this example, the protection domain 4's conditions do not overlap with the protection domain 5's conditions.

The devices 1630 in this example meets all conditions of the protection domain 4, but not all the conditions of the protection domain 5 while the device 1635 meets all conditions of the protection domain 5 but not all the conditions of the protection domain 4. As a result, the keychain item C4 is available for the device 1630's use but the keychain item C5 is not. The keychain item C5 is available for the device 1635's use but the keychain item C4 is not.

One of ordinary skill in the art will recognize that the use of the protection domains of some embodiments is not limited to protecting keychain items. Any type of data may be defined to belong to different protection domains in order to receive different levels of security. For instance, a document updated in a first device of some embodiments may be pushed to a second device but the document remains unavailable for the second device's use until the second device meets all the conditions of the protection domain to which the document belongs.

Figure 17:
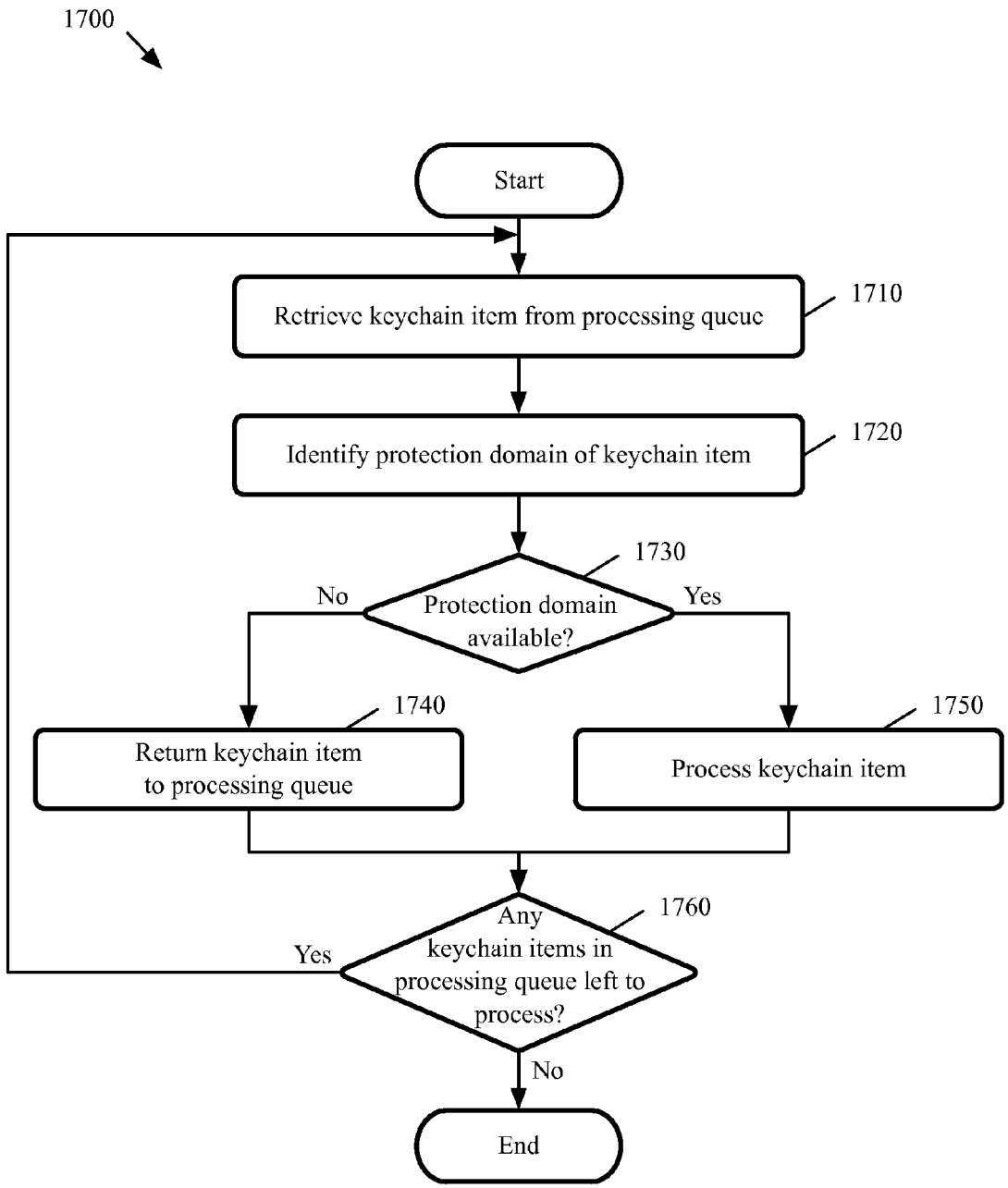
FIG. 17 conceptually illustrates a process that some embodiments perform to process keychain items.

FIG. 17 conceptually illustrates a process 1700 that some embodiments perform to process keychain items. In some embodiments, the process 1700 is performed by a destination device to which one or more source devices have pushed the keychain items. In particular, a keychain manager of the destination device may perform the process 1700 in these embodiments. The destination device of some embodiments deposits the keychain items from the source devices in a processing queue. An example processing queue will be described further below by reference to FIG. 18. The process 1700 in some embodiments starts when the destination device is booted and has received one or more keychain items from the source devices.

The process 1700 begins by retrieving (at 1710) a keychain item from a processing queue. In some embodiments, the processing queue is a storage structure (e.g., a file system) for holding keychain items pushed from source devices. In some embodiments, source devices encrypt the data (e.g., a password) in the keychain item using a public key of the destination device that is previously published by the destination device. In these embodiments, the keychain items are stored in the processing queue as encrypted.

The destination device uses a corresponding private key (i.e., the private key of the public-private key pair that includes the public key that the source devices used to encrypt the keychain items) to decrypt the keychain items. In some embodiments, the destination device generates a public-private key pair for each of the protection domains that the device supports. More details about the key pairs for different protection domains will be described further below by reference to FIGS. 25 and 26.

The process 1700 then identifies (at 1720) the protection domain of the retrieved keychain item. A keychain item in some embodiments also includes or is associated with an identifier for identifying a protection domain to which the keychain item belongs. In some embodiments, the public key that the source devices used to encrypt the data in the keychain item serves as the protection domain identifier. The process 1700 reads the protection domain identifier of the keychain item to identify the protection domain to which the retrieved keychain item belongs.

Next, the process 1700 determines (at 1730) whether the identified protection domain is available. That is, the process 1700 determines whether the destination device have met all the conditions of the identified protection domain. In some embodiments, the destination device obtains the definitions of the conditions as part of the operating system for the device. Alternatively or conjunctively, the destination device of some embodiments may obtain the definitions of the conditions when the destination device and the source devices establish a sync circle that includes the destination and source devices.

When the process 1700 determines (at 1730) that not all the conditions of the identified protection domain are met, the process 1700 returns (at 1740) the keychain item back to the processing queue by depositing the keychain item back in the queue so that the keychain item can wait for the conditions of the protection domain to which this keychain item belongs to be met. The process 1700 then proceeds to 1760, which will be described further below.

When the process 1700 determines (at 1730) that all the conditions of the identified protection domain are met, the process 1700 processes (at 1750) the keychain item. At 1750, the process 1700 of some embodiments processes the keychain item by initiating syncing keychain items. In some embodiments, the process 1700 decrypts the keychain item using the private key of the destination device for the identified protection domain.

Next, the process 1700 determines (at 1760) whether there are other keychain items in the processing queue that are yet to be processed. When the process 1700 determines that there are other keychain items in the processing queue, the process 1700 loops back to 1710 to retrieve another keychain item. Otherwise, the process 1700 ends.

Figure 18:
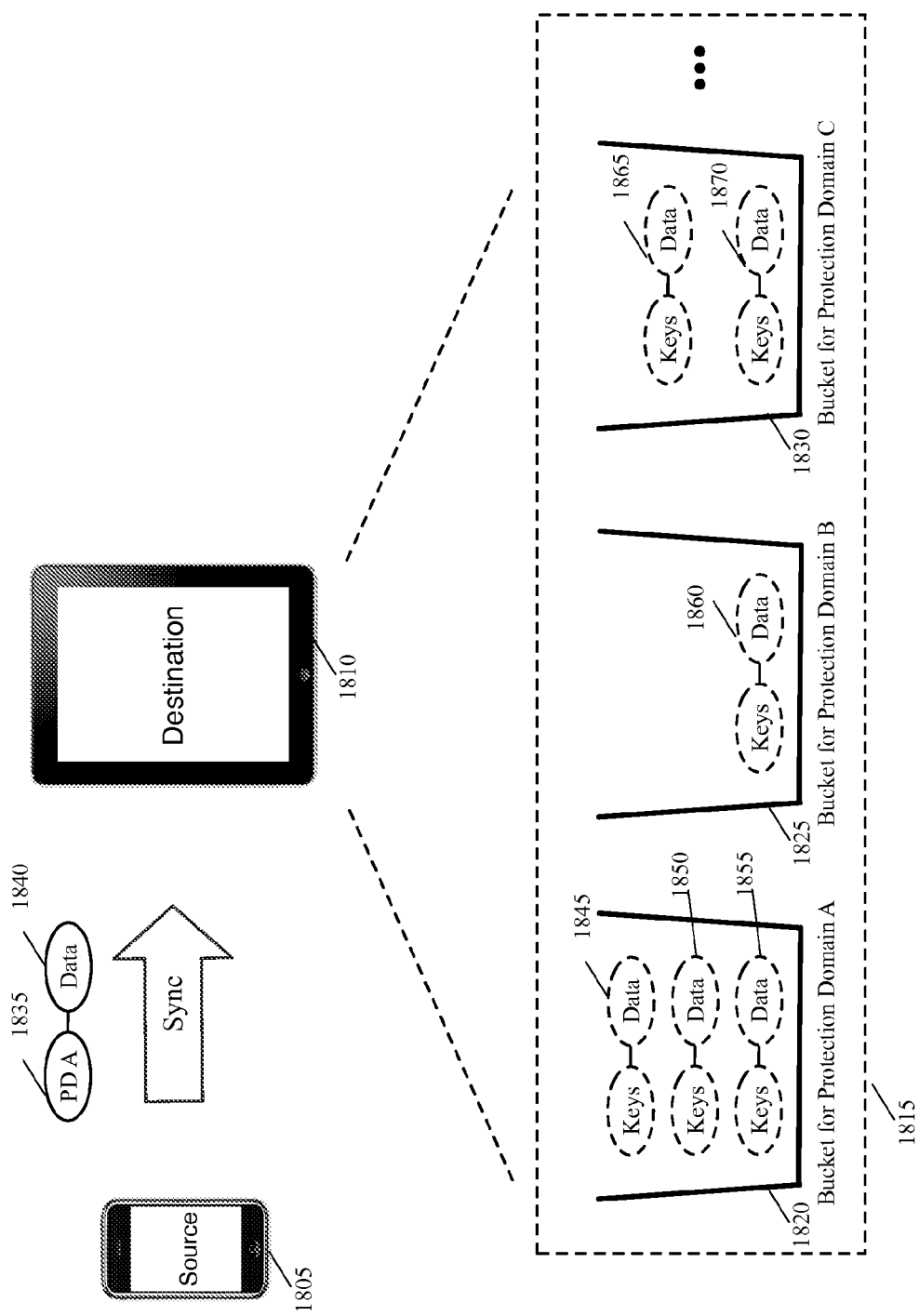
FIG. 18 conceptually illustrates a processing queue for depositing incoming keychain items.

FIG. 18 conceptually illustrates a processing queue for depositing incoming keychain items. Specifically, this figure illustrates that the processing queue of some embodiments is a set of buckets associated with different protection domains. This figure illustrates a source device 1805, a destination device 1810, and a processing queue 1815.

The source device 1805 updates one or more keychain items and pushes the keychain items to the destination device 1810. In some embodiments, a keychain item 1840 that the source device 1805 sends is associated with a protection domain identifier 1835, which the source device 1805 sends along the keychain item 1840. In some embodiments, the source device 1805 encrypts the keychain item 1840 with a public key (not shown) of the destination device 1840, which the destination device 1840 has previously published for each protection domain that the destination device 1840 supports. In some of these embodiments, the public key that is used to encrypt the keychain item may serve as the protection domain identifier.

The processing queue 1815 that the destination device 1810 uses to deposit the keychain items has buckets 1820-1830. Each of the buckets is associated with a protection domain as shown. The destination device 1810 deposits a keychain item in one of the buckets 1820-1830 of the processing queue 1815 based on the protection domain identified by the protection domain identifier. In some embodiments, the destination device 1810 also deposits the protection domain identifier associated with each keychain item. In other embodiments, the destination device 1810 dissociates the identifiers from the keychain items as the destination device 1810 deposits the keychain items in the processing queue 1815. As shown, the bucket 1820 has three keychain items 1845-1855, the bucket 1820 has one keychain item 1860, and the bucket 1830 has two keychain items 1865 and 1870 that the device 1810 has deposited without the protection domain identifiers.

In some embodiments, the keychain items are unavailable for the device 1810's use when the keychain items are in the processing queue 1815. The keychain items are depicted as dotted ellipses to indicate the keychain items' unavailability to the device 1810.

In some embodiments, the destination device 1810 associates the keychain item with a private key that is a counterpart private key of the public key that the source device 1805 use to sign the keychain item pushed to the destination device 1810. The destination device 1810 deposits the private keys along with the keychain items in the processing queue and thereby makes the private keys unavailable for the device 1810's use.

In some embodiments, the destination device 1810 makes the private keys stored in the processing queue unavailable by encrypting the private keys using other keys associated with the protection domains. In these embodiments, the private keys stored in the processing queue can be decrypted with those other keys only when the device meets the conditions of the protection domains. The keychain items then can be decrypted with the decrypted private keys and thereby become available for the device's use. Those other keys that are used to encrypt the private keys are referred to as local domain protection keys in this patent application.

When the device 1810 meets all the conditions defined for a protection domain that is associated with a particular bucket, the destination device 1810 can take out the keychain items from the particular bucket by decrypting the private keys with the local domain protection keys and then decrypting the key chains with the decrypted private keys. The destination process 1810 then processes the decrypted keychain items. In some embodiments, the device 1810 initiates a syncing process to sync the received keychain items with the keychain items (not shown) that the device 1810 already had.

It is to be noted that when the destination device 1810 receives the keychain items from the source device 1805 while the destination device 1810 is meeting the conditions of the protection domains to which the keychain items belong, the destination device 1810 does not need to encrypt the private keys for the protection domains. The destination device 1810 thus can decrypt the keychain items with the private keys without depositing the keychain items in the processing queue 1815.

Figure 19:
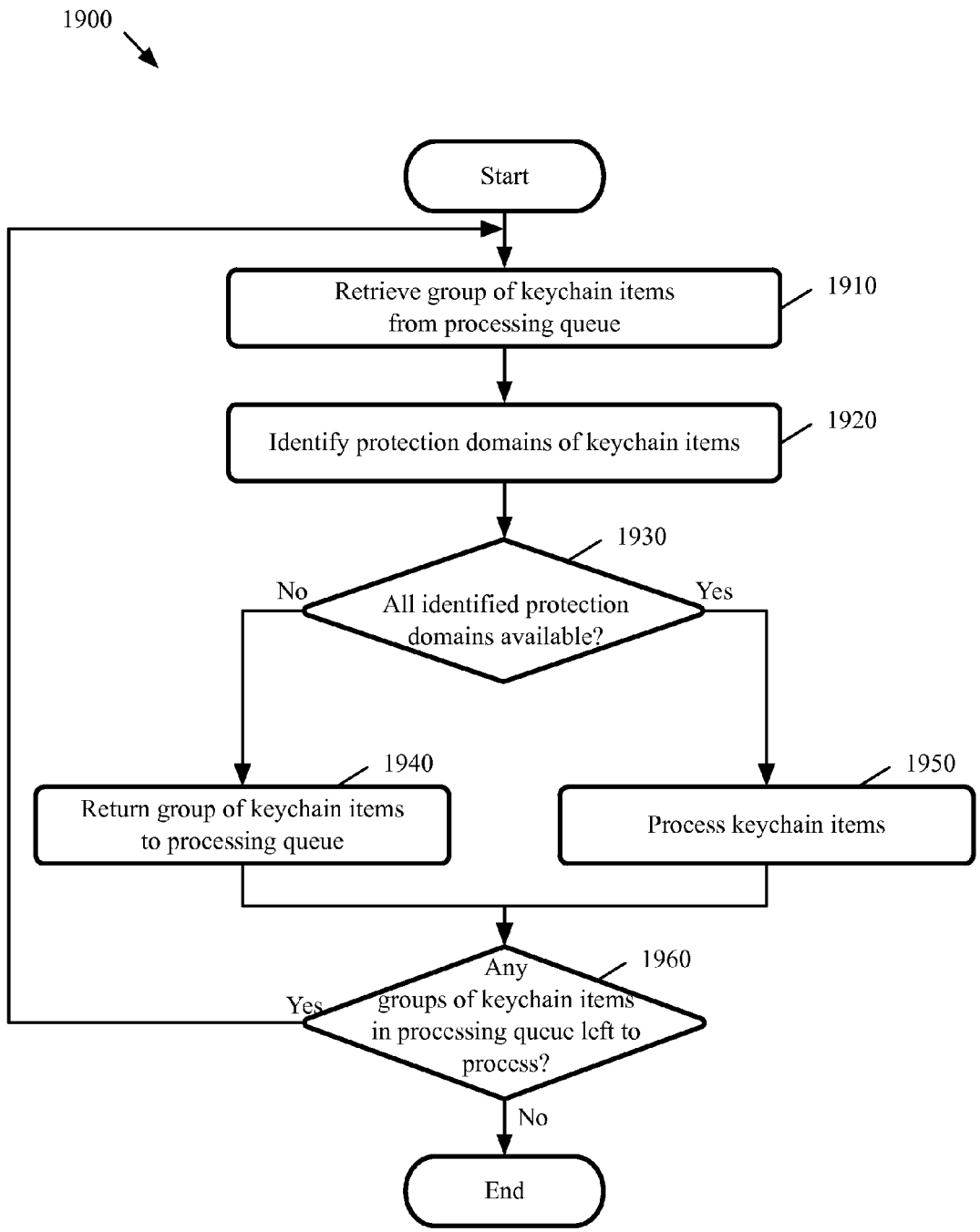
FIG. 19 conceptually illustrates a process that some embodiments perform to process keychain items received from a source device.

FIG. 19 conceptually illustrates a process 1900 that some embodiments perform to process keychain items received from a source device. In some embodiments, the source device pushes a group of keychain items in a single transaction (e.g., a single message) rather than pushing one keychain item per transaction. In some cases, the keychain items in a group are related in such a way that the keychain items are to be processed together by the destination device. In some embodiments, the process 1900 is performed by a destination device that receives keychain items in groups and processes the keychain items in a group together. In particular, a keychain manager of the destination device may perform the process 1900 in these embodiments. The destination device of some embodiments deposits the groups of keychain items from the source device in a processing queue. The process 1900 in some embodiments starts when the destination device is booted and has received one or more groups of keychain items from the source device.

The process 1900 begins by retrieving (at 1910) a group of keychain items from a processing queue, which is a storage structure (e.g., a file system) for holding groups of keychain items pushed from the source device. In some embodiments, the source device encrypts the data in each keychain item in the group stored in the processing queue by using the public key of the destination device for the protection domain to which the keychain item belongs. The destination device uses corresponding private keys to decrypt the keychain items in the group. The process 1900 then identifies (at 1920) the protection domain of each keychain item in the retrieved group of keychain items.

Next, the process 1900 determines (at 1930) whether all of the identified protection domains for the retrieved group are available. That is, the process 1900 determines whether the destination device have met all the conditions of each of the identified protection domains. The process 1900 of some embodiments iteratively goes through each of the identified protection domains of the group.

When the process 1900 determines (at 1930) that not all the conditions of the protection domain for any of the identified protection domains met, the process 1900 returns (at 1940) the group of keychain items back to the processing queue by depositing the group of keychain items back in the queue. The process 1900 then proceeds to 1960, which will be described further below.

When the process 1900 determines (at 1930) that all the conditions of every identified protection domains are met, the process 1900 processes (at 1950) the group of keychain items. At 1950, the process 1900 of some embodiments processes the keychain items by initiating a syncing process. In some embodiments, the process 1900 decrypts the keychain items using the private keys of the destination device for the identified protection domains.

Next, the process 1900 determines (at 1960) whether there are other groups of keychain items in the processing queue that are yet to be processed. When the process 1900 determines that there are other groups of keychain items in the processing queue, the process 1900 loops back to 1910 to retrieve another group of keychain items. Otherwise, the process 1900 ends.

B. Use Cases

Figure 20:
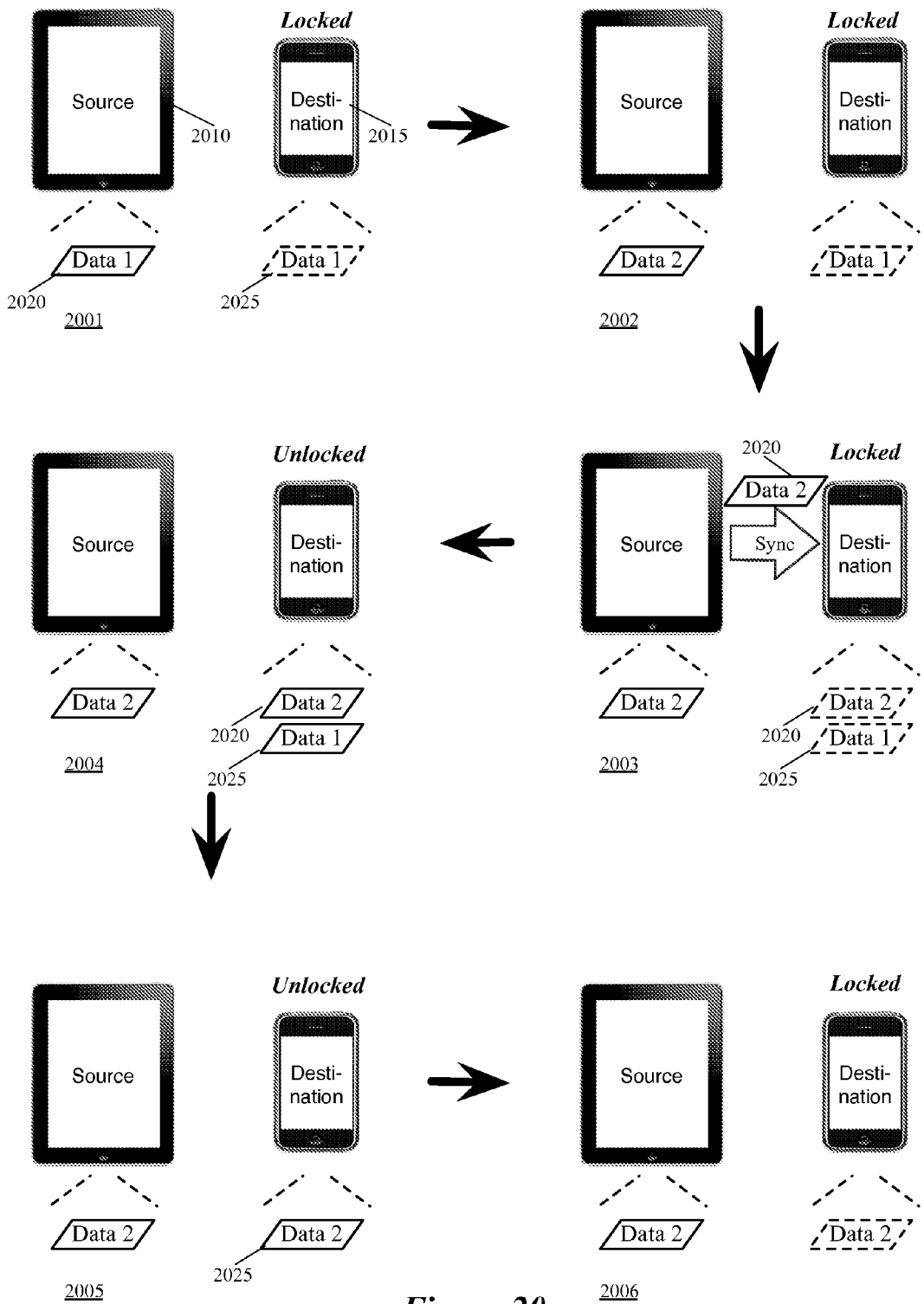
FIG. 20 illustrates keychain items secured by a protection domain that requires a device to be unlocked in order for the keychain items belonging to the protection domain to be available at the device.

FIG. 20 illustrates keychain items secured by a protection domain that requires a device to be unlocked in order for the keychain items belonging to the protection domain to be available at the device. Specifically, this figure illustrates in six different stages 2001-2006 processing a keychain item 2020 that is updated by a source device 2010 and pushed to the destination device 2015. This figure also illustrates processing a keychain item 2025 that is a corresponding keychain item to be synced with the keychain item 2020.

The protection domain to which the keychain items 2020 and 2025 belong requires the destination device 2015 to be unlocked in order to make the keychain items 2020 and 2025 available at the destination device 2015. In this patent application, a device being "unlocked" may not mean that the screen of the device is unlocked for taking any inputs to the screen. Rather, a device being unlocked means that a user has authenticated to use the device. The device of different embodiments provides different authentication mechanism. For instance, the device of some embodiments requires the user to provide a passcode (e.g., a four-digit passcode) to unlock the device. Other embodiments may alternatively or conjunctively allow the user to unlock the device with a lengthy password, a retina scan, a fingerprint scan, voice recognition, etc.

The first stage 2001 shows that the keychain items 2020 and 2025 in the source and destination devices 2010 and 2015, respectively, are in sync. At this stage, the destination device 2015 is in a locked state. The destination device 2015 is in the locked state because the device 2015 has not been unlocked by the user of the device 2015 yet since the device is being booted or because the device 2015 automatically went from an unlocked state to the locked state after a period of idle time has passed. As shown, the keychain items 2020 and 2025 both include data 1, but the keychain item 2025 at the destination device 2015 is depicted as a dotted parallelogram to indicate that the keychain item 2025 is unavailable because the destination device 2015 is in the locked state. In this example, the destination 2015 makes the keychain item 2025 unavailable by encrypting the keychain item 2025 with a local protection domain key for the protection domain to which the keychain item 2025 belongs.

The second stage 2002 shows that the keychain item 2020 at the source device 2010 has been updated from data 1 to data 2. For instance, the keychain item 2020 includes the password to access a remote server that an application running in the source device 2010 requires, and the user of the source device 2010 has changed the password. At this stage, the keychain item 2025 remains unavailable at the destination device 2025 because the destination device 2015 is still in the locked state.

The next stage 2003 shows that the source device 2010 has pushed the keychain item 2020 to the destination device 2015 in order to sync the keychain item 2020 and the corresponding keychain item 2025 of the destination device 2015. In this example, the source device 2010 encrypts the keychain item 2020 with a public key of the destination device 2015 for the protection domain before pushing the keychain item 2020 to the destination device 2015. The destination device 2015 receives the keychain item 2020 but the keychain item 2020 is unavailable at this stage because the destination device is in the locked state and thus has not decrypted the keychain item 2020 with the corresponding private key for the protection domain. The private key also has been unavailable in this example because the destination device 2015 has encrypted the private key with the local protection domain key that is used to encrypt the keychain item 2025. The keychain item 2025 remains unavailable at the destination device 2015 because the destination device 2015 is in the locked state and thus has not decrypted the keychain item 2025 with the local protection domain key.

At the fourth stage 2004, the user has unlocked the destination device 2015. As a result, both of the keychain items 2020 and 2025 become available for the destination device 2015's use. That is, the device 2015 at this stage decrypts the private key with the local protection domain key and then decrypts the keychain item 2020 with the decrypted private key. The device 2015 also decrypts the keychain item 2025 with the local protection domain key. The destination device 2015 then initiates syncing the two keychain items 2020 and 2025 because they became available.

The fifth stage 2005 shows that the keychain items 2020 and 2025 are synced and thus the keychain item 2025 has data 2. The destination device 2015 is in the unlocked state and the keychain item 2025 is available for the destination device 2015's use. The next stage 2006 shows that the destination device 2015 has gone back to the locked state (e.g., by being idle for a period of time or because the user has locked the device 2015). The destination device 2015 makes the keychain item 2025 unavailable by encrypting the keychain item 2025 with the local protection domain key.

Figure 21:
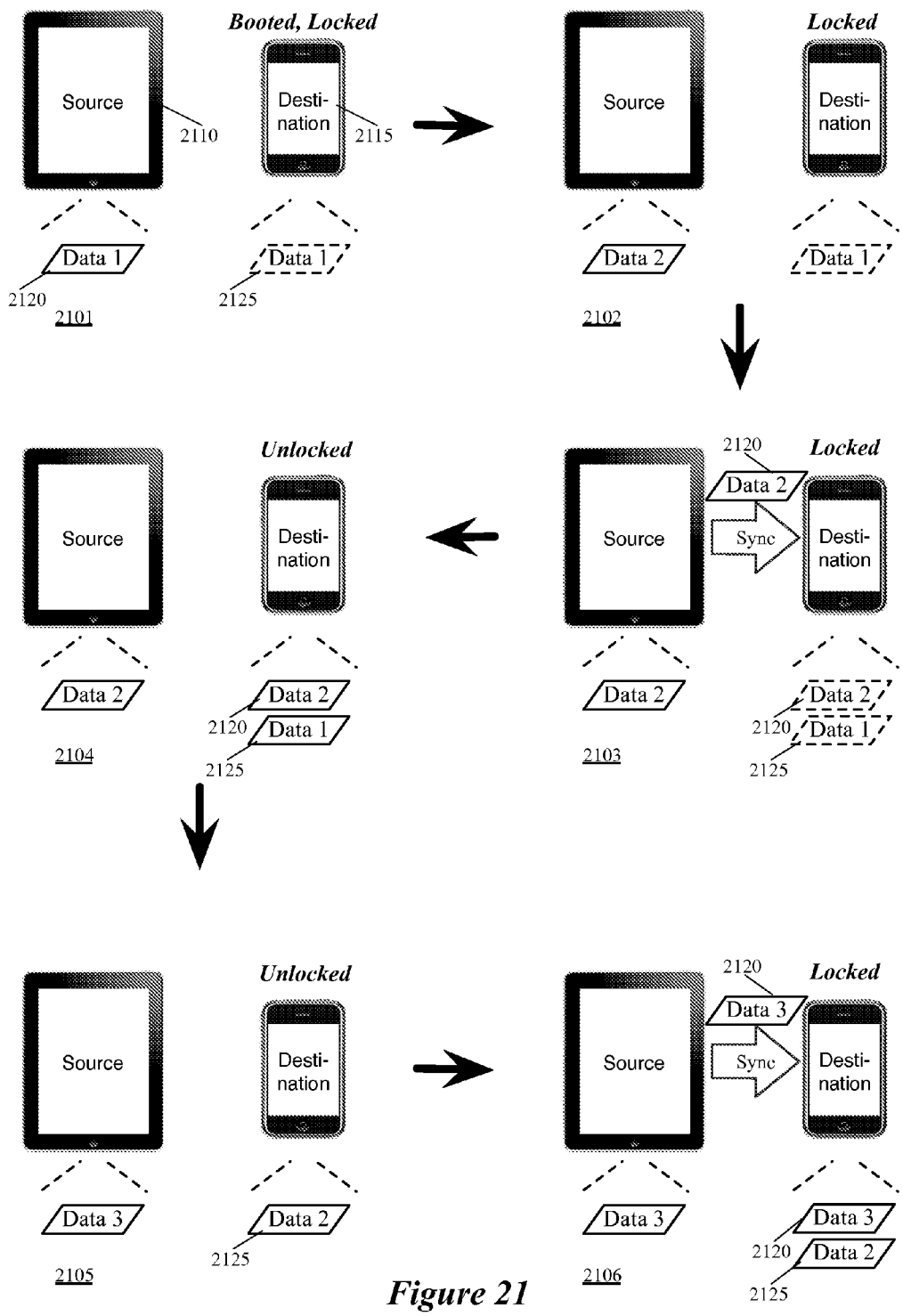
FIG. 21 illustrates keychain items secured by a protection domain that requires a device to be unlocked at least once after being booted in order for the keychain items belonging to the protection domain to be available at the device.

FIG. 21 illustrates keychain items secured by a protection domain that requires a device to be unlocked at least once after being booted in order for the keychain items belonging to the protection domain to be available at the device. Specifically, this figure illustrates in six different stages 2101-2106 processing keychain items 2120 and 2125 by a destination device 2115. This figure also illustrates a source device 2110 that updates the keychain item 2120 and pushes it to the destination device 2115 for syncing with the keychain item 2125.

The protection domain to which the keychain items 2120 and 2125 belong requires the destination device 2115 to be unlocked at least once after being booted (i.e., being turned on from a turned-off state) in order to make the keychain items 2120 and 2125 available at the destination device 2115. In some embodiments, this protection domain is used to protect passwords to applications that run in the background. For instance, an email application running on a device needs a password to access the mail server in order to fetch emails while the device is idle (e.g., while the device is not receiving any user inputs).

The first stage 2101 shows that the keychain items 2120 and 2125 in the source and destination devices 2110 and 2115, respectively, are in sync. As shown, both keychain items 2120 and 2125 include data 1. At this stage, the destination device 2115 still has not been unlocked since the destination device 2115 is booted. That is, the user of the destination device 2115 has not unlocked the device 2115 yet after booting up the device 2115. The keychain item 2125 at the destination device 2115 is depicted as a dotted parallelogram to indicate that the keychain item 2125 is unavailable. In this example, the destination 2125 has encrypted the keychain item 2125 with a local protection domain key for the protection domain to which the keychain item 2125 belongs, in order to make the keychain item 2125 unavailable.

The second stage 2102 shows that the keychain item 2120 at the source device 2110 has been updated from data 1 to data 2. At this stage, the keychain item 2125 at the destination device 2115 remains unavailable because the destination device 2115 still has not been unlocked since being booted up.

The next stage 2103 shows that the source device 2110 has pushed the keychain item 2120 to the destination device 2115 in order to sync the keychain items 2120 and the corresponding keychain item 2125 of the destination device 2115. In this example, the source device 2110 encrypts the keychain item 2120 with a public key of the destination device 2115 for the protection domain before pushing the keychain item 2120 to the destination device 2115. The destination device 2115 receives the keychain item 2120 but the keychain item 2120 is unavailable at this stage because the destination device 2115 has not been unlocked since being booted up and thus has not decrypted the keychain item 2120 with the corresponding private key for the protection domain. The private key also has been unavailable in this example because the destination device 2115 has encrypted the private key with the local protection domain key that is used to encrypt the keychain item 2125. The keychain item 2125 remains unavailable at the destination device 2115 because the destination device 2115 is in the locked state and thus has not decrypted the keychain item 2125 with the local protection domain key.

At the fourth stage 2104, the user has unlocked the destination device 2115 for the first time after the device 2115 has been booted up. As a result, both of the keychain items 2120 and 2125 are available for the destination device 2115's use. In this example, the destination device 2115 makes the keychain item 2120 available by decrypting the keychain item 2120 with the private key for the protection domain. The destination device 2115 has decrypted the private key as well as the keychain item 2125 with the local protection domain key for the protection domain. The destination device 2115 initiates syncing the two keychain items 2120 and 2125 because they became available.

The fifth stage 2105 shows that the keychain items 2120 and 2125 are synced and thus the keychain item 2125 has data 2. The destination device 2115 is in the unlocked state and the keychain item 2125 is available for the destination device 2115's use. At this stage, the user of the source device 2110 updates the keychain item 2120 again, from data 2 to data 3.

The sixth stage 2106 shows that the destination device 2115 has gone back to the locked state (e.g., by being idle for a period of time or because the user has locked the destination device 2115). However, the keychain item 2125 is still available for the device 2115's use because the device 2115 has been unlocked once after the device 2115 was booted up and thus the device 2115 does not again encrypt the keychain item 2125 with the local protection domain key.

At this stage 2106, the source device 2110 has also pushed the keychain item 2120 to the destination device 2115 in order to sync the keychain items 2120 and the corresponding keychain item 2125 of the destination device 2115. The source device 2110 uses the public key for the protection domain to encrypt the keychain item 2120 before pushing the keychain item 2120 to the destination device 2115. The destination device 2115 receives the keychain item 2120 and the keychain items 2120 becomes available even if the destination device 2115 is in the locked state. This is because the destination device 2115 has been unlocked at least once after the device 2115 was booted up and thus the device 2115 does not encrypt the private key, which is then available to decrypt the keychain items 2120. The keychain items 2120 will be synced even if the destination device 2115 remains in the locked state.

Figure 22:
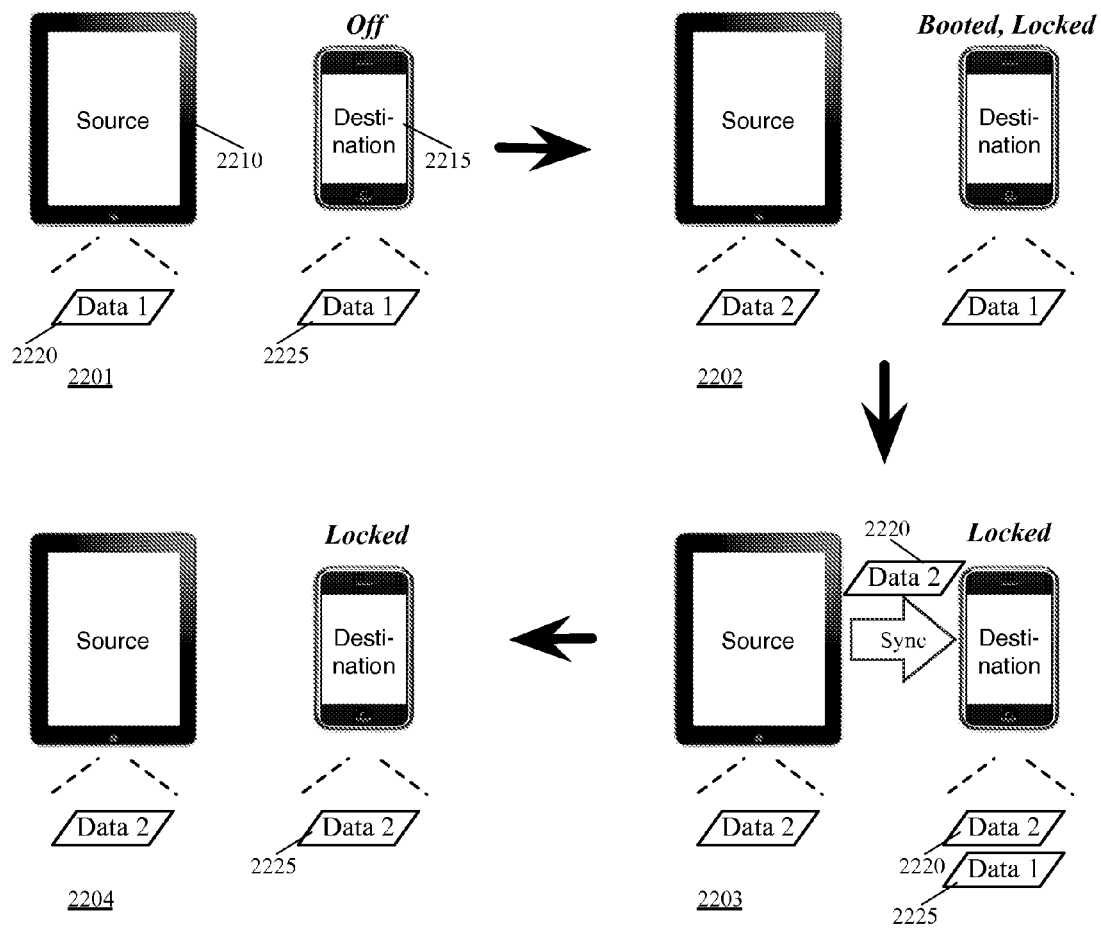
FIG. 22 illustrates keychain items secured by a protection domain that requires a device to be turned on in order for the keychain items belonging to the protection domain to be available at the device.

FIG. 22 illustrates keychain items secured by a protection domain that requires a device to be turned on in order for the keychain items belonging to the protection domain to be available at the device. Specifically, this figure illustrates in four different stages 2201-2204 processing keychain items 2220 and 2225 by a destination device 2215. This figure also illustrates a source device 2210 that updates the keychain item 2220 and pushes it to the destination device 2215 for syncing with the keychain item 2225.

The protection domain to which the keychain items 2220 and 2225 belong requires the destination device 2215 to be on in order to make the keychain items 2220 and 2225 available for the device 2215's use. That is, as long as the destination device 2215 is up and running, the keychain items 2220 and 2225 are available for the device 2215's use all the time. Because this protection domain provides little protection, the device of some embodiments uses this protection domain for those applications that needs to be running all the time. An example of such applications include Find My iPhone™ application by Apple, Inc.

The first stage 2201 shows that the keychain items 2220 and 2225 in the source and destination devices 2210 and 2215, respectively, are in sync. As shown, both keychain items 2220 and 2225 include data 1. At this stage, the destination device 2215 is turned off.

The second stage 2202 shows that the keychain item 2220 at the source device 2210 has been updated from data 1 to data 2. At this stage, the destination device 2215 is booted up but has not been unlocked yet. However, the keychain item 2225 is available for the destination device 2215's use because the condition (i.e., the device being up and running) of the protection domain has been met and thus the device 2215 does not encrypt the keychain item 2225 with a local protection domain key for the protection domain. In some embodiments, the keychain item 2225 may still be encrypted with a key tied to the device 2215 (e.g., a key derived from the UID of the device 2215) but the keychain item 2215 is deemed available because the key is available to decrypt the keychain item 2225 at the device 2215.

The next stage 2203 shows that the source device 2210 has pushed the keychain item 2220 to the destination device 2215 in order to sync the keychain items 2220 and the corresponding keychain item 2225 of the destination device 2215. The source device 2210 encrypts the keychain item 2220 before pushing the keychain item 2220 to the destination device 2215. The destination device 2215 receives the keychain item 2220 and the keychain item 2220 becomes available at the device 2215 at this stage even though the device 2215 has not been unlocked yet. This is because the device 2215 is up and running and thus the corresponding private key is available to decrypt the keychain item 2220.

The destination device 2215 initiates syncing the two keychain items 2220 and 2225 because the keychain items 2220 and 2225 are available.

At the fourth stage 2204, the destination device 2215 has not been unlocked yet. However, the fourth stage 2204 shows that the keychain items 2220 and 2225 are synced. As a result, the keychain item 2225 now has data 2.

Figure 23:
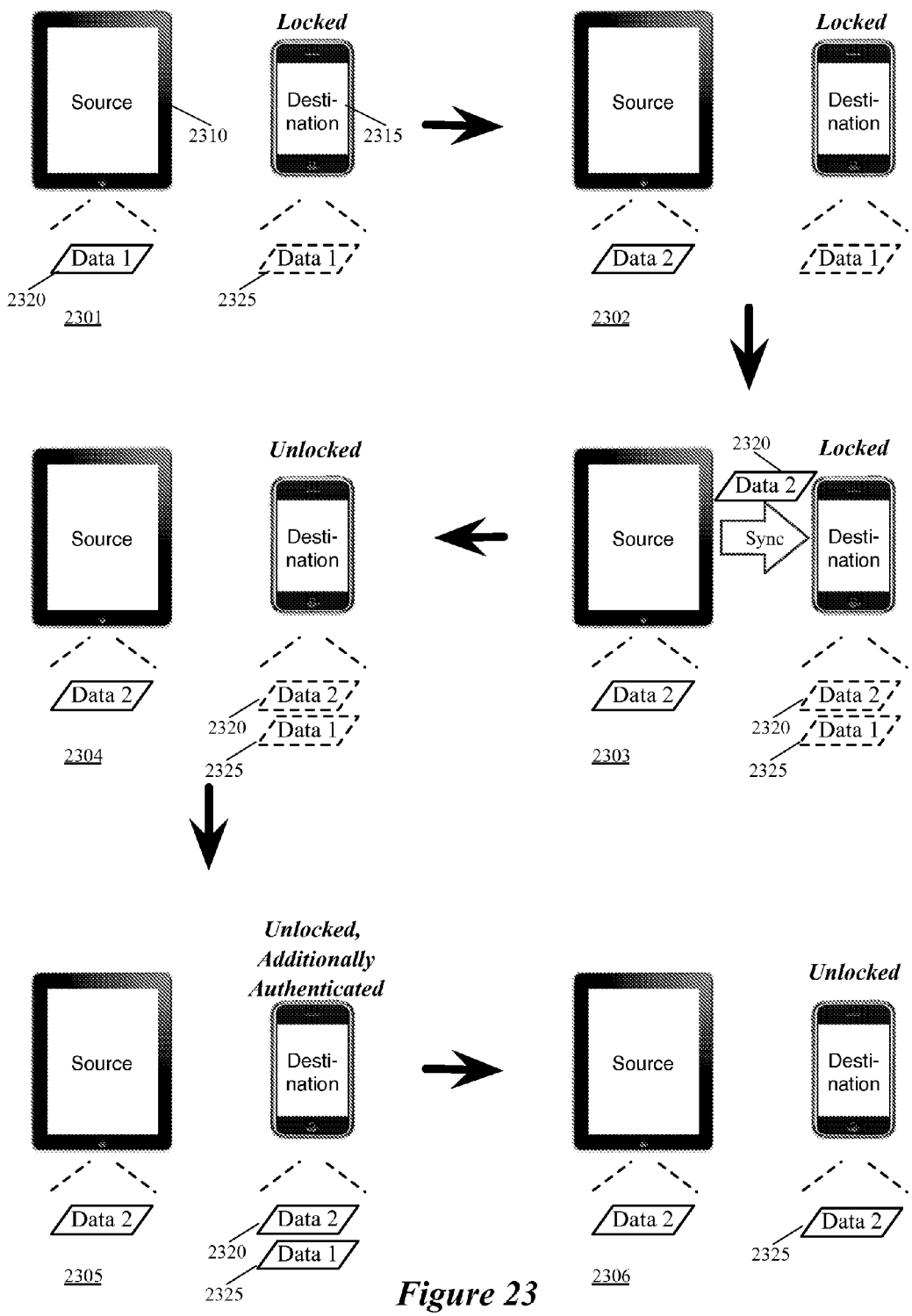
FIG. 23 illustrates keychain items secured by a protection domain that requires a device to be unlocked and also requires additional authentication in order for the keychain items belonging to the protection domain to be available at the device.

FIG. 23 illustrates keychain items secured by a protection domain that requires a device to be unlocked and also requires additional authentication in order for the keychain items belonging to the protection domain to be available at the device. Specifically, this figure illustrates in six different stages 2301-2306 processing a keychain item 2320 that is updated by a source device 2310 and pushed to the destination device 2315. This figure also illustrates processing a keychain item 2325 that is a corresponding keychain item to be synced with the keychain item 2320.

The protection domain to which the keychain items 2320 and 2325 belong requires the destination device 2315 to be unlocked and also requires additional authentication (e.g., a password, a retina scan, a fingerprint scan, voice recognition, the device being within vicinity of a certain location, etc.) in order to make the keychain items 2320 and 2325 available at the destination device 2315. In some embodiments, this protection domain is used for protecting passwords to applications that need additional security measure. For instance, the keychain manager of some embodiments generates a secure random password for an application to access a remote server. In some embodiments, this password is not exposed to the user, and the keychain manager authenticates the user with a simpler or different password that the user can remember and use. The unexposed password is synced between the devices that the user uses. When the unexposed password is changed at a source device and is pushed to a destination device, the unexposed password does not become available at the destination device even if the user unlocks the destination device, unless the user provides the different password to use the same application running at the destination device.

The first stage 2301 shows that the keychain items 2320 and 2325 in the source and destination devices 2310 and 2315, respectively, are in sync. At this stage, the destination device 2315 is in an unlocked state. As shown, the keychain items 2320 and 2325 both include data 1, but the keychain item 2325 at the destination device 2315 is unavailable because the destination device 2315 is in the locked state. In this example, the destination 2325 has encrypted the keychain item 2325 with a local protection domain key for the protection domain to which the keychain item 2325 belongs, in order to make the keychain item 2325 unavailable.

The second stage 2302 shows that the keychain item 2320 at the source device 2310 has been updated by the user from data 1 to data 2. For instance, the keychain item 2320 includes the unexposed password that is actually used to access the remote server that an application running in the source device 2310 requires, and the user has just changed the unexposed password by changing the different password that the user remembers and uses to authenticate to use an application. At this stage, the keychain item 2325 remains unavailable because the destination device 2315 is still in the locked state and thus the conditions for the protection domain have not been met yet.

The third stage 2303 shows that the source device 2310 has pushed the keychain item 2320 to the destination device 2315 in order to sync the keychain items 2320 and the corresponding keychain item 2325 of the destination device 2315. In this example, the source device 2310 encrypts the keychain item 2320 with a public key of the destination device 2315 for the protection domain before pushing the keychain item 2320 to the destination device 2315. The destination device 2315 receives the keychain item 2320 but the keychain item 2320 is unavailable at this stage because the destination device is in the locked state and thus has not decrypted the keychain item 2320 with the corresponding private key for the protection domain. The keychain item 2325 also remains unavailable because the destination device 2315 is in the locked state.

At the fourth stage 2304, the user has unlocked the destination device 2315. However, both of the keychain items 2320 and 2325 are still unavailable for the destination device 2315's use because the conditions for the protection domain to which the keychain items 2320 and 2325 belong have not been met yet—the user has not provided the additional authentication that this protection domain requires.

The fifth stage 2305 shows that the user has provided the additional authentication (e.g., by typing in the different password that the user remembers). Both of the keychain items 2320 and 2325 have become available now. This is because all conditions for the protection domain have been met and thus the device 2315 has decrypted the private key and the keychain item 2325 with the local protection domain. The device 2315 had decrypted the keychain item 2325 with the decrypted private key. The destination device 2315 initiates syncing the two keychain items 2320 and 2325. The sixth stage 2306 shows that the keychain items 2320 and 2325 are synced and thus the keychain item 2325 has data 2.

Figure 24:
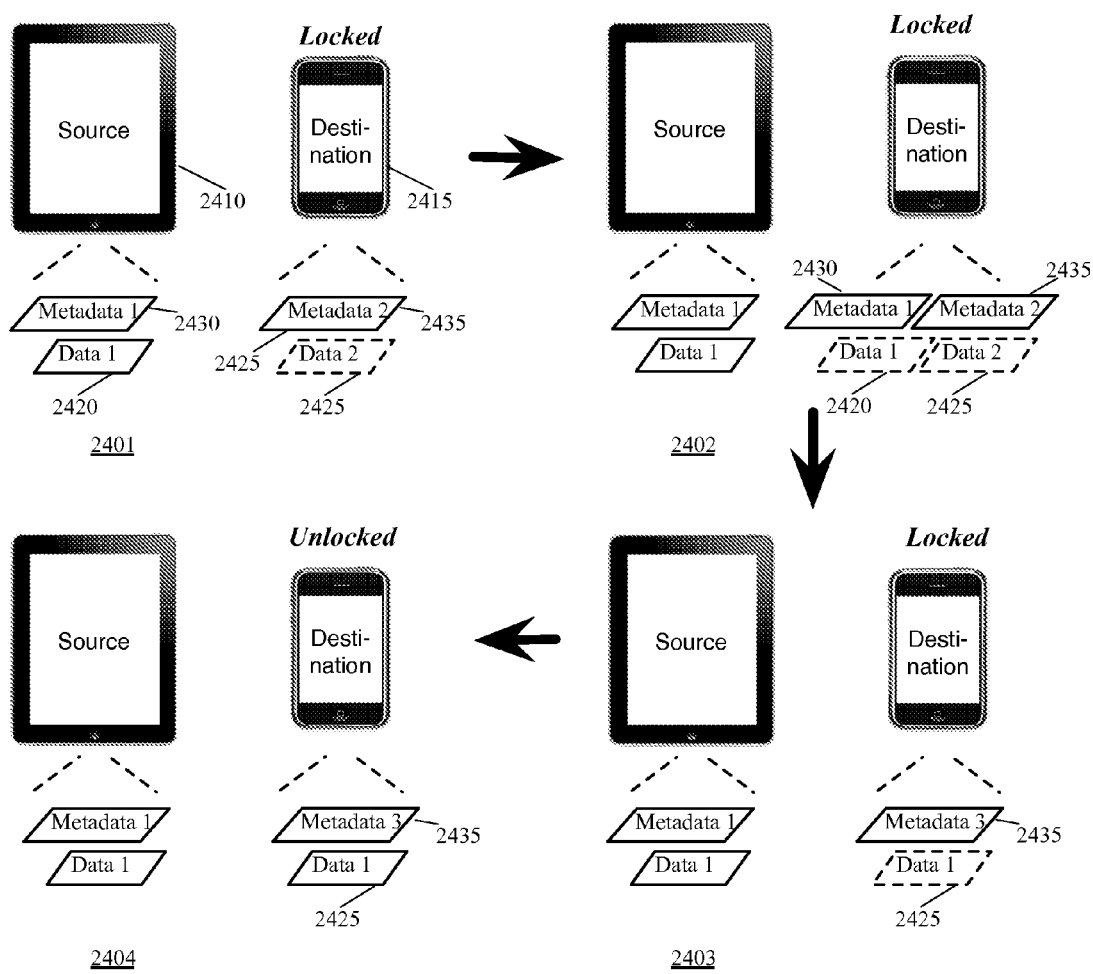
FIG. 24 illustrates data secured by two protection domains having different sets of conditions for a device.

FIG. 24 illustrates data secured by two protection domains having different sets of conditions for a device. Specifically, this figure illustrates in four different stages 2401-2404 processing metadata items 2430 and 2435 and keychain items 2420 and 2425 by a destination device 2415. This figure also illustrates a source device 2410 that updates the keychain item 2420 and pushes it to the destination device 2415 for syncing with the keychain item 2425.

As mentioned above, a keychain item is associated with a metadata item that carries information for the devices to use to resolve any conflict when syncing two keychain items. In some embodiments, a keychain item and its associated metadata item are defined to be in different protection domains so that the metadata item becomes available at a device while the keychain item remains unavailable. When the keychain item is unavailable and the associated metadata item is available at a device, the device can resolve any conflict for the keychain item using the information carried by the associated metadata item.

The metadata items 2430 and 2435 are associated with the keychain items 2420 and 2425, respectively. In this example, the metadata items 2430 and 2435 belong to a first protection domain, which requires that the destination device 2415 be turned on in order for the metadata items 2430 and 2435 to be available for the device 2415's use. The keychain items 2420 and 2425 belong to a second protection domain, which requires that the destination device 2415 be in the unlocked state in order for the keychain items to be available at the destination device 2415.

The first stage 2401 shows that the keychain items 2420 and 2425 in the source and destination devices 2410 and 2415, respectively, are not in sync. As shown, keychain items 2420 and 2425 include data 1 and data 2, respectively. The metadata items 2430 and 2435 have different information. The metadata item 2430 carries metadata 1 and the metadata item 2435 carries metadata 2, as shown. At this stage, the destination device 2415 is in the locked state. The keychain item 2425 at the destination device 2415 is depicted as a dotted parallelogram to indicate that the keychain item 2425 is unavailable at the device 2415. In this example, the device 2425 has made the keychain item 2425 unavailable by encrypting the keychain item 2425 with a local protection domain key for the second protection domain. The metadata item 2435 is available at the device 2415 because the device 2425 does not encrypt the metadata 2435 when the device 2425 is on.

The second stage 2402 shows that the source device 2410 has pushed the keychain item 2420 along with the associated metadata item 2430 to the destination device 2415 in order to sync the keychain items 2420 and the corresponding keychain item 2425 of the destination device 2415. In this example, the source device 2410 encrypts the metadata item 2430 with a public key of the destination device 2415 for the first protection domain. The source device 2410 also encrypts the keychain item 2420 with a public key of the destination device 2415 for the second protection domain before sending the metadata item 2430 and the keychain item 2420 to the destination device 2415.

The destination device 2415 receives the keychain item 2420 and the metadata item 2435 but the keychain item 2420 is unavailable at the destination device 2415 at this stage 2402. This is because the destination device 2415 is still in the locked state and thus the device 2415 does not decrypt the keychain item 2425 with the private key for the second protection domain. The keychain item 2425 remains unavailable because the device 2415 is still in the unlocked state. The metadata item 2435 is available at the destination 2415 at this stage 2402 because the device 2402 is up and running. The device 2415 initiates syncing the two encrypted keychain items 2420 and 2425 by resolving the conflict between the keychain items 2420 and 2425 using the metadata items 2430 and 2435.

At the third stage 2403, the destination device 2415 is still in the locked state. However, the destination device 2415 has synced the keychain items. As a result, the metadata item has been updated with new conflict resolution information (metadata 3) and the keychain item 2425 has data 1. The updated keychain item 2425 is still not available at the destination device 2415 by remaining encrypted with the public key for the second domain because the device 2415 is still in the locked state. At the fourth stage 2404, the destination device 2415 is in the unlocked state. In this example, the device makes keychain item 2425 available by decrypting the private key for the second protection domain with the local protection domain key for the second domain and then decrypting the keychain item 2425 with the decrypted private key.

C. Sync Circles and Protection Domains

As mentioned above, a device may join several different sync circles for syncing different keychain items (e.g., using the techniques described above by reference to FIGS. 4-6). In some embodiments, several devices form several different sync circles in order to sync keychain items that belong to several different protection domains.

Figure 25:
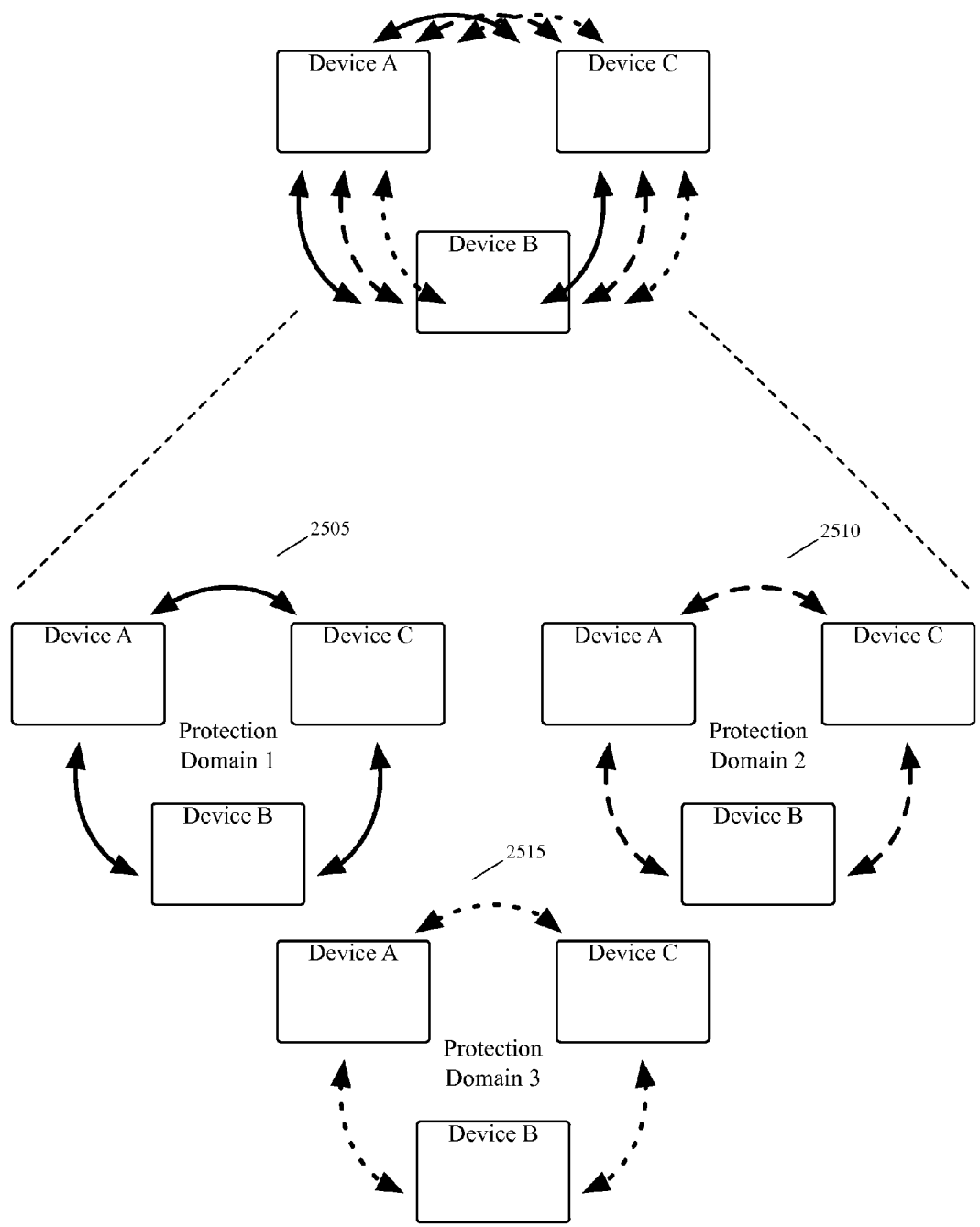
FIG. 25 conceptually illustrates several sync circles formed by several devices.

FIG. 25 conceptually illustrates several sync circles formed by several devices. Specifically, this figure illustrates that three devices A-C form three different sync circles 2505-2515 for three different protection domains 1-3. The top portion of the figure illustrates the devices A-C in three sync circles 2505-2515. The bottom portion of the figure illustrates the three sync circles 2505-2515 separately.

In some embodiments, a group of devices forms a sync circle for each of the protection domains that the devices use to protect keychain items. In some such embodiments, each device of the group uses the same public/private key pair that the device uses to encrypt and decrypt the keychain items, to join the sync circle. Alternatively or conjunctively, the devices of other embodiments use separate key pairs for joining the sync circle and encrypting and decrypting the keychain items.

As shown, the devices A-C form the sync circle 2505 for the protection domain 1. The devices A-C form the sync circle 2510 for the protection domain 2. The devices A-C form the sync circle 2510 for the protection domain 3. FIG. 25 illustrates three sync circles are formed by the same three devices A-C. However, each of the devices A-C may form other sync circles (not shown) with devices other than the two other devices of the devices A-C for protection domains (not shown) other than the protection domains 1-3.

While the sync circles 2505-2515 are illustrated in this figure as rings or circular shapes, each pair of devices establish a secure transport layer to form a sync circle. That is, the devices in a sync circle form a star network rather than a ring network in some embodiments.

Figure 26:
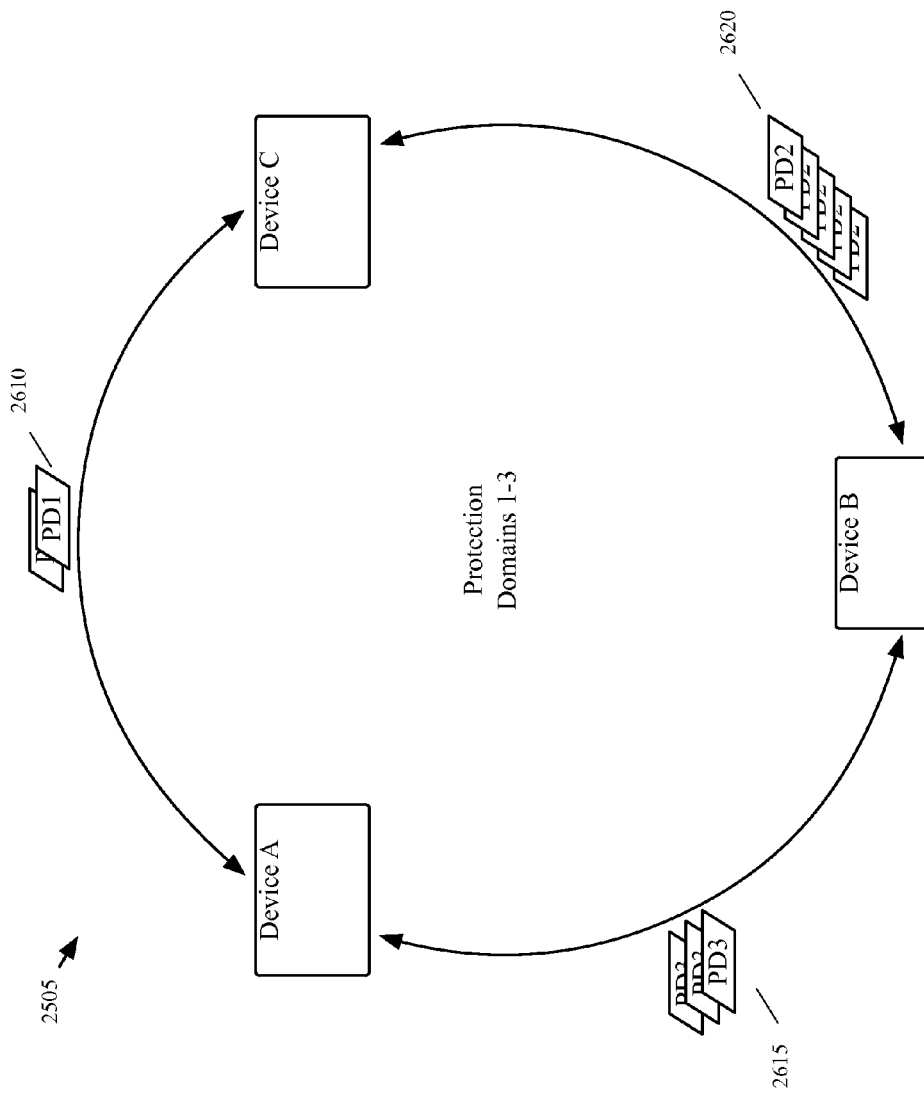
FIG. 26 conceptually illustrates a sync circle formed by several devices for several different protection domains.

FIG. 26 conceptually illustrates a sync circle formed by several devices for several different protection domains. Specifically, this figure illustrates that three devices A-C form a sync circle 2605 for three different protection domains 1-3. This figure also illustrates three groups of keychain items 2610-2620.

In some embodiments, a group of devices form a single sync circle for several different protection domains. In some of these embodiments, each device of the group uses one pair of the several public/private key pairs for the several different protection domains, to join the single sync cycle. That is, each device of the group selects one pair of the several public/private key pairs for encrypting and decrypting the keychain items and uses the selected key pair to join the single sync circle. Alternatively or conjunctively, each device of the group in other embodiments uses none of the key pairs for encrypting and decrypting the keychain items but rather uses a separate key pair to join the single sync circle.

In some embodiments, each device of the group uses all of the several public/private key pairs for the several different protection domains to join the single sync circle. That is, each device of the group in these embodiments uses all of the key pairs for encrypting and decrypting the keychain items to join the sync circle. Therefore, in these embodiments, a device needs to meet all conditions of every one of the several different protection domains in order to join the sync circle because the device needs to have all the key pairs available.

In this example, the keychain items 2610 belong to the protection domain 1. The keychain items 2610 are being pushed by the device C to the device A. The device C uses the public key of the device A that has been published to the devices B and C for the protection domain 1, to encrypt the keychain items 2610. However, the device C in this example has used all three public/private key pairs for the protection domains 1-3 to join the sync circle 2605.

The keychain items 2620 belong to the protection domain 2. The keychain items 2620 are being pushed by the device B to the device C. The device B uses the public key of the device C that has been published to the devices A and B for the protection domain 2, to encrypt the keychain items 2620. In this example, the device B has used all three public/private key pairs for the protection domains 1-3 to join the sync circle 2605.

The keychain items 2615 belong to the protection domain 3. The keychain items 2615 are being pushed by the device A to the device B. The device A uses the public key of the device B that has been published to the devices A and C for the protection domain 3, to encrypt the keychain items 2615. In this example, the device B has used all three public/private key pairs for the protection domains 1-3 to join the sync circle 2605.

V. Software Architecture

Figure 27:
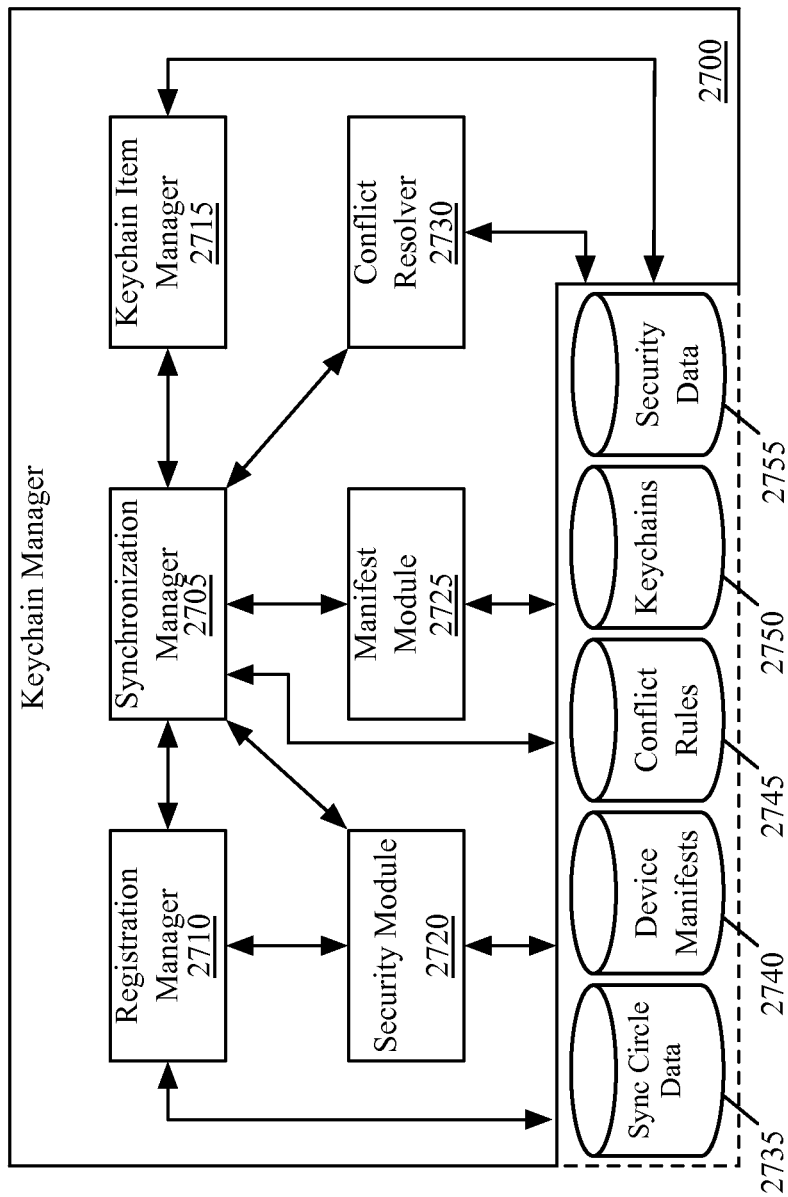
FIG. 27 conceptually illustrates a software architecture of a keychain manager of some embodiments.

In some embodiments, the processes described above are implemented as software running on a particular machine, such as a computer (e.g., a desktop, laptop, etc.), a handheld device (e.g., a smartphone), or a tablet computing device, or stored in a machine readable medium. FIG. 27 conceptually illustrates a software architecture of a keychain manager 2700 of some embodiments. In some embodiments, the keychain manager is a stand-alone application for managing the synchronization of keychains between devices in sync circles. The keychain manager of some embodiments is integrated into another application (e.g., a keychain management application, data management application, a security application, etc.), while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided as a thick client. That is, the application is distributed from the server to the client machine and runs on the client machine.

The keychain manager 2700 of some embodiments is implemented to operate on different operating systems. In some embodiments, different operating systems (e.g., iOS®, Mac OS X®, etc.) use different architectures to manage keychains and keychain items. The keychain manager 2700 of some embodiments is implemented to synchronize keychains and keychain items among devices using different keychain management architectures. For instance, in some embodiments, the keychain manager 2700 is implemented for a particular keychain management architecture (e.g., iOS®) and ported to operate with another keychain management architecture (e.g., Mac OS X®).

As shown, the keychain manager 2700 includes a synchronization manager 2705, registration manager 2710, a keychain item manager 2715, a cryptography module 2720, a manifest module 2725, and a conflict resolver 2730. The keychain manager 2700 also includes sync circle data storage 2735, device manifests storage 2740, conflict rules storage 2745, keychains storage 2750, and security data storage 2755. In some embodiments, the sync circle data 2735 stores a local copy of the data stored in storages 310-330 described above by reference to FIG. 3. That is, the sync circle data storage 2735 stores a name for a sync circle, a sync circle device list, user signatures, device signatures, and keychain data, and, other data. The device manifests storage 2740 stores a history of manifest for each of the devices in a sync circle. The conflict rules storage 2745 stores a previous versions of conflict resolves, a current version of the conflict resolver that is used to resolve keychain item conflicts, and various rules associated with the previous versions and current version of conflict resolvers. The keychains storage 2750 stores the keychains for syncing with devices in sync circles. In some embodiments, the keychains storage 2750 also stores keychains and/or keychain items that are not shared (i.e., synchronized) with other devices in sync circles. The security data storage 2755 stores data related to security features (e.g., secure communication channels (e.g., security keys), data encryption (e.g., encryption keys), data decryption (e.g. decryption keys), data authentication (e.g., decryption keys), etc.) that the keychain manager 2700 provides for facilitating the synchronization of keychains. In some embodiments, the storages 2735-2755 are stored in one physical storage while, in other embodiments, the storages 2735-2755 are stored on separate physical storages. Still, in some embodiments, some or all of the storages 2735-2755 are implemented across several physical storages.

The synchronization manager 2705 is responsible for managing the synchronization of keychains between devices in sync circles. In some embodiments, the synchronization manager 2705 started by the registration manager 2710 after the devices on which the keychain manager 2700 operates has successfully registered into a sync circle. In some embodiments, the synchronization manager 2705 is handles the data protection features described above in Section IV. The synchronization manager communicates with the other modules 2710 and 2715-2730 in order to accomplish the synchronization of keychains between devices in sync circles.

The registration manager 2710 handles the various functions related to registering devices into a sync circle. For instance, when the device on which the keychain manager is operating wishes to join a sync circle, the registration manager 2710 creates a sync circle when one does not exist. The registration manager 2710 also handles registration request generation (e.g., by performing the process 500 described above by reference to FIG. 5), registration request approval (e.g., by performing the process 600 described above by reference to FIG. 6), registration approval acknowledgement, etc.

The keychain item manager 2715 creates and manages keychain items for keychains. In some embodiments, the keychain item manager 2715 generates and maintains the data structures (e.g., the data structure described above by reference to FIG. 10) that represent some or all of the keychain items in keychains.

The security module 2720 provides the functionality for various security features. For example, the security module 2720 handles the establishment of secure communication channels with each of the devices in sync circles. The security module 2720 performs different cryptography primitives, algorithms, protocols, and techniques (e.g., OTR messaging, Diffie-Hellman key exchanges, public/private key pair generation, etc.) in order to implement the various security features.

The manifest module 2725 is responsible for generating the different types of manifest based on the local keychain items and, in some cases, the manifests of peer devices. For instance, the manifest module 2725 generates manifest digests, complete manifests, and delta manifest. To facilitate in the generation of manifest, the manifest module 2725 maintains the history of manifest for each of the devices in sync circles. The manifest module 2725 also performs the comparisons between local keychain items (or local manifests) and the manifest of peer devices in the generation of delta manifests.

The conflict resolver 2730 handles the resolving of conflicts between keychain items. For example, the conflict resolver 2730 compares local keychain items and keychain items of peer devices to identify conflicts. The conflict resolver also executes conflict resolvers (e.g., stored in the conflict rules storage 2745) in order to resolve the keychain item conflicts. Additionally, the conflict resolver 2730 is responsible for detecting conflicts between conflict resolvers and determining the conflict resolver to use to resolve the keychain item conflicts.

While many of the features have been described as being performed by one module (e.g., the registration module 2710, the security module 2720, etc.), one of ordinary skill in the art would recognize that the functions might be split up into multiple modules. Similarly, the functions described as being performed by multiple different modules might be performed by a single module in some embodiments (e.g., the keychain item manager 2715 and the conflict resolver 2730).

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 28:
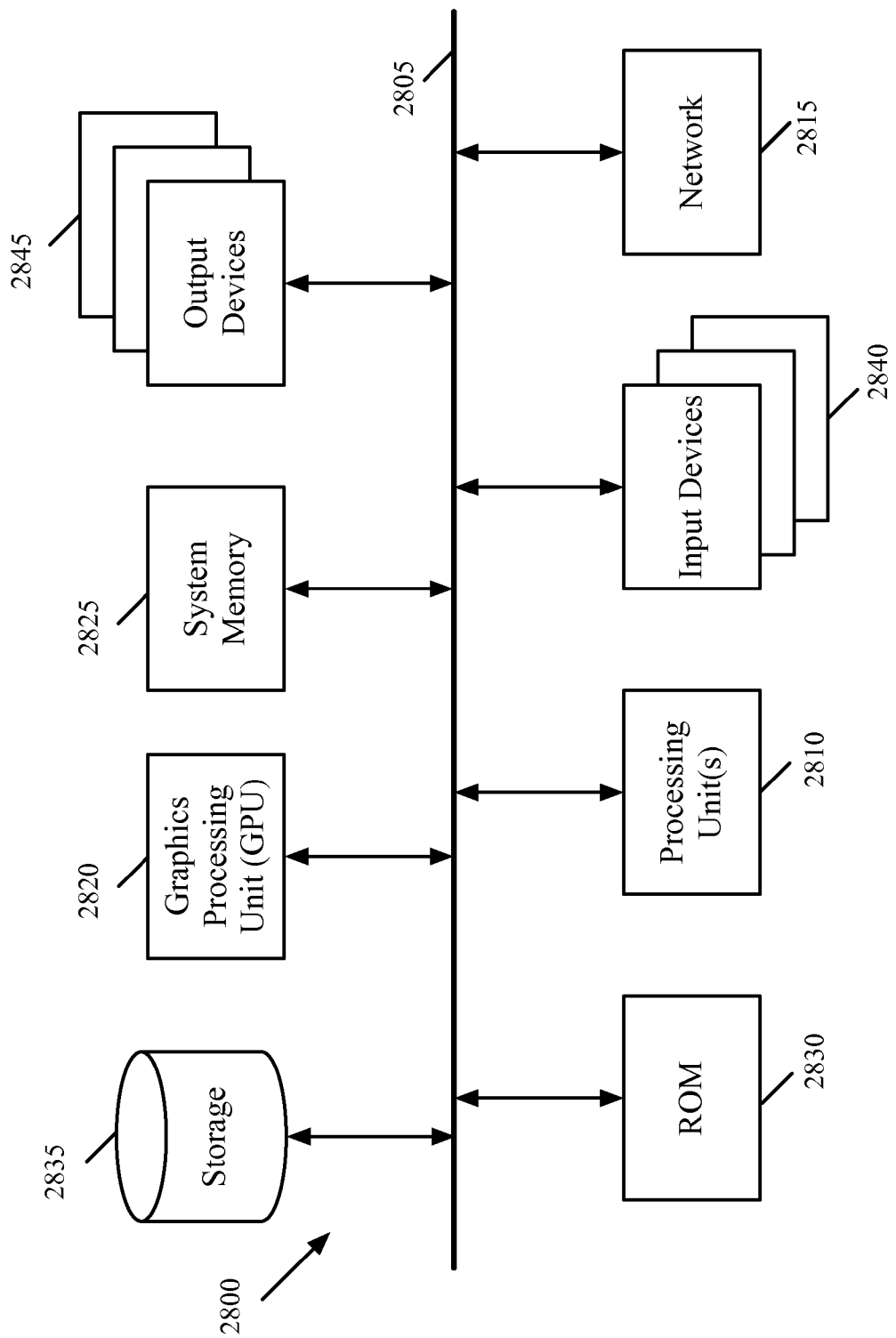
FIG. 28 conceptually illustrates an electronic system with which some embodiments of the invention are implemented.

FIG. 28 conceptually illustrates an electronic system 2800 with which some embodiments of the invention are implemented. The electronic system 2800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2800 includes a bus 2805, processing unit(s) 2810, a graphics processing unit (GPU) 2815, a system memory 2820, a network 2825, a read-only memory 2830, a permanent storage device 2835, input devices 2840, and output devices 2845.

The bus 2805 collectively represents all system, peripheral, and chipset buses that communicatively connect the numerous internal devices of the electronic system 2800. For instance, the bus 2805 communicatively connects the processing unit(s) 2810 with the read-only memory 2830, the GPU 2815, the system memory 2820, and the permanent storage device 2835.

From these various memory units, the processing unit(s) 2810 retrieves instructions to execute and data to process in order to execute the processes of the invention. The processing unit(s) may be a single processor or a multi-core processor in different embodiments. Some instructions are passed to and executed by the GPU 2815. The GPU 2815 can offload various computations or complement the image processing provided by the processing unit(s) 2810. In some embodiments, such functionality can be provided using CoreImage's kernel shading language.

The read-only-memory (ROM) 2830 stores static data and instructions that are needed by the processing unit(s) 2810 and other modules of the electronic system. The permanent storage device 2835, on the other hand, is a read-and-write memory device. This device is a non-volatile memory unit that stores instructions and data even when the electronic system 2800 is off. Some embodiments of the invention use a mass-storage device (such as a magnetic or optical disk and its corresponding disk drive) as the permanent storage device 2835.

Other embodiments use a removable storage device (such as a floppy disk, flash memory device, etc., and its corresponding drive) as the permanent storage device. Like the permanent storage device 2835, the system memory 2820 is a read-and-write memory device. However, unlike storage device 2835, the system memory 2820 is a volatile read-and-write memory, such a random access memory. The system memory 2820 stores some of the instructions and data that the processor needs at runtime. In some embodiments, the invention's processes are stored in the system memory 2820, the permanent storage device 2835, and/or the read-only memory 2830. For example, the various memory units include instructions for processing multimedia clips in accordance with some embodiments. From these various memory units, the processing unit(s) 2810 retrieves instructions to execute and data to process in order to execute the processes of some embodiments.

The bus 2805 also connects to the input and output devices 2840 and 2845. The input devices 2840 enable the user to communicate information and select commands to the electronic system. The input devices 2840 include alphanumeric keyboards and pointing devices (also called "cursor control devices"), cameras (e.g., webcams), microphones or similar devices for receiving voice commands, etc. The output devices 2845 display images generated by the electronic system or otherwise output data. The output devices 2845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 28, bus 2805 also couples electronic system 2800 to a network 2825 through a network adapter (not shown). In this manner, the computer can be a part of a network of computers (such as a local area network ("LAN"), a wide area network ("WAN"), or an Intranet, or a network of networks, such as the Internet. Any or all components of electronic system 2800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 6, and 12-15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for synchronizing a keychain stored on a first device in a set of peer devices with a set of keychains stored on other devices in the set of peer devices, each keychain comprising a set of keychain items, the method comprising:
   receiving a notification that a second device in the set of peer devices has added a first keychain item to a particular keychain while the first device was offline;
   retrieving the first keychain item added to the particular keychain by the second device in the set of peer devices;
   determining that a first unique identifier associated with the first keychain item matches a second unique identifier associated with a second keychain item stored in the particular keychain on the first device;
   based on the determination that the first unique identifier matches the second unique identifier associated with the second keychain item stored in the particular keychain on the first device, resolving a conflict between the first and second keychain items; and
   updating the particular keychain on the first device based on resolution of the conflict.

2. The method of claim 1, wherein if the first unique identifier does not match any unique identifier associated with any item in the particular keychain on the first device, the first keychain item is added to the particular keychain on the first device.

3. The method of claim 1, wherein resolving the conflict comprises:
   determining which of the first and second keychain items is more recent; and
   setting a value of the second keychain item in the particular keychain on the first device to a value of the first keychain item if the first keychain item is more recent.

4. The method of claim 3, wherein if the second keychain item is more recent, the conflict is resolved by not modifying the second keychain item.

5. The method of claim 3, wherein the determination as to which of the first and second keychain items is more recent is based on timestamps associated with the first and second keychain items.

6. The method of claim 1, wherein the first keychain item is retrieved from a cloud storage.

7. The method of claim 1, wherein retrieving the first keychain item comprises:
   receiving an encrypted first keychain item; and
   decrypting the encrypted first keychain item.

8. A non-transitory machine readable medium storing a program which when executed by at least one processing unit of a first device in a set of peer devices synchronizes a keychain stored on the first device with a set of keychains stored on other devices in the set of peer devices, each keychain comprising a set of keychain items, the program comprising sets of instructions for:
   receiving a notification that a second device in the set of peer devices has added a first keychain item to a particular keychain while the first device was offline;
   retrieving the first keychain item added to the particular keychain by the second device in the set of peer devices;
   determining that a first unique identifier associated with the first keychain item matches a second unique identifier associated with a second keychain item stored in the particular keychain on the first device;
   based on the determination that the first unique identifier matches the second unique identifier associated with the second keychain item stored in the particular keychain on the first device, resolving a conflict between the first and second keychain items; and
   updating the particular keychain on the first device based on resolution of the conflict.

9. The non-transitory machine readable medium of claim 8, wherein the program further comprises a set of instructions for adding the first keychain item to the particular keychain on the first device if the first unique identifier does not match any unique identifier associated with any item in the particular keychain on the first device.

10. The non-transitory machine readable medium of claim 8, wherein the set of instructions for resolving the conflict comprises sets of instructions for:
   determining which of the first and second keychain items is more recent; and setting a value of the second keychain item in the particular keychain on the first device to a value of the first keychain item if the first keychain item is more recent.

11. The non-transitory machine readable medium of claim 10, wherein if the second keychain item is more recent, the conflict is resolved by not modifying the second keychain item.

12. The non-transitory machine readable medium of claim 10, wherein the determination as to which of the first and second keychain items is more recent is based on timestamps associated with the first and second keychain items.

13. The non-transitory machine readable medium of claim 8, wherein the first keychain item is retrieved from a cloud storage.

14. The non-transitory machine readable medium of claim 8, wherein the set of instructions for retrieving the first keychain item comprises sets of instructions for:
receiving an encrypted first keychain item; and
decrypting the encrypted first keychain item.

15. A first device in a set of peer devices, the first device comprising:
a set of processing units; and
a non-transitory machine readable medium storing a program which when executed by at least one of the processing units synchronizes a keychain stored on the first device with a set of keychains stored on other devices in the set of peer devices, each keychain comprising a set of keychain items, the program comprising sets of instructions for:
receiving a notification that a second device in the set of peer devices has added a first keychain item to a particular keychain while the first device was offline;
retrieving the first keychain item added to the particular keychain by the second device in the set of peer devices;
determining that a first unique identifier associated with the first keychain item matches a second unique identifier associated with a second keychain item stored in the particular keychain on the first device;
based on the determination that the first unique identifier matches the second unique identifier associated with the second keychain item stored in the particular keychain on the first device, resolving a conflict between the first and second keychain items; and
updating the particular keychain on the first device based on resolution of the conflict.

16. The first device of claim 15, wherein the program further comprises a set of instructions for adding the first keychain item to the particular keychain on the first device if the first unique identifier does not match any unique identifier associated with any item in the particular keychain on the first device.

17. The first device of claim 15, wherein the set of instructions for resolving the conflict comprises sets of instructions for:
determining which of the first and second keychain items is more recent; and
setting a value of the second keychain item in the particular keychain on the first device to a value of the first keychain item if the first keychain item is more recent.

18. The first device of claim 17, wherein if the second keychain item is more recent, the conflict is resolved by not modifying the second keychain item.

19. The first device of claim 15, wherein the first keychain item is retrieved from a cloud storage.

20. The first device of claim 15, wherein the set of instructions for retrieving the first keychain item comprises sets of instructions for:
receiving an encrypted first keychain item; and
decrypting the encrypted first keychain item.

* * * * *